United States Patent [19]
Hoppe

[11] Patent Number: 6,137,492
[45] Date of Patent: Oct. 24, 2000

[54] METHOD AND SYSTEM FOR ADAPTIVE REFINEMENT OF PROGRESSIVE MESHES

[75] Inventor: Hugues H. Hoppe, Seattle, Wash.

[73] Assignee: Microsoft Corporation, Redmond, Wash.

[21] Appl. No.: 08/826,573

[22] Filed: Apr. 3, 1997

[51] Int. Cl.$^7$ ................................................. G06T 17/00
[52] U.S. Cl. .......................... 345/420; 345/418; 345/423; 345/433; 345/442
[58] Field of Search ..................................... 345/420, 423, 345/418, 419, 441, 433, 442; 364/578

[56] References Cited

U.S. PATENT DOCUMENTS 5,602,979   2/1997   Loop ........................................ 345/423

OTHER PUBLICATIONS

Keller et al., "Visual Cues: Practical Data Visualization", IEEE, pp. 130, 153, 1992.
Abi–Ezzi et al, "Fast Dynamic Tessellation of Trimmed NURBS Surfaces," Eurographics '94, 13:C107–C126, 1994.
Cignoni et al, "Representation and Visualization of Terrain Surfaces at Variable Resolution," Scientific Visualization, '95, 50–68, Sep. 1995.
Floriani et al, "Multiresolution Models for Topographic Surface Description," The Visual Computer, 12:317–345, 1996.
Foley et al, "The Quest for Visual Realism," Computer Graphics: Principles and Practice, 14:605–647, 1991.
Gross et al, "Fast Multiresolution Surface Meshing," Proceedings Visualization '95, 135–142, Oct. Nov. 1995.
Hoppe, "Progressive Meshes," Computer Graphics Proceedings, 99–108, 1996.
Kirkpatrick, "Optimal Search in Planar Subdivisions," Siam J. Comput., 12:28–35, 1983.
Kumar et al, "Hierarchical Visibility Culling for Spline Models," Proceedings of Graphic Interface '96, 142–150 1996.
Kumar et al, "Interactive Display of Large–Scale NURBS Models," Symposium on Interactive 3D Graphics, 51–58, 1995.
Lindstrom et al, "Real–Time, Continuous Level of Detail Rendering of Height Fields," Computer Graphics SIGGRAPH'96, 1996.
Rockwood et al, "Real–Time Rendering of Trimmed Surfaces," Computer Graphics, 23:108–116, 1989.
Scarlatos, "A Refined Triangulation Hierarchy for Multiple Levels of Terrain Detail," IMAGE V Conference, 115–122, Jun. 1990.
Shirman et al, "The Cone of Normals Technique for Fast Processing of Curved Patches," Eurographics '93, 12:C261–C272, 1993.
Taylor et al, "An Algorithm for Continuous Resolution Polygonalizations of a Discrete Surface," Graphics Interface '94, 33–42, May 1994.
Xia et al, "Dynamic View–Dependent Simplification for Polygonal Models," IEEE, 327–498, 1996.

Primary Examiner—Mark R. Powell
Assistant Examiner—Motilewa Good-Johnson
Attorney, Agent, or Firm—Klarquist Sparkman Campbell Leigh & Whinston, LLP

[57] ABSTRACT

A general method and system for adaptively refining an arbitrary progressive mesh representation for a graphical geometric model is presented. A real-time method for adaptively refining and coarsening the mesh according to a set of selective refinement criteria method is presented. The adaptive refinement method uses a constrained set of mesh transformations, and a set of selective refinement criteria to approximate a graphical object. The adaptive refinement method can be used to exploit view coherence, and can be used with non-view dependent parameters. For continuous changes in the parameters used in the set of selective refinement criteria, the adaptive refinement method can be amortized over consecutive frames, and smooth visual transitions (geomorphs) can be constructed between any two adaptively refined meshes used to represent a graphical object or image.

50 Claims, 41 Drawing Sheets

(17 of 41 Drawing Sheet(s) Filed in Color)

PRIOR ART

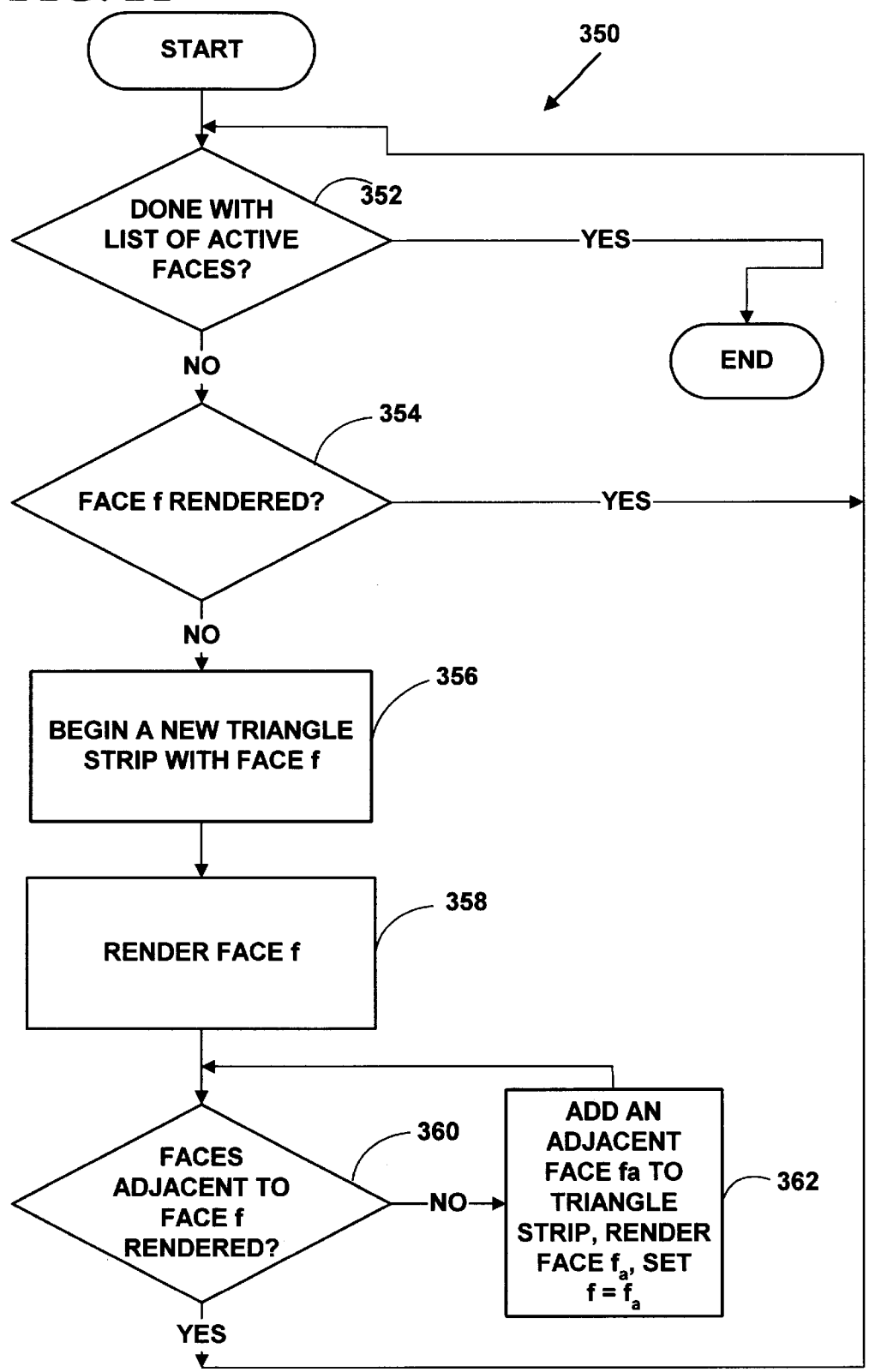

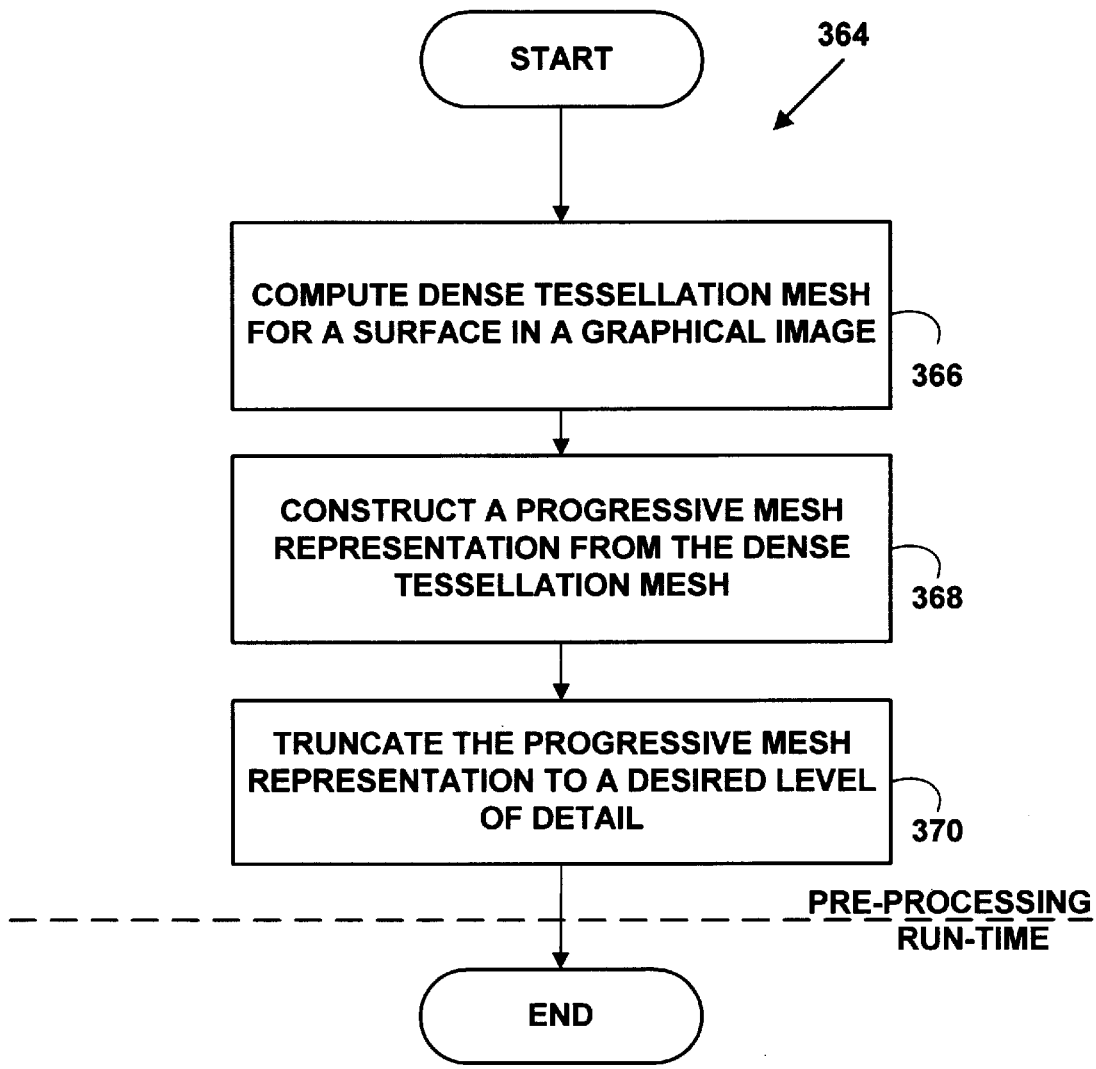

METHOD AND SYSTEM FOR ADAPTIVE REFINEMENT OF PROGRESSIVE MESHES

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights.

FIELD OF INVENTION

The present invention relates to computer graphics. More particularly it relates to rendering complex geometric models for graphical objects in graphical images.

BACKGROUND AND SUMMARY OF THE INVENTION

Rendering complex geometric models at interactive rates is a challenging problem in computer graphics. While rendering performance is continually improving, significant gains can be obtained by adapting the complexity of a geometric model to the contribution the model makes to a specific rendered graphical image. Within traditional modeling systems known in the computer graphics art, detailed geometric models are created by applying versatile modeling operations (e.g., extrusion, constructive solid geometry, and freeform deformations) to a vast array of geometric primitives used to define a graphical object or image. The geometric primitives typically include triangles, polygons, and other mullet-sided shapes. For efficient display, the resulting geometric models are typically transformed into polygonal approximations of geometric primitives called "meshes."

A mesh has a geometry denoted by a tuple (K, V) where K is a simplicial complex specifying the connectivity of the mesh simplicies (i.e., the adjacency of the vertices, edges and faces), $V=\{v_1, \ldots v_m\}$, is the set of vertex positions defining the shape of the mesh in $R^3$ space. That is, a parametric domain $|K| \subset R^m$ is constructed by identifying a vertex K with a canonical basis vector of $R^m$, and defining the mesh as an image $\phi v(|K|)$ where $\phi v: R^m \to R^3$ is a linear map. For more information on meshes, see *Mesh Optimization*, by Hugues Hoppe, T. DeRose, F. Duchamp, J. McDonald, and W. Stuetzle, ACM SIGGKAPH'93 Proceedings, pp. 19–26.

Many geometric models in computer graphics are represented using triangle meshes. Geometrically, a triangle mesh is a piecewise linear surface with multiple triangular faces joined together at their edges. One common technique for using meshes to display a graphical object or image is to create several versions of a geometric model at various levels Of Detail (LOD) using progressive meshes. Such LOD meshes can be computed automatically using various mesh simplification techniques known in the art.

A Progressive Mesh (PM) representation is also used to capture a continuous sequence of meshes optimized for view-independent LOD control. Progressive meshes allow for fast traversal of the mesh sequence at run-time. For more information see *Progressive Meshes*, by Hugues Hoppe, ACM SIGGRAPH'96 Proceedings, pp. 99–108. Sets or sequences of view-independent progressive LOD meshes are appropriate for many computer graphic applications. However, there are several problems associated with using view-independent progressive LOD meshes when rendering large-scale geometric models such as a graphical terrain or other graphical environments that may surround a viewer.

One problem is that a large number of individual polygons or faces of the geometric model may lie outside a viewer's chosen view frustum (i.e., a view plane), and thus do not contribute to graphical object or image when it is rendered. Even though the faces which lie outside the view frustum are eventually culled (i.e., discarded), processing resources are wasted during rendering of a graphical image or object because the same levels of detail that is applied within the view frustum are also applied to faces outside the view frustum.

Another problem is the unnecessary rendering of faces oriented away from the viewer. Such faces are typically culled during rendering using a "backfacing" test However, this backfacing test again wastes significant processing resources during rendering.

Yet another problem is that within the view frustum some regions of the model may lie much closer to the viewer than others. Progressive LOD meshes fail to provide the appropriate level of detail over the entire geometric model to handle such regions.

Some of these problems can be addressed by representing a graphical scene hierarchically as a hierarchy of meshes. Parts of the scene can be adjusted independently for each mesh in the hierarchy. However, establishing such hierarchies on continuous surfaces of a graphical object or image presents additional challenging problems.

One problem associated with establishing culling hierarchies is that visual "cracks" may appear in the progressive LOD meshes. For example, if a mesh representing a graphical terrain is partitioned into blocks, and the blocks are rendered at different levels of detail, cracks may appear in the terrain as it is displayed. In addition, the progressive LOD mesh block boundaries are unlikely to correspond to natural features in the terrain surface, resulting in sub-optimal approximations. Similar problems also arise in adaptive tessellation of smooth parametric surfaces.

Specialized methods known to those skilled in the graphical arts have been developed to adaptively refine meshes for the cases of height fields for graphical terrains, and some parametric surfaces. However, these methods cannot be applied in a general manner to an arbitrary mesh.

As is known in the art, a mesh can be refined using a set of constraints on a set of mesh transformations and a set of fixed refinement criteria. For example, a progressive mesh representation can be refined with a set of mesh transformations including an edge collapse operation and a vertex split operation constrained by a set of vertices. The set of fixed refinement criteria includes placing all candidate edges for edge collapse into a priority queue where the priority of each transformation is an energy cost that is used to fit a small number of points from the initial mesh into a mesh in the progressive mesh representation. For more information, see the *Progressive Meshes* paper cited above.

Refining a progressive mesh representation with fixed set of refinement criteria presents a number of problems. The set of constraints used and the set of fixed refinement criteria used for progressive meshes are not adequate for adaptively refining a progressive mesh representation. During adaptive refinement, areas of a progressive mesh representation will be refined (e.g., an area pointed toward a viewer) while other areas of the same progressive mesh representation will be coarsened (e.g., an area pointed away from a viewer). The set of constrained mesh transformations and the set of fixed refinement criteria used for progressive meshes are also not adequate for adaptively refining an arbitrary progressive mesh representation.

In accordance with an illustrative embodiment of the present invention, the problems associated with progressive LOD meshes, culling hierarchies and adaptively refining progressive mesh representations are overcome. A method and system are described for adaptively refining an arbitrary progressive mesh according to changing view-dependent parameters. A general method for adaptively refining an arbitrary progressive mesh with a set of constrained mesh transformations using a set of selective refinement criteria is also presented.

The method for adaptively refining an arbitrary progressive mesh according to changing view-dependent parameters includes re-parameterizing a progressive mesh representation $M^R$ to create a re-parameterized progressive mesh representation $M^{RE}$. The re-parameterizing includes the selection of new vertices, faces or edges from a sequence of N-data structure records associated with the progressive mesh $M^R$ representation. A vertex hierarchy is constructed on the re-parameterized progressive mesh representation $M^{RE}$. The construction of the vertex hierarchy is done using a traversal of re-parameterized vertices. However, other construction techniques could also be used.

The vertex hierarchy forms a "forest" of tree structures in which the "root" nodes are the vertices of a progressive mesh representation (e.g., $M^R$) and the "leaf nodes" are the vertices of a re-parameterized mesh representation (e.g., $M^{RE}$). However, other types of vertex hierarchies could also be used. The establishment of the vertex hierarchy allows creation of refinement dependencies for vertices re-parameterized in the re-parameterized progressive mesh representation $M^{RE}$.

Values for a set of selective refinement criteria are pre-computed to make the run-time evaluation of the set of selective refinement criteria faster. In an alternative embodiment of the present invention, the set of selective refine criteria is completed at run-time.

At run-time an indication is received that one or more view-dependent parameters have changed. The re-parameterized progressive mesh representation $M^{RE}$ is adaptively refined using the vertex hierarchy, the pre-computed selective refinement criteria, and run-time computed selective refinement criteria to create an adaptively refined mesh. Adaptively refining the parameterized progressive mesh representation $M^{RE}$ includes refining areas of $M^{RE}$ with a series of constrained transformations as well as coarsening other areas of $M^{RE}$ with a series of constrained transformations.

The system for an illustrative embodiment of the present invention includes a locator/constructor module for constructing an arbitrary progressive mesh representation; a pre-processing module for loading the progressive mesh representation into a memory of a computer system, re-parameterizing the progressive mesh representation and performing pre-processing on a set of selective refinement criteria; and a renderer module for receiving changes in view-dependent parameters, evaluating selective refinement criteria, adaptively refining a re-parameterized progressive mesh representation, and rendering active faces. However, the system can include more or fewer modules and can combine functionality of the modules into more or fewer modules.

The general method for adaptively refining an arbitrary progressive mesh with a set of constrained mesh transformations using a set of selective refinement criteria includes selecting an arbitrary progressive mesh representation. A set of mesh transformations, constraints on the set of mesh transformations, and a set of selective refinement criteria are selected. At run-time, the refinement of the progressive mesh representation is adjusted by adding geometric primitives to the progressive mesh representation using the constrained set of mesh transformations and the set of selective refinement criteria to create a first approximation of a selectively refined mesh. The selectively refined mesh is adaptively refined by navigating through the selectively refined mesh. Adaptive refinement allows areas of the selectively refined mesh to be further refined, while other areas of the same selectively refined mesh are coarsened. This method allows an arbitrary progressive mesh representation for an arbitrary geometric model to be adaptively refined. The method is also very flexible as a developer can choose the set of selective refinement criteria. The selective refinement criteria can be view-dependent, or based on some other set of dependencies providing flexibility to adaptively refine a progressive mesh representation for a large number of purposes.

The foregoing and other features and advantages of the illustrative embodiment of the present invention will be more readily apparent from the following detailed description, which proceeds with reference to the accompanying drawings.

BRIEF DESCRIPTION OF THE DRAWINGS

The file of this patent contains at least one drawing executed in color. Copies of this patent with color drawings(s) will be provided by the Patent and Trademark Office upon request and payment of the necessary fee.

Certain ones of the drawings executed in color are images of meshes created from datasets which were originally created and copyrighted by Viewpoint Datalabs International of Provo, Utah.

FIG. 21 is a flow diagram illustrating a method for generating triangle strips.

FIG. 22 is a flow diagram illustrating a method for adaptive tessellation of parametric surfaces.

DETAILED DESCRIPTION OF AN ILLUSTRATIVE EMBODIMENT

Figure 1:
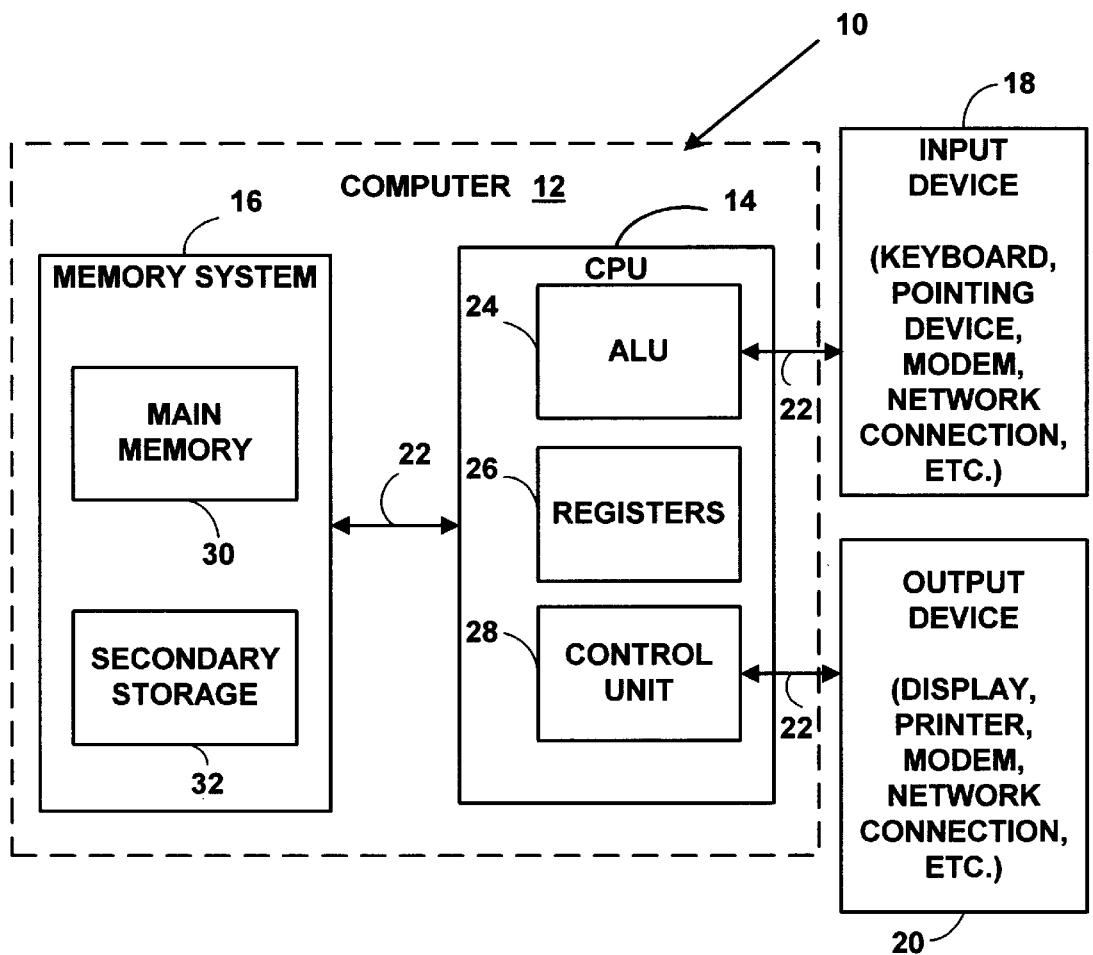
FIG. 1 is a block diagram of a computer system used to implement an illustrative embodiment of the present invention.

FIG. 1 is a block diagram of a computer system used to implement an illustrative embodiment of the present invention. Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an AILU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g., a microphone, etc.), or any other device providing input to the computer system 10. The output device 20 can comprise a display, a printer, an audio device (e.g., a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software instructions which controls the computer system s operation and the allocation of resources. The application program is a set of software instructions that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, and any other volatile or non-volatile mass storage system readable by the computer 12. The computer readable medium includes cooperating or interconnected computer readable media, which exist exclusively on computer system 10 or are distributed among multiple interconnected computer systems 10 that may be local or remote.

Rendering a Graphical Object

To generate a graphical object, detailed geometric models are created by applying modeling operations to geometric primitives used to define the graphical object. The geometric primitives typically include triangles, polygons and other multi-sided shapes. To render a graphical image, graphical objects are processed and the resulting graphical image is stored in a frame buffer (e.g., memory system 16). The frame buffer contains a frame of graphical data. The rendered image data is then transferred to a display (e.g., display 20). Graphical data is stored in frames of a pre-determined size (e.g., 3 mega-bytes). A graphical image is typically rendered frame-by frame. For more information on rendering, see *Fundamentals of Interactive Computer Graphics*, 2nd Edition, by J. D. Foley and A. Van Dam, Addison-Wesley Publishers.

For efficient display in a frame, the resulting geometric models for a graphical image containing one or more graphical objects are typically transformed into polygonal approximations of geometric primitives called "meshes." A mesh has a geometry denoted by a tuple (K, V) where K is a simplicial complex specifying the connectivity of the mesh simplicies (i.e., the adjacency of the vertices, edges and faces). $V=\{v_1, \ldots v_m\}$, is the set of vertex positions defining the shape of the mesh in $R^3$ space. That is, a parametric domain $|K| \subset R^m$ is constructed by identifying a vertex K with a canonical basis vector of $R^1$, and defining the mesh as an image $\phi v(|K|)$ where $\phi v: R^m \rightarrow R^3$ is a linear map. One common technique for using meshes to display a graphical object is to create several versions of a geometric model at various view-independent Levels Of Detail (LOD) using progressive meshes.

Progressive Meshes

If M is the set of all possible meshes, a progressive mesh representation $M^{PM}$ of an arbitrary mesh $M^A$ where $M^A \in M$, and $M^{PM} \subset M$, defines a continuous sequence of mesh approximations $M^i$ for $i=\{0, \ldots, n-1\}$, $M^0, M^1, \ldots, M^{n-1}$ of increasing accuracy from which view-independent level-of-detail approximations of any desired complexity can be efficiently retrieved. To create a progressive mesh representation $M^{PM}$ for a geometric mode;, an arbitrary mesh $M^A$ is simplified through a sequence of edge collapse (ecol) operations to yield a much simpler base mesh $M^0$ with a fixed set of refinement criteria. An illustrative progressive mesh simplification operation using edge collapses known in the art is shown in equation 1.

$$(M^A = M^n) \rightarrow ecol_{n-1} \rightarrow \ldots ecol_1 \rightarrow M^1 ecol_0 \rightarrow M^0 \quad (1)$$

Figure 2:
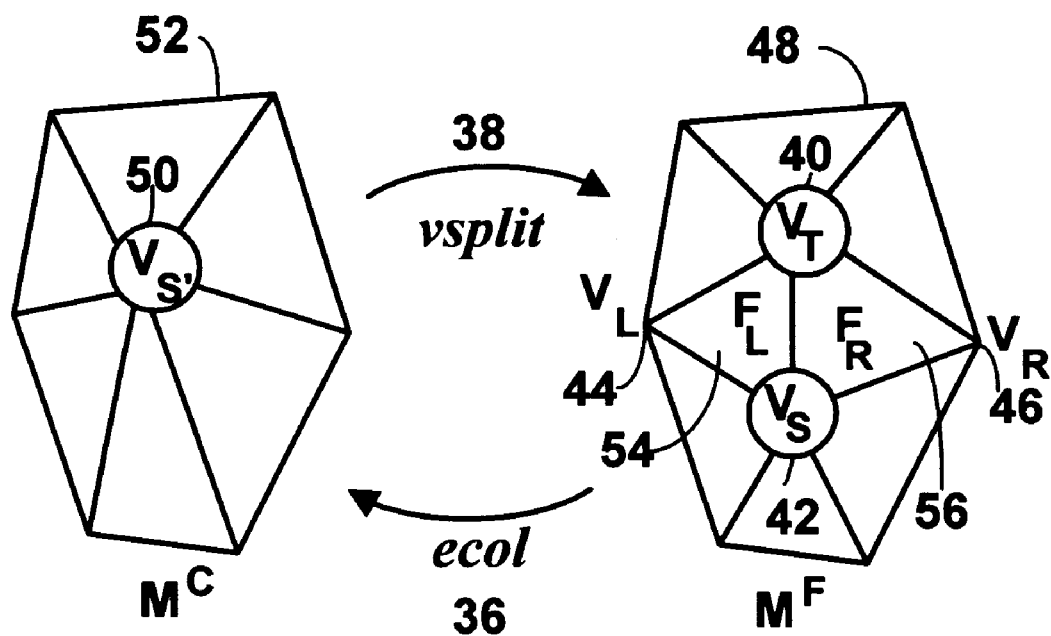
FIG. 2 is a block diagram of vertex split and edge collapse operations from the prior art.

FIG. 2 is a block diagram illustrating an edge collapse operation 36 and a vertex split operation 38 known in the art. Edge collapse operation 36, parameterized as $ecol(v_S, v_L, v_R, v_T, F_L, F_R)$, unifies 2 adjacent vertices $v^S$ 40 and $v_T$ 42 between two additional vertices $v_L$ 44 and $v_R$ 46 from a refined mesh $M^F$ 48 into a single vertex $v_s'$ 50 on a coarser mesh $M^C$ 52. Coarser mesh $M^C$ 52 can be a final base mesh $M^0$ or another intermediate coarser mesh $M^C$ (e.g., $M_1$, $M^2, \ldots$, etc.) in the progressive mesh representation. Vertex $v_T$ 40 and faces $F_L$ 54 and $F_R$ 56 associated with the vertex $v_T$ 40 vanish in the edge collapse operation. A new mesh position is specified for the unified vertex $v_s'$ 50.

Edge collapse operation 36 has an inverse called a vertex split (vsplit) operation 38. An illustrative progressive mesh refinement operation using vertex splits is shown in equation 2.

$$M^0 \rightarrow vsplit_0 \rightarrow M^1 vsplit_1 \rightarrow \ldots M^{n-1} \rightarrow vsplit_{n-1} \rightarrow (M^n = M^A) \quad (2)$$

Refined mesh $M^F$ 48 can be a triangular mesh $M^\wedge$ or any mesh in the progressive mesh sequence (e.g., $M^{n-1}$, $M^{n-2}, \ldots$ etc.) shown in equation 2. A vertex split operation, parameterized as $vsplit(v_s, v_L, v_R)$, modifies the coarser mesh $M^C$ 52 by introducing one new vertex $v_T$ 42 and two new faces $F_L$ 54 and $F_R$ 56. Face $F_L$ 54 is defined by three vertices $F_L = \{v_s, v_L, v_T\}$ (42,44,40). Face $F_R$ 56 is defined by three vertices $F_R = \{v_S, v_R, v_T\}$ (42,46,40). The resulting sequence of meshes, $M^0, \ldots, M^n = M^A$ is effective for view-independent Level of Detail (LOD) control. For more information on progressive meshes using fixed refinement criteria, see *Progressive Meshes*, by Hugues Hoppe, ACM SIGGRAPH'96 Proceedings, pp. 99—108.

Figure 3A:
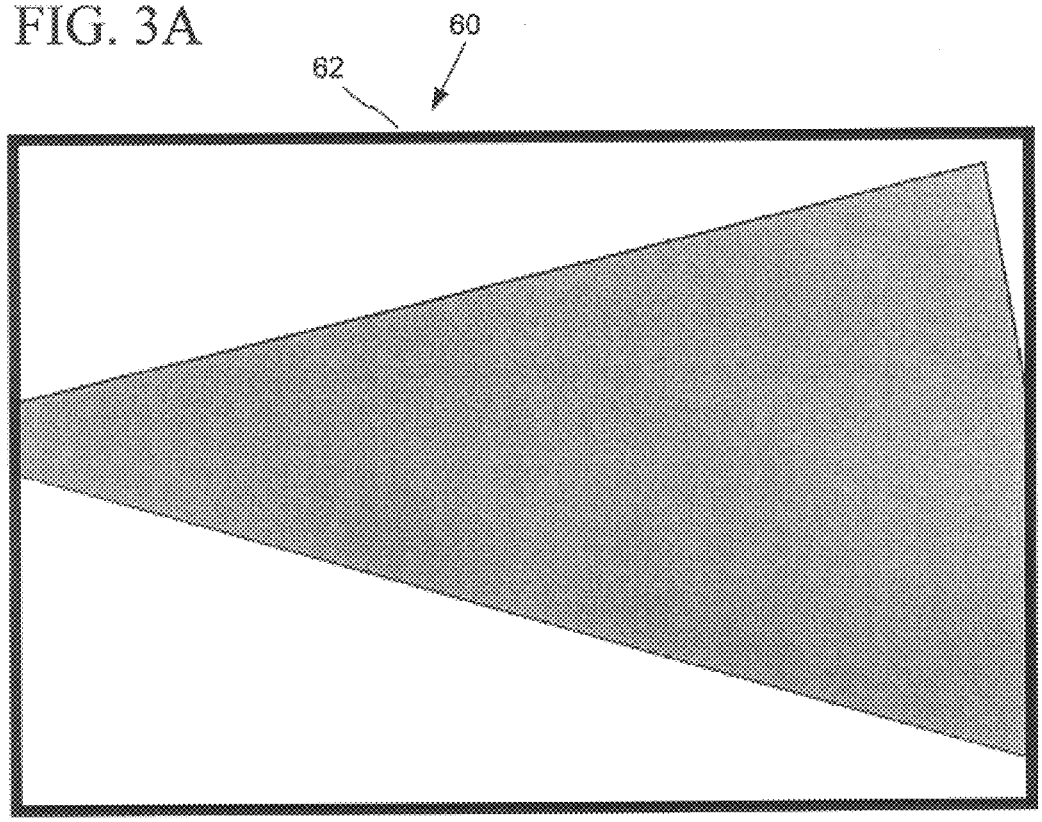
FIGS. 3A–3D are a sequence of color screen displays of a progressive mesh for a terrain grid using the vertex split and edge collapse operations from FIG. 2.
Figure 3B:
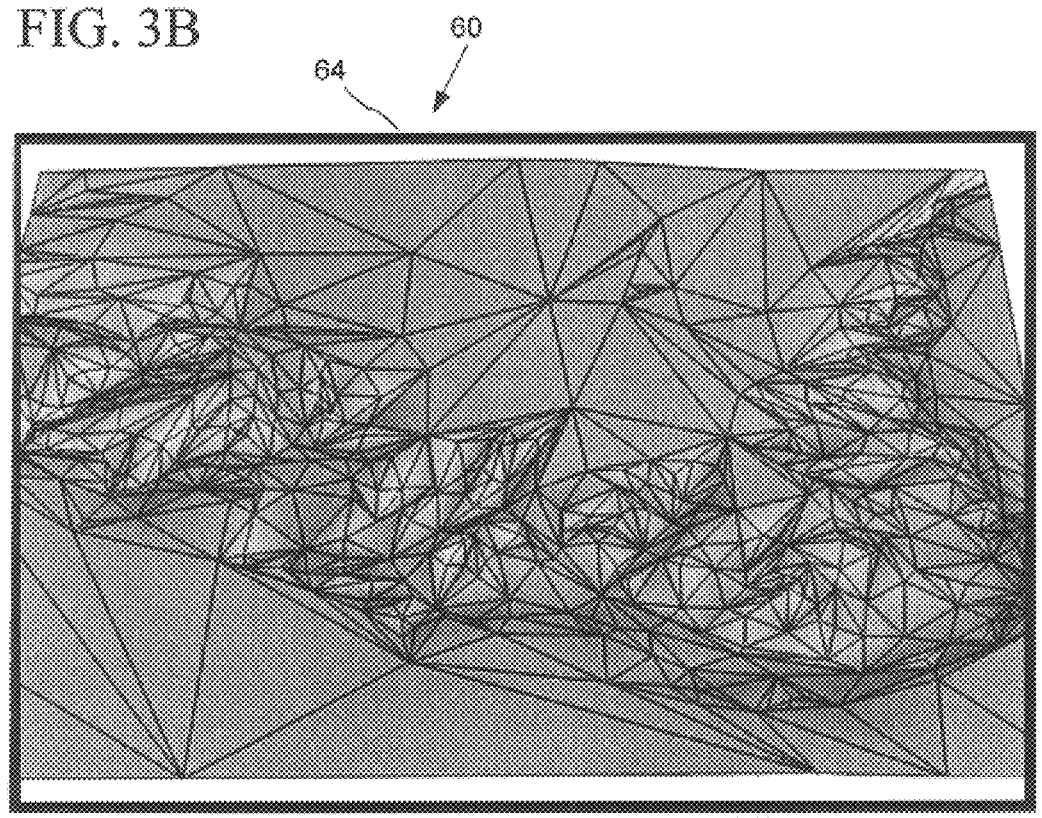
Figure 3C:
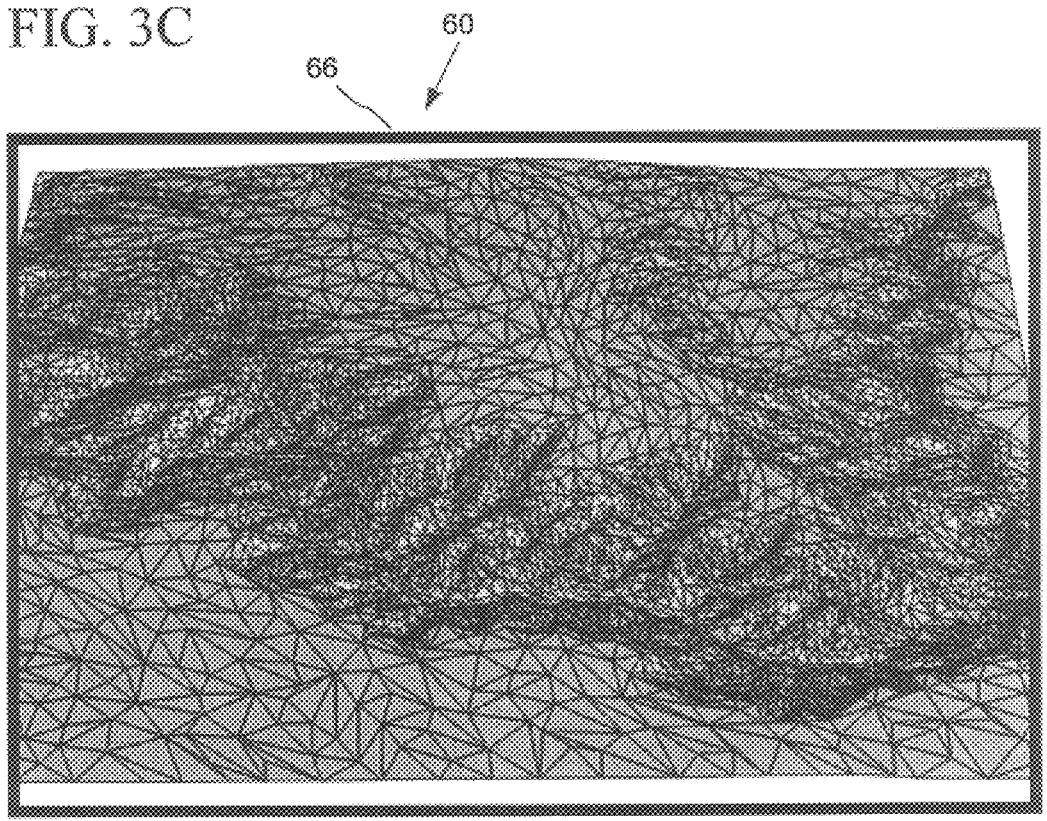
Figure 3D:
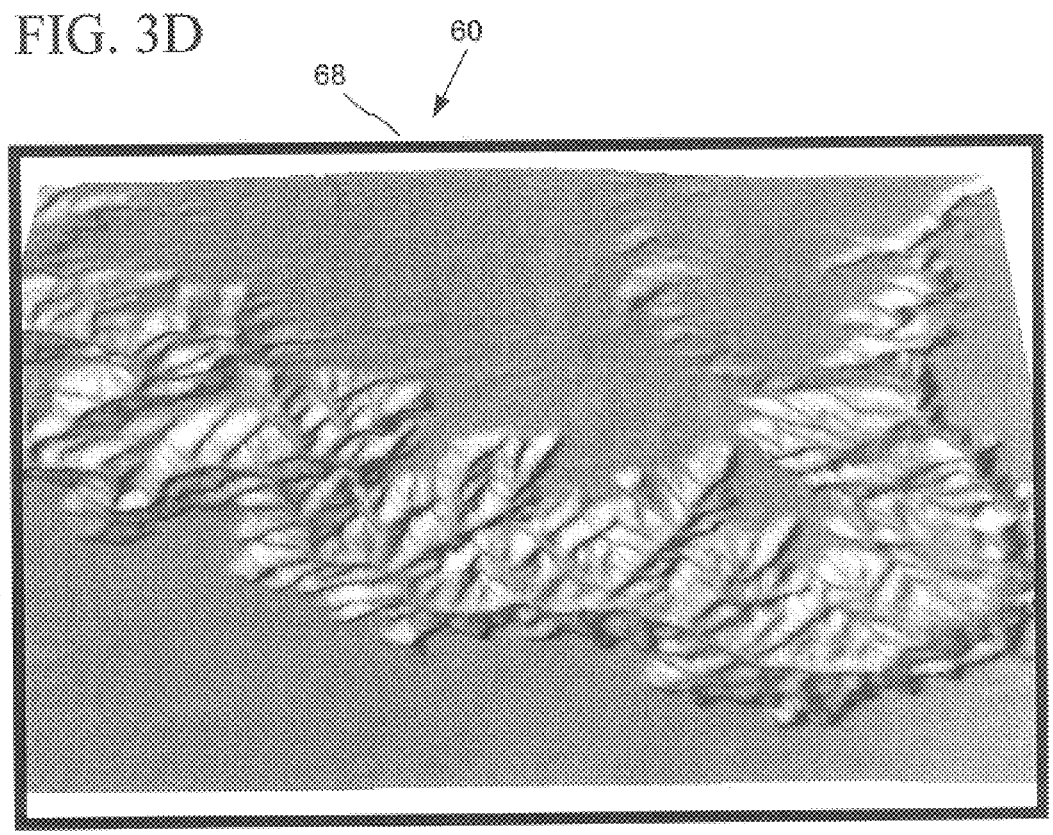

FIGS. 3A–3D are a sequence of color block diagrams 60 illustrating screen displays of a view-independent progressive mesh representation for a terrain grid. Vertex split operation 38 is iteratively applied to a base mesh $M^0$ 62. For example, in FIG. 3A, a coarser base mesh $M^0$ 62 has 3 vertices and 1 face defining a triangle, while a most refined mesh $M^n$ 68 in FIG. 3D has 200×200 vertices, 79,202 faces and defines a graphical image of a complex terrain. FIGS. 3B and 3C illustrate color screen displays (64, 66) of intermediate meshes $M^{514}$ and $M^{5066}$ with 1,000 and 10,000 faces respectively. Coarser base mesh $M_0$ 62 can be recovered from refined mesh $M^n$ 68 by iteratively applying edge collapse operation 36 to refined mesh $M^n$ 68.

Progressive meshes manipulated with operations shown in equations 1 and 2 leave some major problems unaddressed. For example, progressive meshes are typically not designed to ensure good real-time performance for selective or adaptive refinement during the rendering process, and fail to measure screen space geometric error.

View-dependent refinement of progressive meshes

Figure 4:
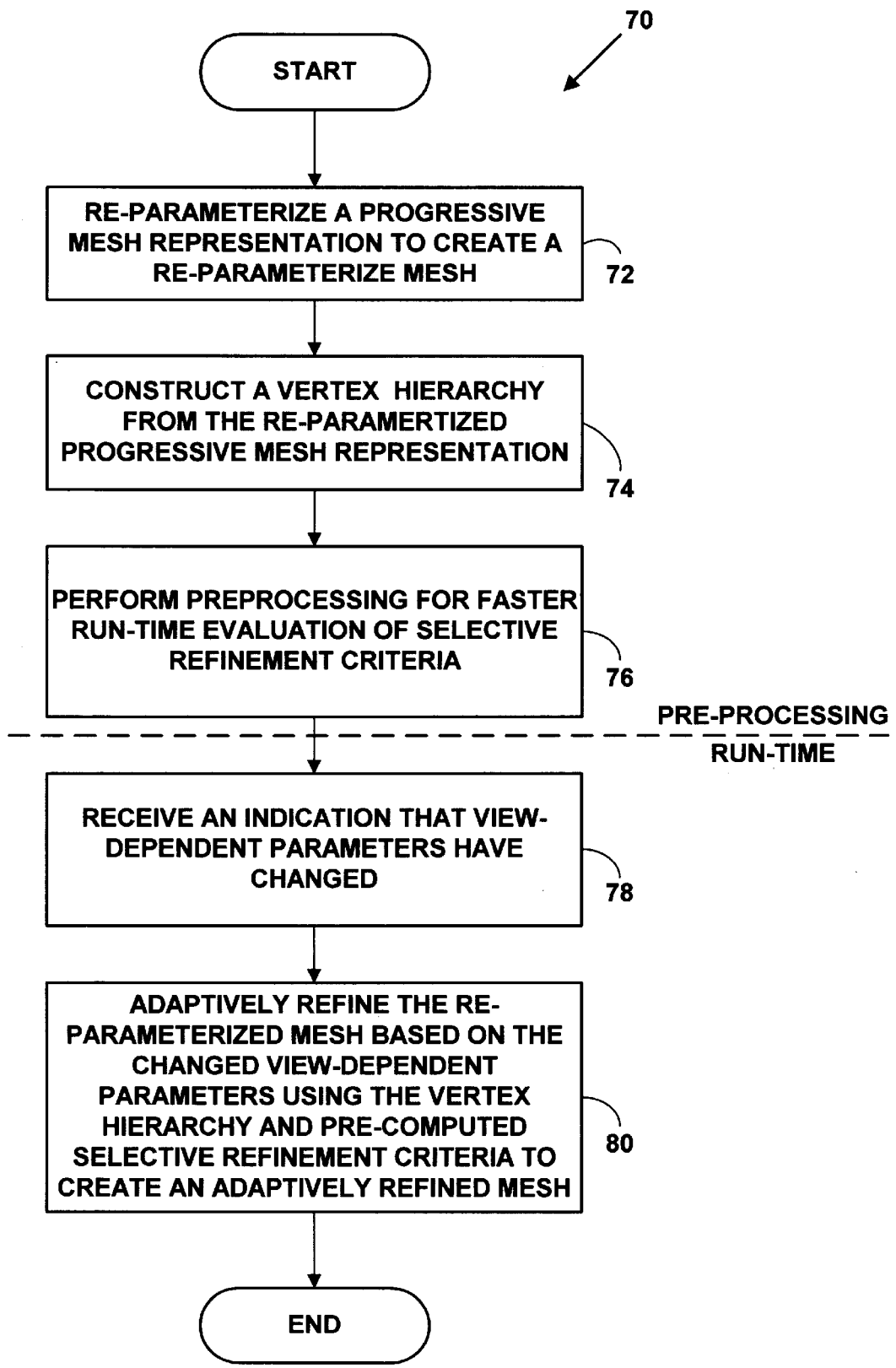
FIG. 4 is a flow diagram illustrating a method for adaptively refining an arbitrary progressive mesh representation according to changing view-dependent parameters.

The progressive meshes shown in FIGS. 3A–3D, created with equations 1 and 2 are view-independent and created with a fixed set of refinement criteria. FIG. 4 is a flow diagram illustrating a method 70 for adaptively refining an arbitrary progressive mesh $M^A$ according to changing view-dependent parameters for an illustrative embodiment of the present invention. Method 70 is implemented as an application program in memory 16 of computer system 10 in an illustrative embodiment of the present invention. However, other implementations can also be used. Method 70 includes re-parameterizing a progressive mesh representation $M^R$ to create a re-parameterized progressive mesh representation $M^{RE}$ at step 72. The re-parameterizing includes the selection of new vertices, faces and edges from a sequence of N-data structure records associated with the progressive mesh representation $M^R$. At step 74, a vertex hierarchy is constructed on the re-parameterized progressive mesh representation $M_{RE}$. The construction of the vertex hierarchy is done using a traversal of re-parameterized vertices. However, other construction techniques could also be used. The vertex hierarchy forms a "forest" of tree structures in which the "root" nodes are the vertices of a progressive mesh representation (e.g., $M^R$) and the "leaf nodes" are the vertices of a re-parameterized mesh representation (e.g., $M^{RE}$). However, other types of vertex hierarchies could also be used. The establishment of the vertex hierarchy allows creation of refinement dependencies for vertices re-parameterized in the re-parameterized progressive mesh representation $M^{RE}$. Values for a set of selective refinement criteria are pre-computed to make the run-time evaluation of the set of selective refinement criteria faster at step 76. In an alternative embodiment of the present invention, step 76 is completed at run-time. Steps 72–76 are completed as pre-processing steps in an illustrative embodiment of the present invention. In an alternative embodiment of the present invention, steps 72–76 are completed at run-time.

At run-time, an indication is received that one or more view-dependent parameters have changed at step 78. The re-parameterized progressive mesh representation $M^{RE}$ is adaptively refined at step 80 using the vertex hierarchy, the pre-computed selective refinement criteria, and run-time computed selective refinement criteria to create an adaptively refined mesh. Adaptively refining the parameterized progressive mesh representation $M^{RE}$ includes refining areas of $M^{RE}$ with a series of constrained vertex split transformations as well as coarsening areas of $M^{RE}$ with a series of constrained edge collapse transformations. The constrained vertex split transformations and edge collapse transformations will be explained below.

The resulting adaptively refined mesh requires fewer polygons (e.g., triangles) for a given level of detail approximation, is a geometrically optimized sequence of vertex re-parameterizations with a small number of vertex dependencies for a selected geometric model based on changed view-dependent parameters.

Vertex split transformation

A progressive mesh representation $M^R$ is re-parameterized at step 72 (FIG. 4) using new constrained edge collapse and vertex split transformations. The constrained new edge collapse and new vertex split transformations are improvements over the progressive mesh operations shown in equations 1 and 2 above. The new edge collapse and new vertex split transformations take into account pairwise adjacent faces which are not considered in the transformations shown in equations 1 and 2.

Figure 5:
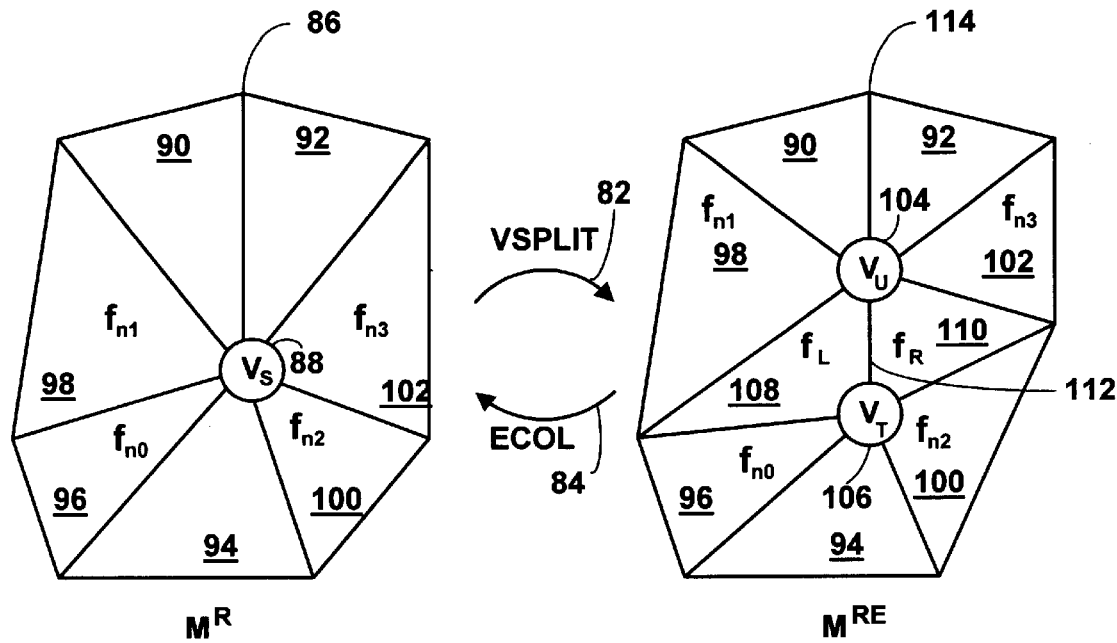
FIG. 5 is a block diagram illustrating new edge collapse and new vertex split transformations.

FIG. 5 is a block diagram illustrating a constrained vertex split transformation 82 and a constrained edge collapse transformation 84. As is illustrated in FIG. 5, an arbitrary progressive mesh representation $M^R$ 86 has a vertex $v_S$ 88 and multiple adjacent faces (90–102). Vertex split transformation 82, parameterized as vsplit($v_S$, $f_{n0}$, $f_{n1}$, $f_{n2}$, $f_{n3}$), determines a first set of pairwise adjacent faces $\{f_{n0}, f_{n1}\}$ (96–98) and a second set of pairwise adjacent faces $\{f_{n2}, f_{n3}\}$ (100–102) associated with parent vertex $v_S$ 88. In an illustrative embodiment of the present invention, the pairwise adjacent faces (i.e., a pair of adjacent faces) have a common border. However, other types of faces could also be used. In the illustrative example in FIG. 5, faces 96–98 and 100–102 were chosen as the sets of pairwise adjacent faces. However, other sets of pairwise adjacent faces could also be chosen (e.g., (94,100) and (90,92)). Parent vertex $v_S$ 88 is re-parameterized in progressive mesh representation $M^R$ 86 by replacing it with two child vertices $v^U$ 104 and $v_T$ 106 and two new faces $f_L$ 108 and $f_R$ 110. A first new face $f_L$ 108 is created between the first set of pairwise adjacent faces $\{f_{n0}, f_{n1}\}$ (96,98). A second new face $f_R$ 110 is created between the second set of pairwise adjacent faces $\{f_{n2}, f_{n3}\}$ (100, 102). The two new faces $f_L$ 108 and $f_R$ 10 share new edge 112 which connects child vertices $v_U$ 104 and $v_T$ 106. A first re-parameterized progressive mesh representation $M^{RE}$ 114 is formed by performing vertex split transformation 82 on the progressive mesh representation $M^R$ 86. Progressive mesh representation $M^R$ 86 can be recovered from re-parameterized progressive mesh representation $M^{RE}$ 114 with a new constrained edge collapse transformation 84 described below.

Vertex split transformation 82 is illustrated for a triangular progressive mesh representation $M^{\wedge}$ with vertices $\{v_1, v_2, v_3\}$ as is shown in Table 1.

TABLE 1

| Transformation on Mesh $M^{\wedge}$ | Vertex Split Transformation 82 | Active Vertices |
|---|---|---|
| $M^{\{s0\}}$ | $s_0 = \{\ \}$ | $M = \{v_1, v_2, v_3\}$ |
| $M^{\{s1\}}$ | $s_1 = \{s_0\}$<br>$v_2 \rightarrow v_4, v_5$ | $M = \{v_1, v_4, v_5, v_3\}$ |
| $M^{\{s2\}}$ | $s_2 = \{s_0, s_1\}$<br>$v_5 \rightarrow v_6, v_7$ | $M = \{v_1, v_4, v_6, v_7, v_3\}$ |
| $M^{\{s3\}}$ | $s_3 = \{s_0, s_1, s_2\}$<br>$v_3 \rightarrow v_8, v_9$ | $M = \{v_1, v_4, v_6, v_7, v_8, v_9\}$ |
| $M^{\{s4\}}$ | $s_4 = \{s_0, s_1, s_2, s_3\}$<br>$v_1 \rightarrow v_{10}, v_{11}$ | $M = \{v_{10}, v_{11}, v_4, v_6, v_7, v_8, v_9\}$ |
| $M^{\{s5\}}$ | $s_5 = \{s_0, s_1, s_2, s_3, s_4\}$<br>$v_7 \rightarrow v_{12}, v_{13}$ | $M = \{v_{10}, v_{11}, v_4, v_6, v_{12}, v_{13}, v_8, v_9\}$ |
| $M^{\{s6\}}$ | $s_6 = \{s_0, s_1, s_2, s_3, s_4, s_5\}$<br>$v_{10} \rightarrow v_{14}, v_{15}$ | $M = \{v_{14}, v_{15}, v_{11}, v_4, v_6, v_{12}, v_{13}, v_8, v_9\}$ |

Figure 9:
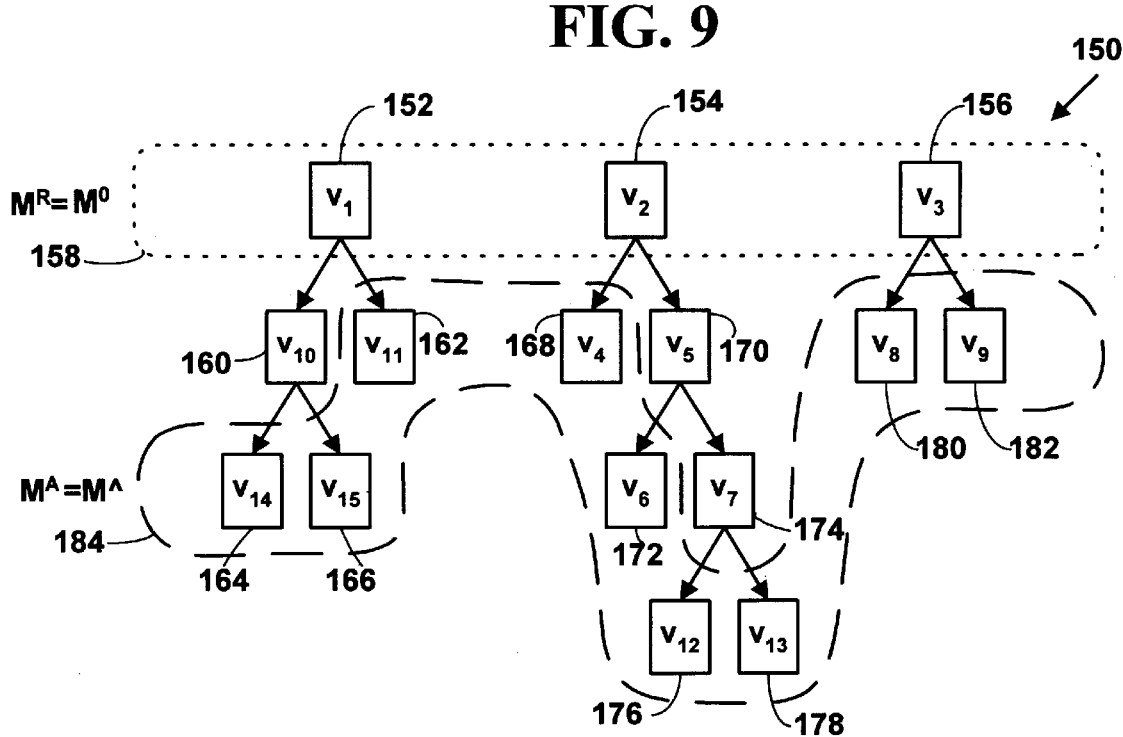
FIG. 9 is a block diagram illustrating a vertex hierarchy.

For example, a first vertex split transformation $s_1$ splits vertex $v_2$ into vertices $v_4$ and $v_5$, a second vertex split transformation $s_2$ splits vertex $v_5$ into vertices $v_6$ and $v_7$, etc. The initial coarser progressive mesh representation with vertices $\{v_1, v_2, v_3\}$ and the final re-parameterized progressive mesh representation with vertices $\{v_{14}, v_{15}, v_{11}, v_4, v_6, v_{12}, v_{13}, v_8, v_9\}$ are illustrated in FIG. 9.

Edge collapse transformation

Constrained edge collapse transformation 84, parameterized as ecol($v_S$, $v_T$, $v_U$, $f_L$, $f_R$, $f_{n0}$, $f_{n1}$, $f_{n2}$, $f_{n3}$), performs the inverse transformation of vertex split transformation 82. Edge collapse transformation 84 transforms re-parameterized mesh representation $M^{RE}$ 114 back into mesh representation $M^R$ 86 by removing the two new faces $f_L$ 108 and $f^R$ 110 and replacing child vertices $v_U$ 104 and $v_T$ 106 with parent vertex $v_S$ 88. Edge collapse transformation 84 is illustrated for a re-parameterized triangular progressive mesh representation $M^{\wedge}$ with vertices $\{v_{14}, v_{15}, v_{11}, v_4, v_6, v_{12}, v_{13}, v_8, v_9\}$ as is shown in Table 2.

TABLE 2

| Transformation on Mesh $M^{\wedge}$ | Edge Collapse Transformation | Active Vertices |
|---|---|---|
| $M^{\{e6\}}$ | $e_6 = \{\ \}$ | $M^{\wedge} = \{v_{14}, v_{15}, v_{11}, v_4, v_6, v_{12}, v_{13}, v_8, v_9\}$ |
| $M^{\{e5\}}$ | $e_5 = \{e_6\}$<br>$v_{14}, v_{15} \rightarrow v_{10}$ | $M = \{v_{10}, v_{11}, v_4, v_5, v_6, v_{12}, v_{13}, v_8, v_9\}$ |
| $M^{\{e4\}}$ | $e_4 = \{e_6, e_5\}$<br>$v_{12}, v_{13} \rightarrow v_7$ | $M = \{v_{10}, v_{11}, v_4, v_5, v_6, v_7, v_8, v_9\}$ |
| $M^{\{e3\}}$ | $e_3 = \{e_6, e_5, e_4\}$<br>$v_{10}, v_{11} \rightarrow v_1$ | $M = \{v_1, v_4, v_5, v_6, v_7, v_8, v_9\}$ |

TABLE 2-continued

| Transformation on Mesh M^ | Edge Collapse Transformation | Active Vertices |
|---|---|---|
| $M^{\{e2\}}$ | $e_2 = \{e_6, e_5, e_4, e_3\}$<br>$v_8, v_9 \rightarrow v_3$ | $M = \{v_1, v_4, v_5, v_6, v_7, v_3\}$ |
| $M^{\{e1\}}$ | $e_1 = \{e_6, e_5, e_4, e_3, e_2\}$<br>$v_6, v_7 \rightarrow v_5$ | $M = \{v_1, v_4, v_5, v_3\}$ |
| $M^{\{e0\}}$ | $e_0 = \{e_6, e_5, e_4, e_3, e_2, e_1\}$<br>$v_4, v_5 \rightarrow v_2$ | $M = \{v_1, v_2, v_3\}$ |

As can be seen in Table 2, re-parameterized triangular progressive mesh representation can be collapsed back into a triangular progressive mesh representation M^ with vertices $\{v_1, v_2, v_3\}$ using edge collapse transformation 84. Table 2 illustrates inverse of the transformations shown in Table 1.

Figure 6:
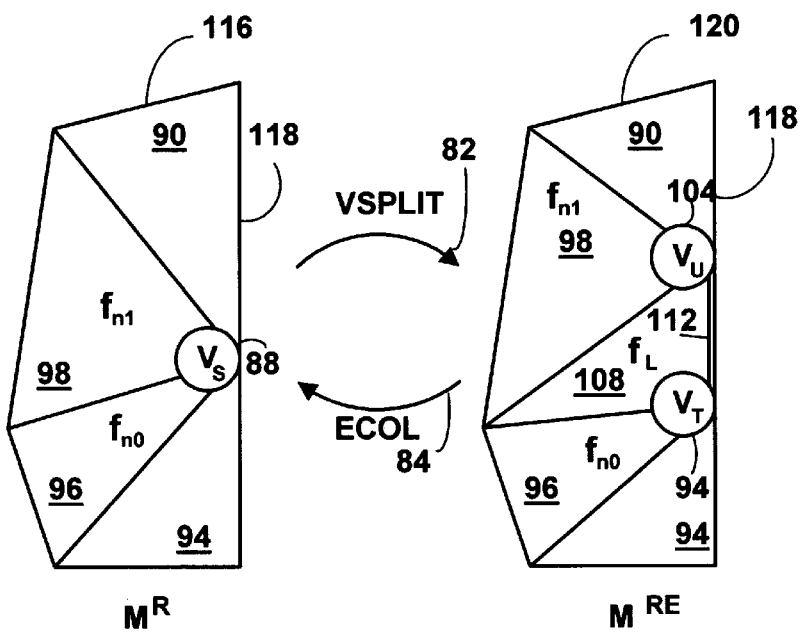
FIG. 6 is a block diagram illustrating a mesh with a boundary using the mesh transformations from FIG. 5.

FIG. 6 is a block diagram illustrating a progressive mesh 116 with a boundary 118. A boundary may occur in the original progressive mesh representation. To support a progressive mesh representation $M^R$ 116 with a boundary 118, a first set of pairwise adjacent faces $\{f_{n0}, f_{n1}\}$ (96–98) or a second set of pairwise adjacent faces $\{f_{n2}, f_{n3}\}$ (100,102) may not exist. For example in FIG. 6, pairwise adjacent faces for the set $\{f_{n2}, f_{n3}\}$ do not exist because of boundary 118. As a result, vertex split transformation 82 creates a single face $f_L$ 108 in a first re-parameterized boundary progressive mesh representation $M^{RE}$ 120 using only one set of pairwise adjacent faces (e.g., $\{f_{n0}, f_{n1}\}$ (96–98)) which exist in the mesh $M^R$ 116. Edge collapse transformation 84 removes single face $f_L$ 108 from the first re-parameterized boundary progressive mesh representation $M^{RE}$ 120 to re-create the boundary progressive mesh representation $M^R$ 116.

Method for constrained vertex split transformation

Figure 7:
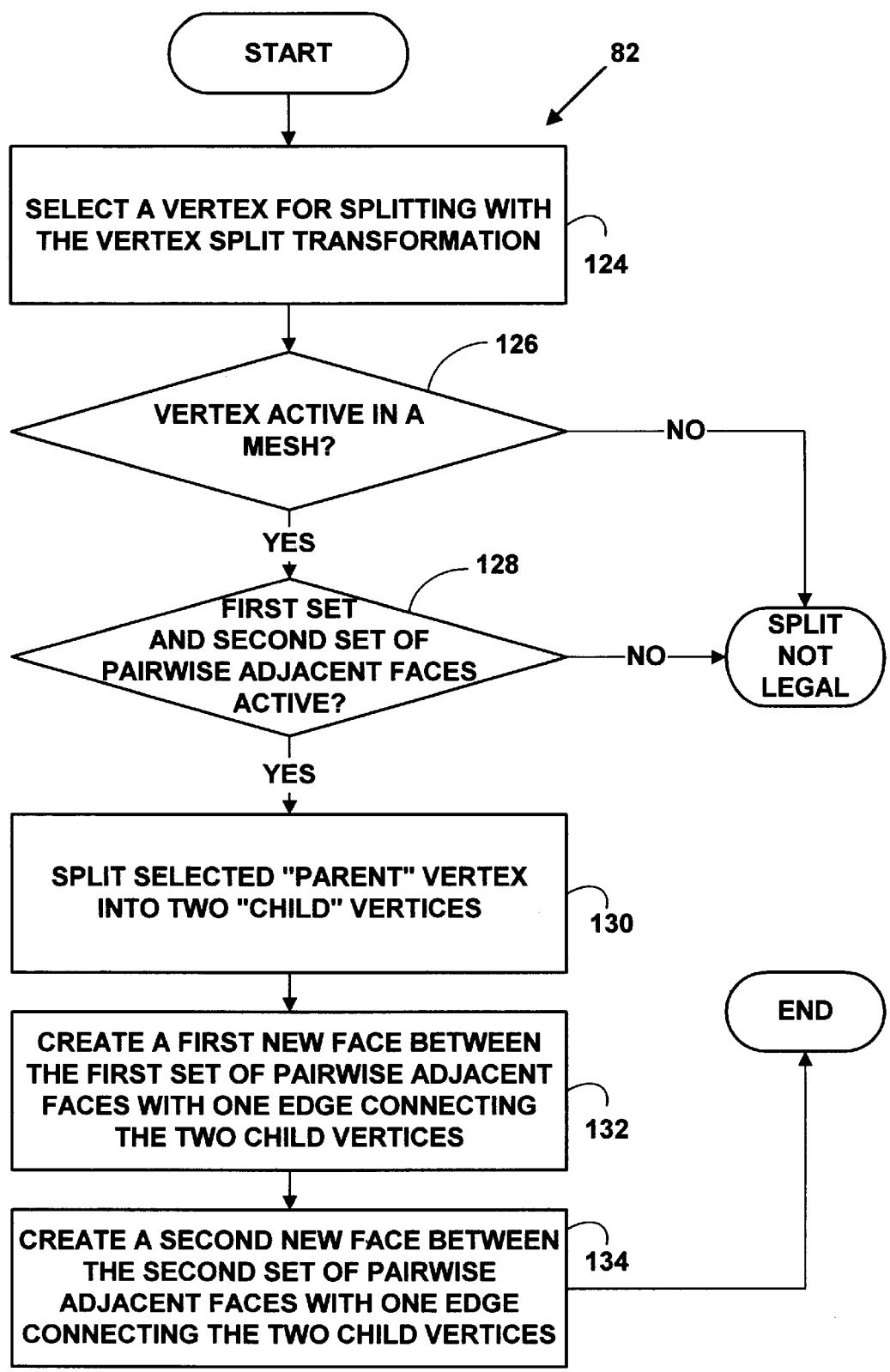
FIG. 7 is a flow diagram illustrating steps for the vertex split transformation shown in FIG. 5.

Vertex split transformation 82 is constrained by active vertices and faces in a progressive mesh representation. FIG. 7 is a flow diagram illustrating the steps of a method for vertex split transformation 82 illustrated in the block diagram in FIG. 5. A vertex is selected for splitting (e.g., vertex 88) at step 124. A check is done at step 126 to determine if the selected vertex is "active" in the progressive mesh representation. A vertex (or face) is "active" if it exists in the progressive mesh representation. If the selected vertex is not active at step 126, vertex split transformation 82 is not "legal" and cannot be immediately completed. If the selected vertex is active at step 126, then a check is made to determine if a first set of pairwise adjacent faces $\{f_{n0}, f_{n1}\}$ (e.g., 96,98) and a second set of pairwise adjacent faces $\{f_{n2}, f_{n3}\}$ (e.g., 100,102) adjacent to the selective vertex are active at step 128. If the two sets of pairwise adjacent faces are not active at step 128, vertex split transformation 82 is not "legal" cannot be immediately completed. If the first and second pairwise adjacent faces are active at step 128, then the selected vertex 88 is split into two child vertices (e.g., 104,106) at step 130. A first new face (e.g., 108) is created between the first set of pairwise adjacent faces (96,98) with one edge (e.g., 112) connecting the two new vertices (104, 106) at step 132. A second new face (e.g., 110) is created between the second set of pairwise adjacent faces (100, 102) with one edge 112 connecting the two new vertices (104, 106) at step 134. The resulting re-parameterized mesh representation $M^{RE}$ has the configuration which is illustrated in FIG. 5 by mesh 114.

Method for constrained edge collapse transformation

Figure 8:
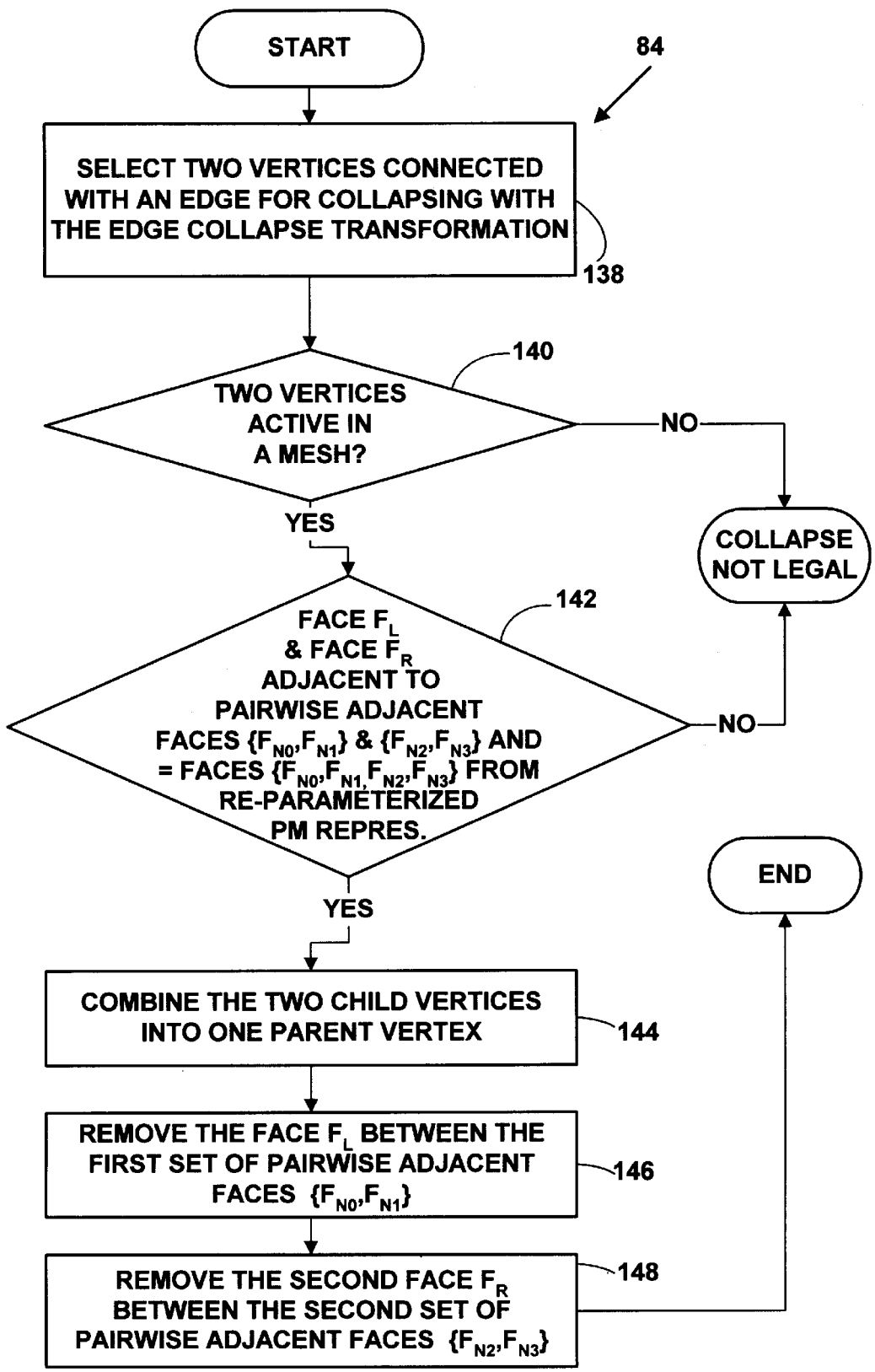
FIG. 8 is a flow diagram illustrating steps for the edge collapse transformation shown in FIG. 5.

Edge collapse transformation 84 is also constrained by active vertices and faces in a progressive mesh representation. FIG. 8 is a flow diagram illustrating a method for edge collapse transformation 84 shown in FIG. 5. A pair of vertices (e.g., 104,106) are selected for collapsing at step 138. A check is done at step 140 to determine if the selected vertices are active in the re-parameterized progressive mesh representation $M^{RE}$ 114. If the selected vertices (104,106) are not active, the edge collapse is not "legal" edge collapse transformation 84 cannot be immediately completed. If the two vertices are active at step 140, then a check is made at step 142 to determine if a first face $f_L$ and second face $f_R$ (e.g., 108,110) are active and if a first and second set of faces (e.g., (96,98) (100,102)) pairwise adjacent to the first and second faces (108,110) are active, and if the first and second set of faces $\{f_{n0}, f_{n1}, f_{n2}, f_{n3}\}$ (96–102) are equal to as set of faces $\{f_{n0}, f_{n1}, f_{n2}, f_{n3}\}$ in the re-parameterized progressive mesh representation $M^{RE}$. In an illustrative embodiment of the present invention, the first and second faces (108,110) have a common edge (e.g., 112) which connect the two vertices (104,106) selected at step 138. The first set of faces (96,98) is pairwise adjacent to the first face 108 and the second set of faces (100,102) is pairwise adjacent to the second face 110 as is illustrated in FIG. 5. If the check at step 142 is false, the edge collapse is not "legal" edge collapse transformation 84 cannot be immediately completed.

If the check at step 142 is true, then the two child vertices (104,106) are combined into one parent vertex 88 at step 144. The first face 108 between the first set of pairwise adjacent faces (96,98) is removed at step 146. The second face 110 is removed at step 148. The resulting progressive mesh representation $M^R$ 86 has a configuration which is illustrated in FIG. 5.

Constraints on vertex split transformation and edge collapse transformation

Vertex split transformation 82 and edge collapse transformation 84 are constrained by a set of constraints shown in Table 3.

TABLE 3

An edge collapse transformation 84 is legal if:
    1. Vertices $v_t$ and $v_u$ are both active vertices; and
    2. Faces adjacent to $f_L$ and $f_R$ are faces $\{f_{n0}, f_{n1}, f_{n2}, f_3\}$.
A vertex split transformation 82 is legal if:
    1. Vertex $v_s$ an active vertex; and
    2. Faces $\{f_{n0}, f_{n1}, f_{n2}, f_{n3}\}$ are all active faces.

However, more or fewer constraints can also be used. The constraints shown in Table 3 determine how vertex split transformation 82 and edge collapse transformation 84 can be used to re-parameterize a progressive mesh representation. The constraints take into account active vertices and faces.

Vertex hierarchy

After a progressive mesh representation has been re-parameterized at step 72, a vertex hierarchy is constructed at step 74 with vertex split transformation 82 and information from the re-parameterized mesh $M^{RE}$. As is known in the art, vertex hierarchies have been used with vertex split operations and edge collapse operations to create simplification hierarchies that allow selective refinement of a mesh in real-time. For more information, see *Dynamic View-Dependent Simplification for Polygonal Models*, by J. Xia and A. Varshney, IEEE Visualization'96 Proceedings, pp. 327–334.

Xia and Varshney precompute for a given triangular mesh M^ a merge tree in a bottom up direction. All vertices V^ are entered as leaves at level zero of the tree. Then, for each level l>=0, a set of edge collapse operations is selected to merge pairs of vertices, and the resulting proper subset of vertices is promoted to level (l+1). The edge collapse operations in level l are chosen based on edge lengths, but with the constraint that their neighborhoods do not overlap. The topmost level of the tree (i.e., the forest) corresponds to the vertices of a coarse mesh $M^0$.

At run-time, selective refinement is achieved by moving a vertex front up and down through the merge tree hierarchy. For consistency of the refinement, an edge collapse operation or a vertex split operation is identical to that in the precomputed mesh at level l; these additional characteristics are stored in the merge tree. As a result, the representation shares characteristics of quadtree-type hierarchies in the respect that only gradual changes are permitted from regions of high refinement to regions of low refinement.

Rather than restricting the construction of the vertex hierarchy based on edge lengths and constrain the hierarchy to a set of levels with non-overlapping transformations as is done by Xia and Varsheny, the vertex hierarchy is constructed from an arbitrary mesh by an optimized sequence of vertex split transformations 82 as to introduce as few dependencies as possible between the transformations. This minimizes the complexity of approximating meshes in an illustrative embodiment of the present of invention by using the constraints shown in Table 3. In addition, in an illustrative embodiment of the present invention, screen space approximation error is used which adapts mesh refinement to both surface curvature and viewing direction instead of just examining the ratio of an edge's length to its distance from the viewer as is done by Xia and Varshney.

In an illustrative embodiment of the present invention, $|V^R|$ and $|F^R|$ denote the number of vertices and faces in progressive mesh representation $M^R$ 86. Vertices and faces are numbered in the order that they are created in the vertex hierarchy at step 74 so that vertex split transformation 82 vsplit$_i$ introduces the vertices $v_{ti}=|V^R|+2i+1$, and $v_{ui}=|V^R|+2i+2$ for a vertex $v_{si}$ in the vertex hierarchy. For example, if i=0, and mesh $M^R$ has 3 vertices, then $v_{ti}=3+(2*0)+1=4$ and $v_{ui}=3+(2*0)+2=5$. Vertices are re-parameterized (i.e. $v_{si}=v_{ti}$, $v_{ui}$) as they are split, and this re-parameterization contributes to a small number refinement dependencies (e.g., child vertices $v_{t4},v_{u5}$ depend on parent vertex $v_{s1}$). The vertex hierarchy is constructed in a top-down manner using a simple tree structure traversal of vertex split information which is stored in C++ data structures described below (Table 4). However, other construction techniques may also be used.

A vertex hierarchy in an illustrative embodiment of the present invention is created as a "forest" of unbalanced tree structures (i.e., not all leaves are at the same depth). A vertex hierarchy with unbalanced tree structures produces a selectively refined mesh with fewer levels than one using balanced tree structures as a result of few dependencies introduced in the vertex hierarchy. However, balanced tree structures could also be used, A vertex hierarchy for a set of vertices which include parent vertices $v_{si}$ and child vertices $v_{ti}$ and $v_{ui}$ which form a forest of tree structures in which root nodes are the vertices of a coarsest mesh (e.g., base mesh $M^R=M^0$) and leaf nodes (are the vertices of a most refined mesh (e.g., original arbitrary mesh $M^A=M^N$).

FIG. 9 is a block diagram illustrating a vertex hierarchy 150. In an illustrative example in FIG. 9, three root vertices $v_1$, $v_2$, and $v_3$ (152–156) form a "forest" of root nodes for a progressive mesh representation $M^R=M^0$ 158 (e.g., a triangle). Vertex $v_2$ 154 has been split into two child vertices by vertex split transformation 82 and are numbered $v_4$ and $v_5$ (168–170) respectively (i.e. 3+(2*0)+1=4, 3+(2*0)+2=5). Vertex $v_5$ 170 has in turn been split into two child vertices $v_6$ 172 and $v_7$ 174 by vertex split transformation 82 and are numbered $v_6$ and $v_7$ (i.e., 3+(2*1)+1=6, 3+(2*1)+2=7). Vertex split transformation 82 is repeated for vertices $v_3$, $v_{10}$, and $v_7$ (156, 160, 174). A most refined mesh 184 (i.e., an original mesh $M^{\wedge}=M^n=M^A$) is formed from leaf node vertices (164, 166, 162, 168, 172, 176, 178, 180, 182) in vertex hierarchy 150 where M^ is an arbitrary triangular progressive mesh representation.

In an illustrative embodiment of the present invention re-parameterized mesh $M^{RE}$ is adaptively refined at step 80 using a "vertex front" through the vertex hierarchy 150 based on changing view-dependent parameters. A vertex front corresponds to one mesh approximation that is created using vertex split transformations 82 and edge collapse transformations 84 based on changing view-dependent parameters.

Data structures

Table 4 shows C++ data structures used for the N-data structure records for a progressive mesh representation an illustrative embodiment of the present invention. A re-parameterized mesh created at step 72 (FIG. 4) comprises an array of vertices and an array of faces which are stored using the data structures in Table 4. A vertex hierarchy created at step 74 (FIG. 4) also uses the data structures shown in Table 4. Only selected ones of the vertices and faces are active at any one time in a selectively refined progressive mesh. Active vertices and faces are specified with two doubly-linked lists that thread through a subset of N-data structure records comprising the progressive mesh sequence. However, other list structures could also be used.

TABLE 4

| | |
|---|---|
| struct ListNode{ | //Node possibly on a doubly-linked list |
| ListNode *next; | //0 if this node is not on the list |
| ListNode *prev; | |
| }; | |
| struct Vertex { | //list stringing active vertices V |
| ListNode active; | |
| Point point; | |
| Vector normal; | |
| Vertex* parent; | //0 if this vertex is in $M^o$ |
| Vertex* vt; | //0 if this vertex is in M^ |
| | //(vu==vt+1), so no storage field |
| //The remaining fields encode vsplit information, defined if vt!=0 | |
| Face* fl; | //(fr==fl+1), so no storage field |
| Face* fn[4]; | //required face neighbors fn0,fn1,fn2,fn3 |
| RefineInfo refine_info; | |
| }; | |
| struct Face { | |
| ListNode active; | //list stringing active faces |
| Vertex* vertices[3]; | //ordered counter-clockwise |
| Face* neighbors[3]; | //neighbors[i] across from vertices[i] |
| int matid; | //material identifier |
| }; | |
| struct SRMesh { | //Selectively refinable mesh |
| Array<Vertex>vertices; | //set of all vertices V |
| Array<Face>faces; | //set F^ of all faces |
| ListNode active_vertices; | //head of list $V \subseteq V$ |
| ListNode active_faces; | //head of list $F \subseteq F^{\wedge}$ |
| }; | |

The Vertex data structure in Table 4 uses the fields parent and vt to encode a parent vertex $v^s$ and a child vertex $v^t$ from the vertex hierarchy 150 shown in FIG. 9. If a parent vertex can be split with vertex split transformation 82, the fl and fn[4] fields (i.e., for $\{f_{n0}, f_{n1}, f_{n2}, f_{n3}\}$) encode the remaining parameters of vertex split transformation 82. Since $f_R=f_L+1$, and $v_t=v_u+1$ in the vertex hierarchy, there are no fields in the Vertex data structure for $f_R$ or $v_u$ as these values can be quickly calculated.

The Face data structure contains links to active faces with the field active, current vertices in the face with the field vertices[3], links to its current face neighbors with the field neighbors[3]. A material identifier matid is used for rendering. The data structure SRMesh is used to store a selectively refined mesh and is used to store the output from an adaptively refined mesh created at step 80 (FIG. 4).

View-dependent parameters

In an illustrative embodiment of the present invention, a set of selective refinement criteria are used to refine a progressive mesh representation. The set of selective refinement criteria include view-dependent parameters. The view-dependent parameters include a view frustum (i.e., a viewing plane), a surface orientation, and a screen space geometric error. However, more or fewer view-dependent parameters can be used, and each of the view-dependent parameters can be used individually (e.g., use only the view frustum, use only the surface orientation, etc.). When one or more of the view-dependent parameters changes at step 78 (e.g., a region of the re-parameterized progressive mesh $M^{RE}$ representation is now oriented towards a viewer) the re-parameterized progressive mesh representation $M^{RE}$ is adaptively refined to contain a different level-of-detail.

Selectively refinement criteria

Figure 10:
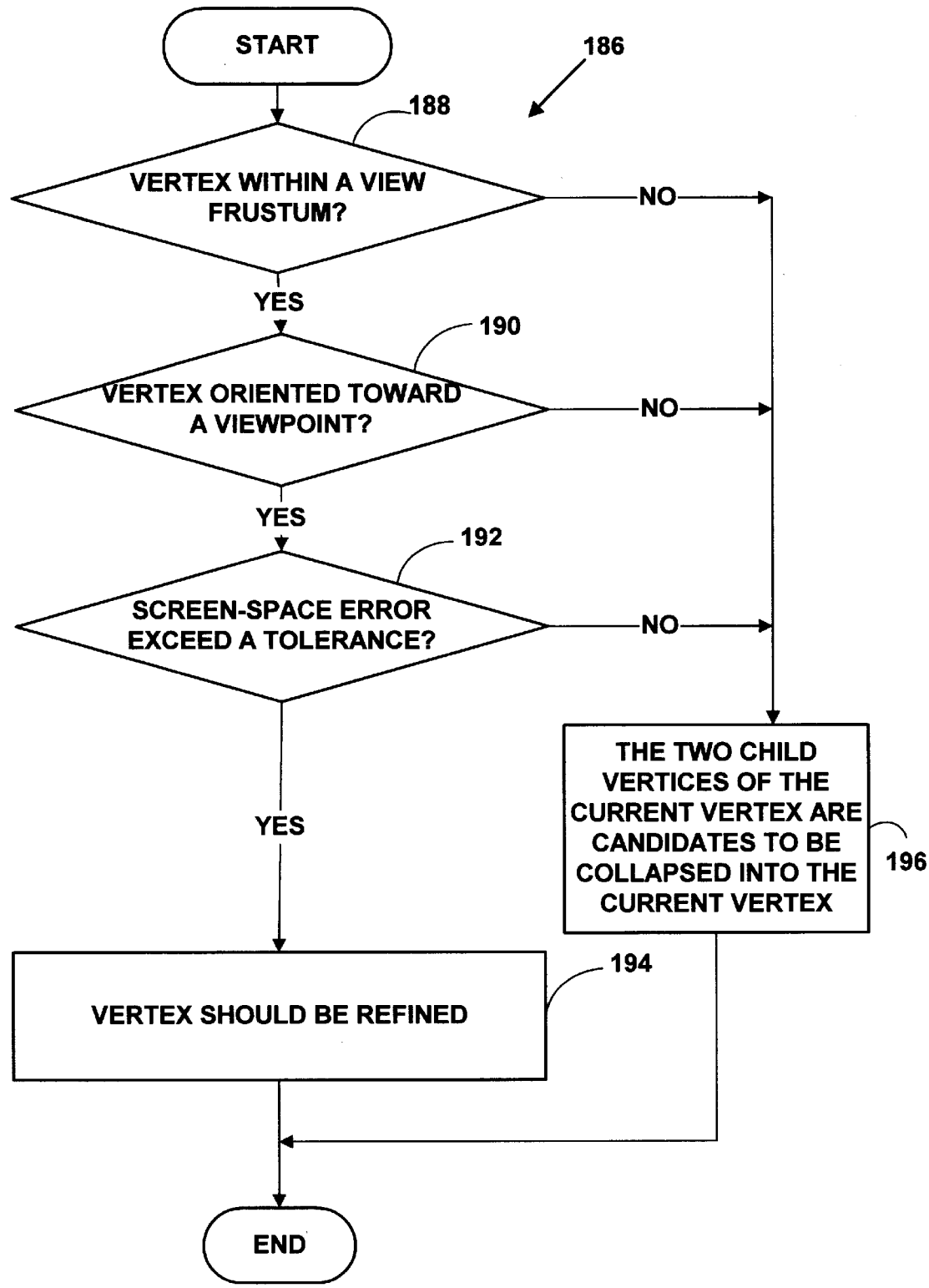
FIG. 10 is a flow diagram illustrating a method to determine if a mesh should be selectively refined or coarsened.

FIG. 10 is a flow diagram illustrating method 186 to determine if vertex in a re-parameterized mesh $M^{RE}$ should be split or collapsed based on view-dependent selective refinement criteria. Method 186 (FIG. 10) is used to determine whether a vertex should be split using vertex split transformation 82 or coarsened using edge collapse transformation 84 based on the changed view-dependent parameters. Method 186 uses three view-dependent criteria to determine whether a vertex should be split or coarsened: a view frustum, a surface orientation, and a screen-space geometric error. However, more or fewer view-dependent parameters could also be used. One or more of the view-dependent parameters may also be used individually.

A first test is done at step 188 to determine if a vertex affects a graphical object within the view frustum. If the vertex does not affect the graphical object within the view frustum, then it is not split. If the vertex does affect the graphical object within the view frustum, then a second test is completed at step 190. At step 190, if the vertex is not oriented towards a viewpoint, then the vertex is not split. If the vertex is oriented towards a viewpoint, then a third test is completed at step 192. If a screen-space error calculated for the vertex exceeds a pre-determined tolerance, then the progressive mesh representation containing the vertex should be refined at step 194. If a screen-space error calculated for the vertex does not exceed a pre-determined tolerance at step 192, then the two child vertices of the current vertex are candidates to be collapsed into the current vertex at step 196. Table 5 shows pseudo-code for a subroutine to implement method 184. However, other view-dependent selective refinement criteria could also be used for method 186 and the subroutine shown in Table 5.

TABLE 5

```
function qrefine(V) // FIG. 10
//Refine if vertex V affects the surface within a view frustum, step 188
    if outside_view_frustum(V) return false
//Refine if part of the affected surface for the vertex faces a viewpoint, step 190
    if oriented_away(V) return false
//Refine if screen-space projected error exceeds pre-determined tolerance τ, step 192
    if screen_space_error(V) <= tolerance τ return false
return true
end function qrefine
```

View frustum

Figure 11:
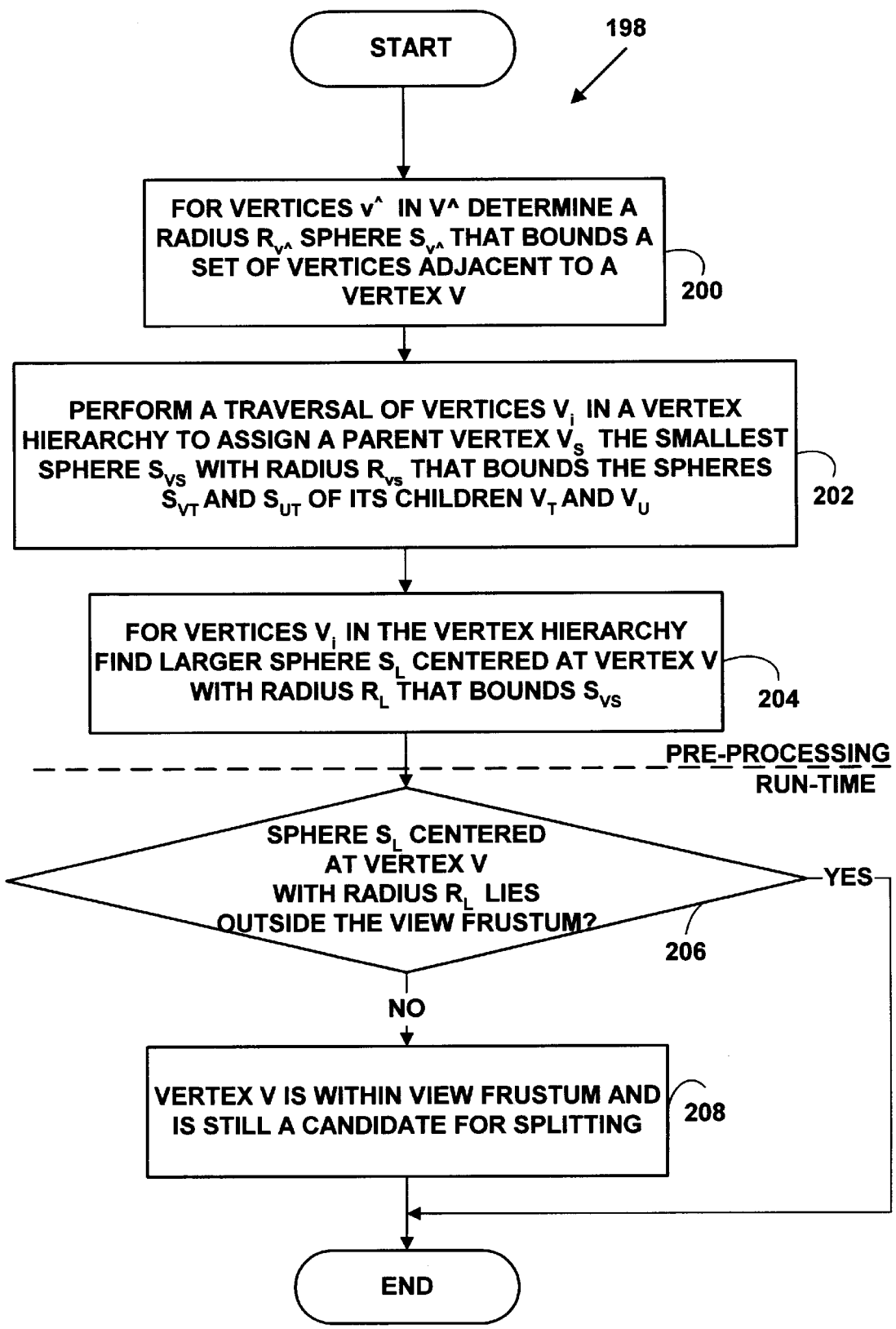
FIG. 11 is a flow diagram illustrating a method to determine if a vertex is within a view frustum.

FIG. 11 is a flow diagram illustrating in more detail step 188 of FIG. 10. A method 198 is shown for determining if a vertex V is within a view frustum.

Method 198 (FIG. 11) determines if a vertex V is within a view frustum using a bounding space hierarchy after a mesh representation of an arbitrary progressive mesh representation $M^{\wedge}$ is loaded into memory system 16 of computer system 10. For a vertex $V^{\wedge} \epsilon V^{\wedge}$ (e.g., the leaf nodes of vertex hierarchy 150 for $M^{\wedge}$ 183) a first set of spheres $S_{v^{\wedge}}$ with radii $r_{v^{\wedge}}$ that bound a set vertices adjacent to $v^{\wedge}$ is determined at step 200. However, the bounding sphere could be replaced by other bounding elements (e.g., axis aligned boxes). A postorder traversal of vertex hierarchy 150 is performed at step 202 to create a second set of spheres $S_{v_i}$ with radii $r_{v_i}$ for the set of vertices $v_i$ in the vertex hierarchy. As is known in the art, in a postorder traversal, any root node in a hierarchy is processed after its descendants. The postorder traversal in step 202 starts with the vertices $v^{\wedge} \in V^{\wedge}$ (i.e., the leaf nodes). However, other traversals of the vertex hierarchy could also be used. The postorder traversal assigns a parent vertex $VS_i$ in the vertex hierarchy the smallest sphere $S_{vsi}$ with radius $r_{vsi}$ that bounds the spheres $S_{vti}$ and $S_{vui}$ of its children $v_t$ and $v_u$. Since the resulting spheres are not centered on the vertices $v_i$, a third set of larger spheres $S_L$ centered at vertex V that bounds the second set of sphere $S_v$ is determined at step 204 by finding radii $r_L$ for the vertices $v_i$. In an alternative embodiment at the present invention, all decedent vertices could be considered to construct a bounding volume for a given node. This approach is slower in terms of computational time but is more precise. In an illustrative embodiment of the present invention, steps 200–204 are completed as pre-processing steps. In an alternative embodiment of the present invention steps 200–204 are completed at run-time.

In an illustrative embodiment of the present invention, the view frustum is a 4-sided (i.e., semi-infinite) pyramid which is known in the graphics art. At run-time, a test is conducted to determine if sphere $S_L$ of radius $r_L$ centered at vertex $V=(v_x,v_y,v_z)$ lies outside the view frustum at step 206 using the test shown in equation 3.

$$a_i v_x + b_i v_y + c_i v_z + d_i < (-r_L) \text{ for any } i=1 \ldots 4 \qquad (3)$$

The four linear functions $a_i v_x + b_i v_y + c_i v_z + d_i$ in equation 3 measure the signed Euclidean distance to one of the four sides of the view frustum from vertex V. However, other functions and other view frustum shapes could also be used. If a bounding sphere $S_L$ with radius $r_L$ lies completely outside the view frustum, then the region of the mesh M^ that possibly could be affected by the split of vertex V lies outside the view frustum and is not split. If the region of the mesh M^ that possibly could be affected by the split of vertex V lies outside the view frustum, then the vertex is still a candidate for splitting at step 208 and the test at step 190 (FIG. 10) is performed to determine if the vertex V should be split.

Figure 12:
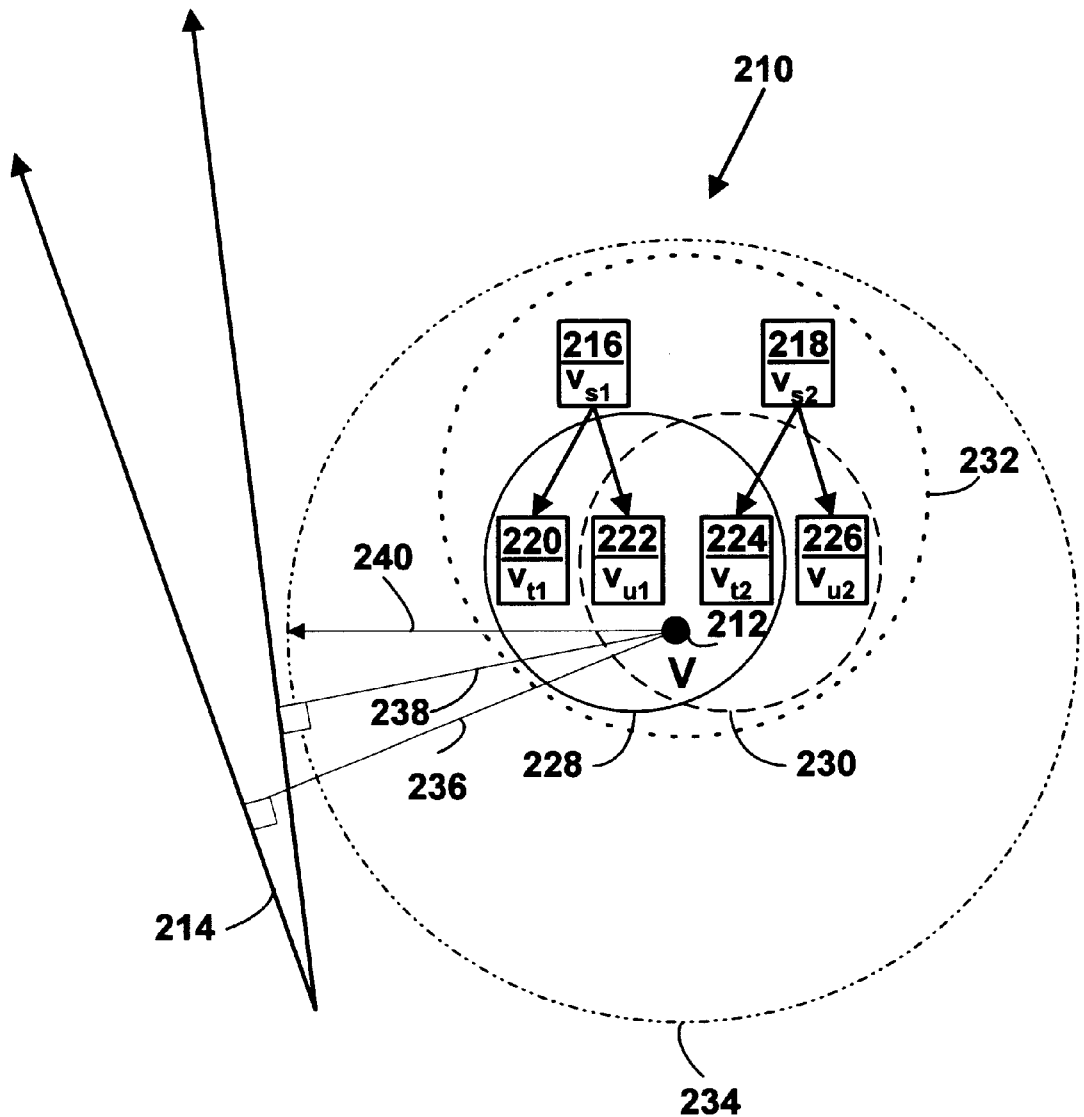
FIG. 12 is a block diagram illustrating a bounding space hierarchy.

FIG. 12 is a block diagram which shows an illustrative bounding space hierarchy 210 for method 198 (FIG. 11). A vertex V 212 and a two-dimensional view of a view frustum 214 are shown with a portion of a vertex hierarchy with parent vertices $v_{s1}$ 216 and $V_{s2}$ 218, child vertices $v_{t1}$, $v_{u1}$, $v_{u2}$ and $v_{t2}$ (220,222,224,226). Using method 198 on FIG. 11, for a vertex v^∈V^ (216, 218) a first set of spheres $S_{v^}$ (228,230) with radii $r_{v^}$ that bound a set vertices (224,226) adjacent to V^ in the vertex hierarchy is determined at step 200 (FIG. 11). A postorder traversal of the vertex hierarchy beginning with leaf nodes (220,222) at step 202 (FIG. 11) assigns a parent vertex $v_{si}$ 216 in the vertex hierarchy the smallest sphere $S_{vsi}$ 232 with radius $r_{vsi}$ that bounds the spheres $S_{vti}$ and $S_{vui}$ (228,230) of its children $v_t$ and $v_u$ (220,222). Since the resulting second set of spheres $S_v$ 232, one of which is show in FIG. 12, is not centered on vertex V 212 a third set of larger spheres $S_L$ is created. One sphere 234 from the third set of larger spheres is illustrated in FIG. 12 centered at vertex V 212 that bounds the second set of spheres $S_v$ 232. Sphere 234 is determined at step 204 (FIG. 11) by finding radii $r_L$ for the vertex V 212.

In FIG. 12, two of the four linear functions $a_i v_x + b_i^v y + c_i v_z + d_i$ (equation 3) for the test at step 204 (FIG. 11) are used to measure the signed Euclidean distances (236, 238) to two sides of the view frustum 214 are illustrated in FIG. 12. The Euclidean distances (236, 238) are both less than $(-r_L)$ 240 for bounding sphere $S_L$ 234. Thus, vertex V 212 lies outside the view frustum 214 and is not split. If Vertex V 212 was within the view frustum 214, then the test at step 190 (FIG. 10) is conducted to test for surface orientation.

Surface orientation

Figure 13A:
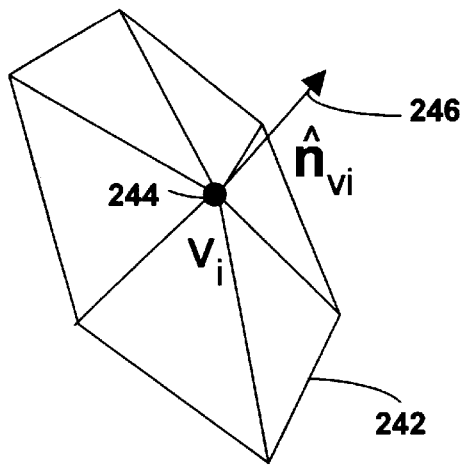
FIGS. 13A–13C are block diagrams which illustrate a surface orientation test for a vertex.
Figure 13B:
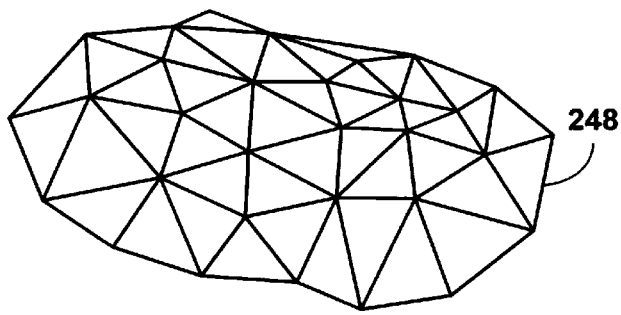
Figure 13C:
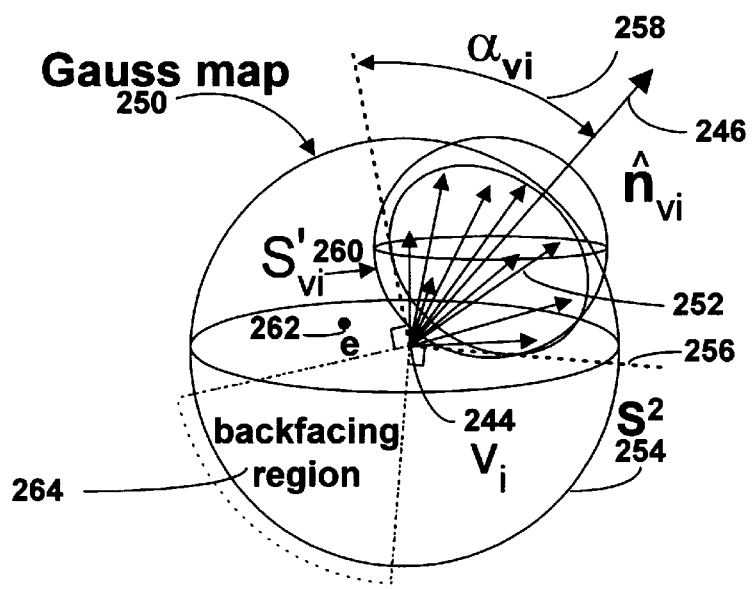

FIGS. 13A–13C are block diagrams which help illustrate step 190 (FIG. 10), which tests the orientation of a vertex with respect to a viewpoint. FIG. 13A illustrates the region of a surface of mesh M^ 242 affected by a vertex $v_i$ 244 and normal vector $n^_{vi}$ 246. FIG. 13B illustrates a region of a three-dimensional graphical image 248 (e.g., a graphical terrain, a subsection of M^ which mesh M^ 242 affects. FIG. 13C illustrates a Gauss map 250 of mesh 242. As is known in the computer graphics arts a Gauss map is a mapping from a group of points on a surface of a graphical object to a group of points on a unit sphere.

The test at step 190 in FIG. 10 is analogous to the test at step 200 in FIG. 11 except that a set of space normals 252 (FIG. 13C) over a surface defined by Gauss map 250 is used instead of the graphical image surface 248 itself. The set space of normals 252 is a subset of a unit sphere $S^2$ 254 where $S^2 = \{p \in R^3 : \|p\|=1\}$, and p is a set of points corresponding to a normal of a triangle face of an arbitrary triangle mesh M^ and $R^3$ is a linear map.

For a vertex $v_i$ 244, a region of M^ 248 defines the space of normals 252 supported by vertex $v_i$ 244 and its descendants in vertex hierarchy 150. A cone of normals 256 is defined by a semiangle $\alpha_{vi}$ 258 about vector $n^_{vi}$ 246. The semiangle $\alpha_{vi}$ 258 is computed after a progressive mesh is loaded into memory system 16 of computer system 10 using a "normal space hierarchy." A sphere $S'_{Vi}$ 260 bounds the associated space of normals 252. A viewpoint e 262 is used to view the vertex $v_i$ 244. If the viewpoint e 262 lies in a backfacing region 264 of vertex $v_i$ 244, no part of the affected surface region is oriented toward the viewpoint.

Figure 14:
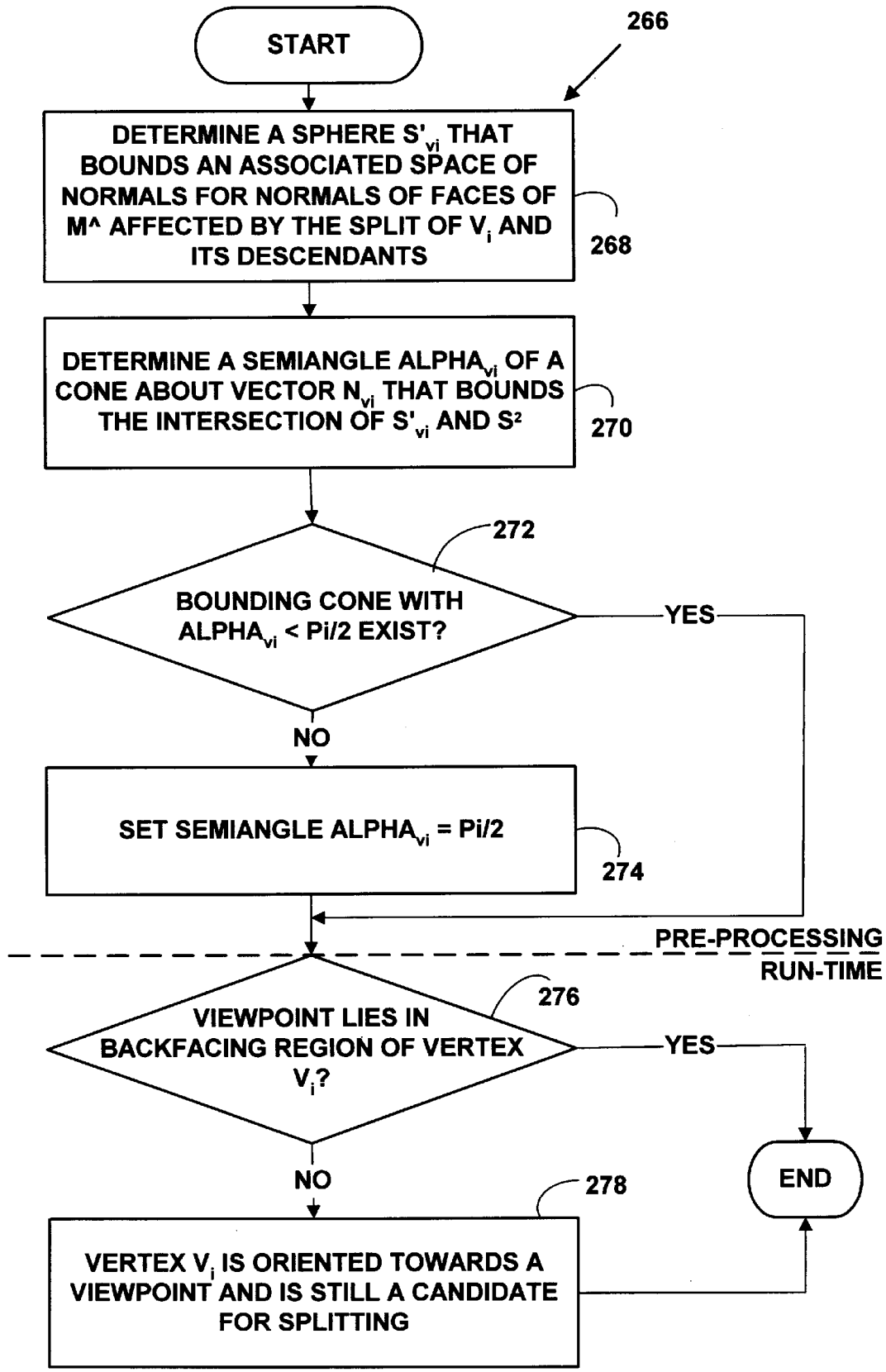
FIG. 14 is a flow diagram illustrating a method for determining surface orientation.

FIG. 14 is a flow diagram illustrating in more detail step 190 of FIG. 10 for determining surface orientation. At step 268 in method 266 (FIG. 14), a sphere $S'_{Vi}$ 260 (FIG. 13C) is determined for a normal from a face of M^ 248 that bounds an associated space of normals 252. However, the bounding sphere could be replaced by other bounding elements (e.g., axis aligned boxes). At step 270, semiangle $\alpha_{vi}$ 258 of bounding cone 256 about vector $n^_{vi}$ 246 that bounds the intersection of $S'_{Vi}$ 260 and $S^2$ 254 is determined. If no bounding cone 256 with semiangle $\alpha_{vi} < \pi/2$ exists at step 272, semiangle $\alpha_{vi}$ 258 is set to $\pi/2$ at step 274 (i.e., $\pi = 3.1415927 \ldots$). In an illustrative embodiment of the present invention steps 268–274 are completed as preprocessing steps. However, in an alternative embodiment of the present invention, steps 268–274 are completed at runtime. Given a viewpoint e 262, it is unnecessary to split vertex $v_i$ 244 if vertex $v_i$ lies in a backfacing region 264 of a e 262. In the prior art, the test shown in equation 4 is commonly used as a backfacing test.

$$(a_{vi} - e)/(\|a_{vi} - e\|) \cdot n^_{vi} > \sin \alpha_{vi} \quad (4)$$

In equation 4, $a_{vi}$ is a cone anchor point that takes into account the geometric bounding volume of $S_{vi}$. The difference between cone anchor point $a_{vi}$ and the viewpoint e 262 is divided by the magnitude of their vector difference. As is known in the art, the magnitude of a vector difference $\|v\|$, for $v=(x, y, z)=\sqrt{(x2+y2+z2)}$ is a vector that is used to take the dot product with vector $n^_{vi}$ 246. As is known in art, the combination of $AB\cos\theta$ in which A and B are the magnitudes of two vectors, and $\theta$ is the angle between them, is the scalar product or dot product of A and B. Thus, the dot product of A and $B = A \cdot B = A_x B_x + A_y B_y + A_z B_z = \Sigma_i A_i B_i$. If the dot product value in equation 4 is greater than the sine of the semiangle $\alpha_{vi}$ 258, then vertex $v_i$ 244 lies in the backfacing region 264 for viewpoint e 242 and is not split.

In an illustrative embodiment of the present invention, the cone anchor point $a_{vi}$ is approximated by vertex $v_i$ 244 (i.e., a parallel projection approximation) and the test shown in equation 5 is used instead as a backfacing test at step 276 at run-time.

$$(v_i - e) \cdot n^_{vi} > 0 \text{ and } ((v_i - e) \cdot n^_{vi})^2 > \|v_i - e\|^2 \sin^2 \alpha_{vi} \quad (5)$$

The test shown in equation 5 used at step 190 improves time and space efficiency over the prior art backfacing test shown in equation 4. A vector difference between vertex $v_i$ 244 and viewpoint e 262 is determined. The vector $(v_i - e)$ is then used to take the dot product with vector $n^_{vi}$ 246.

If this first dot product is greater than zero (i.e., $(v_i - e) \cdot n^_{vi} > 0$), then a second test is conducted. In the second test, the first dot product squared is used to determine if the quantity is greater than the square of the magnitude of the vector difference between vertex $v_i$ 244 and viewpoint e 242 multiplied by the square of the sine of semiangle $\alpha_{vi}$ 258. If both the first and second tests are true at step 276, then vertex $v_i$ 244 lies in the backfacing region 264 and is not visible to from viewpoint e 262. A vertex $v_i$ 244 that is not visible to the viewpoint e 262 is not split. If either the first or second tests are false at step 276, then vertex $v_i$ 244 does not lie in backfacing region 264 and is visible to from viewpoint e 262. Vertex $v_i$ 244 is oriented towards viewpoint e 262 at step 278 (FIG. 14) and is still a candidate for splitting at step 192 of FIG. 10.

Screen-space geometric error

Step 192 in FIG. 10 is used to test if a screen space error exceeds a pre-determined tolerance. For vertices v ∈ V, a measure of the deviation between v and its current neighborhood $N_v$ (i.e., the set of faces adjacent to v) and a corresponding neighborhood region $N^{\wedge}_v$ in $M^{\wedge}$ is determined. One quantitative measure is the Hausdorff distance $H(N_v, N^{\wedge}_v)$ defined as the least scalar r for which $(N_v \subset N^{\wedge}_v \oplus B(r))$ and $(N^{\wedge}_v \subset N_v \oplus B(r))$ where B(r) is the closed ball of radius r and the operator $\oplus$ is the Minkowski sum. The Minkowski sum $\oplus$ is defined as $A \oplus B = \{a+b: a \in A, b \in B\}$. If $H(N_v, N^{\wedge}_v) = r$, the screen space distance between neighborhood $N_v$ and neighborhood $N^{\wedge}_v$ is bounded by the screen-space projection of B(r). The Hausdorff distance and Minkowski sum are known to those skilled in the art.

If neighborhood $N_v$ and neighborhood $N^{\wedge}_v$ are similar and approximately planar, a tighter distance bound can be obtained by replacing B(r) by a more general deviation space D. For example, deviation of height fiields (i.e., graphs of the xy-plane) are recorded by associating to a set of vertices a scalar value $\delta$ representing a deviation space $D_{Z^{\wedge}}(\delta) = \{hz^{\wedge}: -\delta <= h <= \delta\}$. The main advantage of using $D_{Z^{\wedge}}(\delta)$ is that its screen-space projection vanishes as its principal axis $z^{\wedge}$ becomes parallel to the viewing direction, unlike the corresponding B($\delta$). For more information on the derivation of $D_{Z^{\wedge}}(\delta)$ see *Real-time, Continuous Level of Detail Rendering of Height Fields*, by P. Lindstrom, et. al, ACM SIGGRAPH'96, pp. 109–118.

Figure 15A:
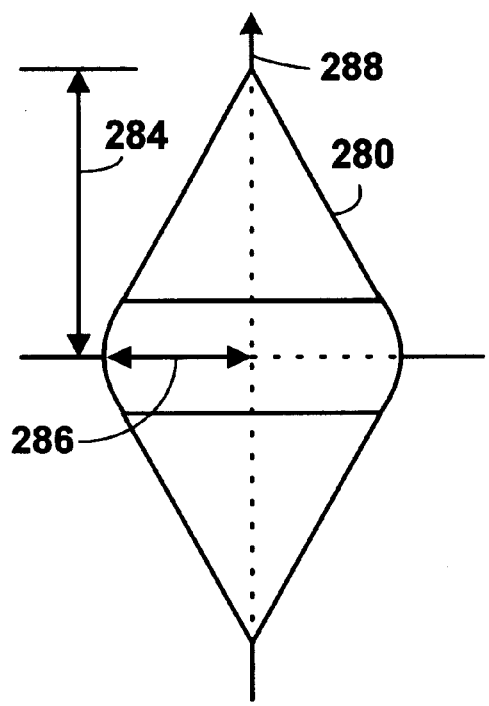
FIGS. 15A–15B are block diagrams illustrating a screen space geometric error representation.
Figure 15B:
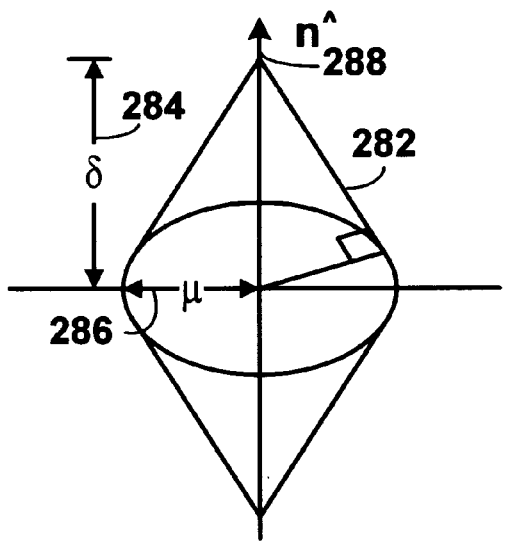

In an illustrative embodiment of the present invention, $D_{Z^{\wedge}}(\delta)$ is generalized to arbitrary surfaces. FIGS. 15A–15B are block diagrams illustrating a new screen space geometric error representation. A new derivation space $D_{n^{\wedge}}(\mu,\delta)$ is defined. FIG. 15A is an illustration of deviation space $D_{n^{\wedge}}(\mu,\delta)$ 280. FIG. 15B is an illustration of the cross-section 282 of FIG. 14A.

Most of the deviation space $D_{n^{\wedge}}(\mu,\delta)$ 280 is orthogonal to a surface and is captured by a directional component $\delta n^{\wedge}$ from a scalar component $\delta$ 284, but a uniform component $\mu$ 286 may be required when surface neighborhood $N^{\wedge}_v$ 288 is curved. Uniform component $\mu$ 286 also allows accurate approximation of discontinuity curves (e.g., surface boundaries and material boundaries) whose deviations are often tangent to the surface. In an illustrative embodiment of the present invention, $D_{n^{\wedge}}(\mu,\delta)$ 280 corresponds to the shape whose projected radius along a view direction $\vec{v}$ is expressed as $MAX(\mu, \delta \| n^{\wedge} \times \vec{v} \|)$. That is, $D_{n^{\wedge}}(\mu,\delta)$ 280 is the maximum of two values, the uniform component $\mu$ 286, or the scalar component $\delta$ 284 multiplied by the magnitude of the vector difference of the cross product of normal vector $n^{\wedge}_v$ 246 and radius direction $\vec{v}$. As is known in the art, the cross product $A \times B$ is a vector with magnitude $AB \sin\theta$. The magnitude of the cross product $\|A \times B\| = AB \sin\theta$.

Figure 16:
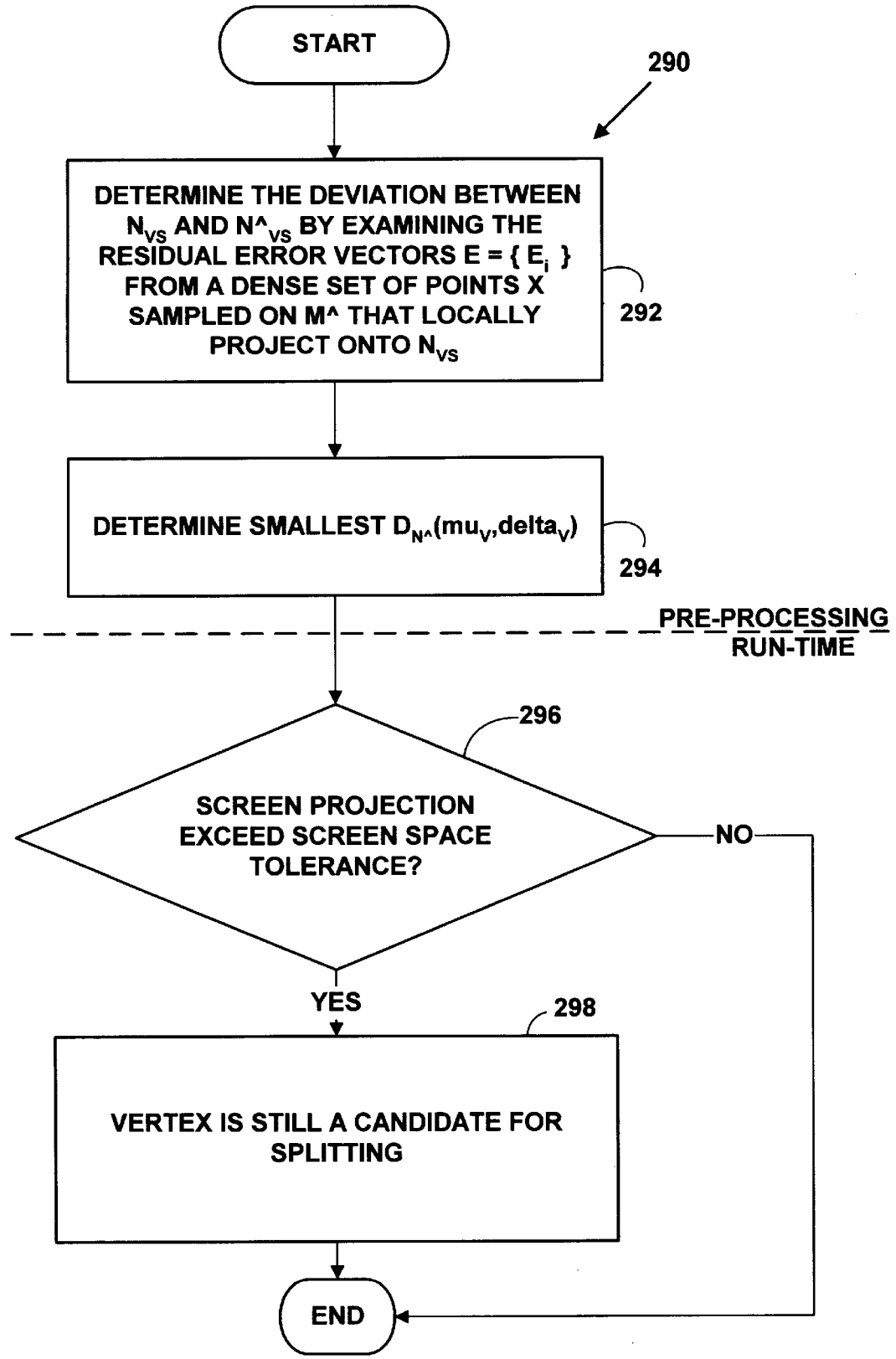
FIG. 16 is a flow diagram illustrating a method for finding a screen space geometric error.

FIG. 16 is a flow diagram for method 290 for finding deviation space $D_{n^{\wedge}}(\mu_v,\delta_v)$ at vertices v∈V. After edge collapse transformations 84 are applied, the deviation between neighborhoods $N_{vs}$ and $N^{\wedge}$ is determined by examining the residual error vectors $E=\{e_i\}$ from a dense (i.e., closely related) set of points $X_i$ sampled on region $M^{\wedge}$ 248 that locally project onto $N_{vs}$ at step 292. The smallest deviation space $D_{n^{\wedge}(\mu_v,\delta_v)}$ with the ratio $\delta_v/\mu_v$ that bounds E is determined at step 294 with $MAX_{ei \in E}(e_i \cdot N^{\wedge}_v)/MAX_{ei \in E}\|e_i \times N^{\wedge}_v\|$. That is, the ratio $\delta_v/\mu_v$ is fixed and the deviation space $D_{n^{\wedge}}(\mu_v,\delta_v)$ is determined by finding the maximum residual error $e_i$ of the dot product of the vector $e_i$ and the vector for neighborhood $N^{\wedge}_v$ divided by maximum residual error $e_i$ of the magnitude of cross product of the vector $e_i$ and the vector for neighborhood $N^{\wedge}_v$. However, other simplification schemes could also be used to obtain deviation spaces with guaranteed bounds.

Given a viewpoint e 262, a screen space tolerance τ (i.e., as a fraction of the viewpoint size) and a field of view angle ζ, a determination can be made if the screen space projection $D_{n^{\wedge}}(\mu_v,\delta_v)$ exceeds screen space tolerance τ with the test shown in equation 6.

$$MAX(\mu_v, \delta_v \| N^{\wedge}_v \times ((v-e)/\|v-e\|) \|) / \|v-e\| >= (2 \cot \zeta/2)\tau \quad (6)$$

If the maximum of $\mu_v$ and the large expression with $\delta_v$ is greater than or equal to two times the cotangent of the view angle $\zeta/2$ times the screen space tolerance τ, then $D_{n^{\wedge}}(\mu_v,\delta_v)$ exceeds screen space tolerance τ.

In an illustrative embodiment of the present invention, steps 292–294 are completed as pre-processing steps. In an alternative embodiment of the present invention, steps 292–294 are completed at run-time.

In an illustrative embodiment of the present invention, an equivalent test shown in equation 7 is used at step 296 to determine if the screen space projection $D_{n^{\wedge}}(\mu_v,\delta_v)$ exceeds screen space tolerance τ.

$$\mu^2_v >= k^2 \|v-e\|^2 \text{ OR } \delta^2_v(\|v-e\|^2 - ((v-e) \cdot N^{\wedge}_v)^2) >= k^2 \|v-e\|^4 \quad (7)$$

where $k^2 = (2 \cot \zeta/2)^2 \tau^2$ and is a new view angle factor that is computed once per frame. A first test determines if a square of the uniform component $\mu$ is greater than or equal to the square of the k component times the square of the magnitude of the vector difference between vertex v and viewpoint e. If this first test is true, then $D_{n^{\wedge}}(\mu_v,\delta_v)$ exceeds screen space tolerance τ. If the first test is false, a second test determines if the square of the scalar component $\delta$ multiplied by the square of the absolute value of the vector difference between vertex v and viewpoint e squared, minus the dot product of the vector difference between vertex v and viewpoint e and the vector for neighborhood $N^{\wedge}$ squared, is greater than or equal to the k component squared multiplied by the absolute value of the vector difference between vertex v and viewpoint e raised to the fourth power. If so, then $D_{n^{\wedge}}(\mu_v,\delta_v)$ exceeds screen space tolerance τ.

If neither part of the test in equation 7 evaluates to true at step 296, the screen space geometric error does not exceed the screen space tolerance τ, so the progressive mesh is not adaptively refined. If either part of the test at step 296 evaluates to true, then at step 298, the vertex is still a candidate for splitting.

In an illustrative embodiment of the present invention, the steps of method 186 in FIG. 10 are completed in the following order: step 190; step 192; and then step 188 to make method 186 an optimal method. However, other orders for the test can also be used. Since all three tests share common sub-expressions, the tests completed in method 186 require less than 15% of time used to render a frame on the average in an embodiment of the present invention. The scalar values $\{-r_v, \sin^2\alpha_v, \mu^2_v, \delta^2_v\}$ computed at step 76 (FIG. 4) with method 290 (FIG. 16) are stored in a data structure record in a v.refine_info field (Table 2) for easy access.

Adaptively refining a mesh

To refine a re-parameterized mesh to create an adaptively refined mesh at step 80 (FIG. 4) after the three tests of method 186 (FIG. 10) based on changed view-dependent parameters at step 78 (FIG. 4) a method for adaptively refining a mesh is used. An active list of vertices V is traversed before rendering a frame. For vertices v∈V a decision is made to leave the vertex as is, split it with vertex split transformation 82, or collapse it with edge collapse transformation 84. To adaptively refine a mesh, multiple vertex split transformation 82 and multiple edge collapse transformations 84 may take place before the desired vertices and faces are active and a desired refined mesh can be created.

Figure 17A:
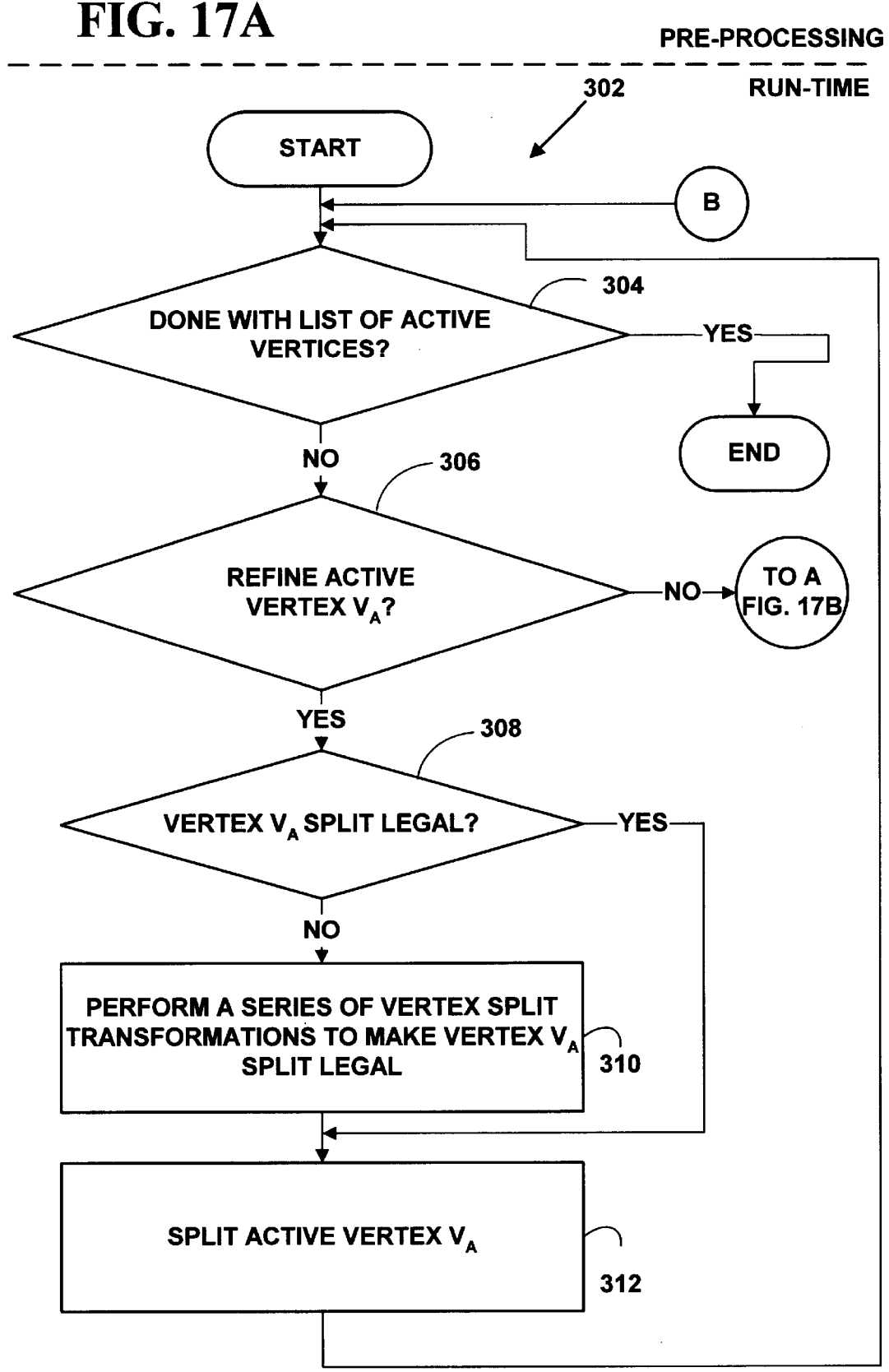
FIGS. 17A and 17B are flow diagrams illustrating a method for adaptively refining a mesh.
Figure 17B:
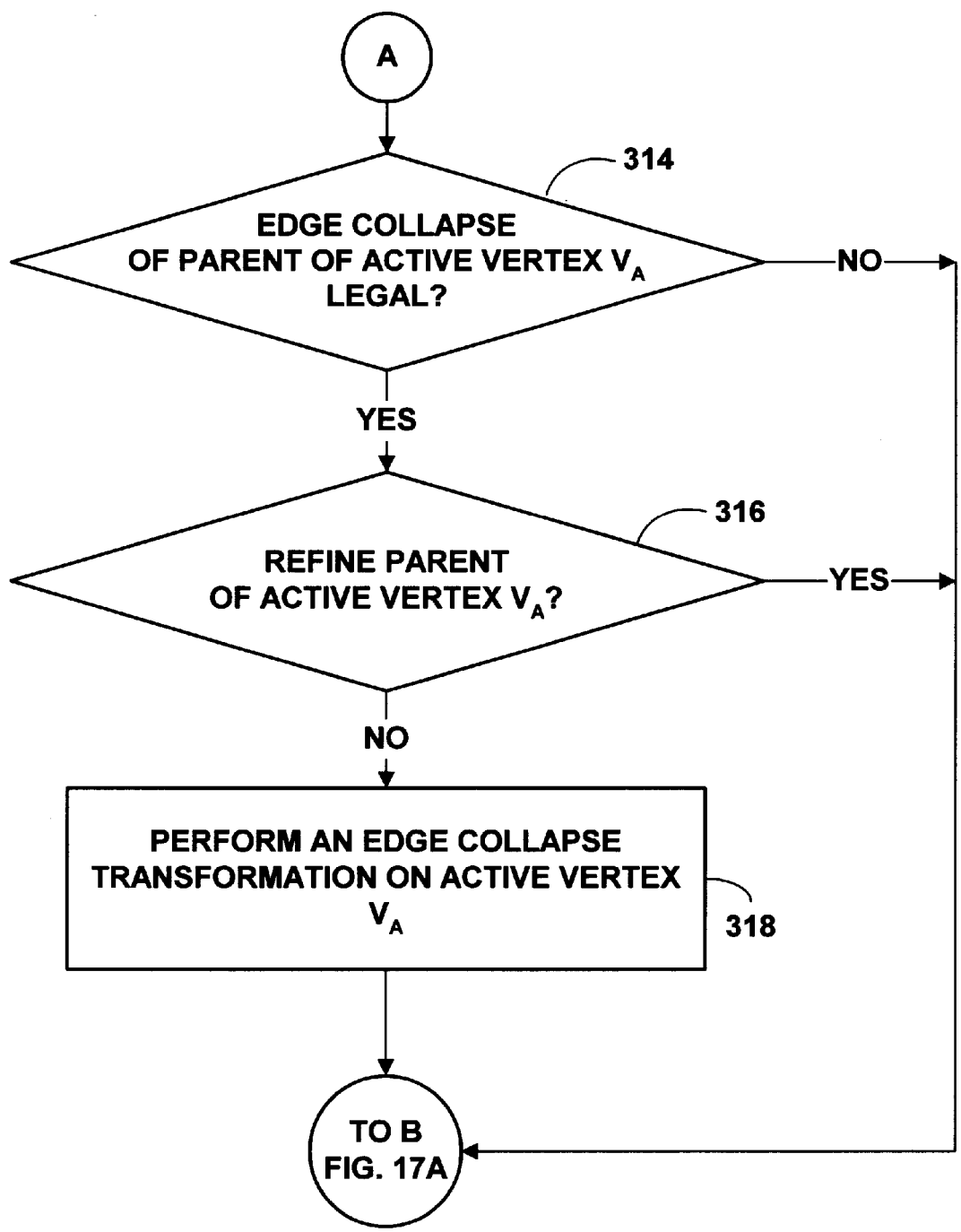

FIGS. 17A and 17B are flow diagrams illustrating method 302 for adaptively refining a mesh. At step 304 (FIG. 17A), a loop is used to iterate through a list of doubly linked list of active vertices V (e.g., v.active from Table 4) for a re-parameterized mesh $M^{RE}$ based on changed view-dependent parameters. The adaptively refined mesh $M^S$ is stored in the data structure SRMesh shown in Table 4. At step 306 a test is conducted to determine if an active vertex $v_a$ should be refined on the changes in view-dependent parameters. The test used to determine if the active vertex should be split is described by method 186 (FIG. 10) and the pseudo-code in Table 5. However other tests could also be used. If the test at step 306 evaluates to true, then a test is conducted at step 308 to determine if vertex split transformation 82 performed on active vertex $v_a$ is "legal." Vertex split transformation 82 is legal if the vertex (e.g., 88 stored in v.parent) and a first and second set of pairwise adjacent faces (e.g., (96–102) stored in v.fn[0 . . . 3]) adjacent to vertex 88 are active. If any of the faces are not active (i.e., not currently included in the mesh), then a series of vertex spilt transformations 82 are performed at step 310 to make the vertex split transformation at step 308 legal. The series of vertex split transformations 82 at step 310 are done to change any required inactive faces (e.g., in the set v.fn[0 . . . 3]) into active faces. If the vertex split at step 310 is legal, then the sibling of active vertex $v_a$ is also active, so active vertex $v_a$ is split at step 312 into two child vertices with vertex split transformation 82.

If the test at step 306 fails, a test is conducted to determine if an edge collapse transformation 84 of the parent of active vertex $v_a$ is legal at step 314 (FIG. 17B). Edge collapse transformation 84 is performed only if it is legal (i.e., the parent of $v_a$ is also active and the neighboring faces of v.parent.fl and v.parent.fr match those in v.parent.fn[0 . . . 3]). If the lest at step 314 fails, nothing is done to active vertex $v_a$.

A test is performed at step 316 (FIG. 17B) to determine if the parent of active vertex $v_a$ should be refined based on the changes in view dependent parameters. If the test at step 316 evaluates to false then the active vertex $v_a$ is collapsed with edge collapse transformation 84 at step 318. If the test at step 314 evaluates to false, then refinement of the parent of active vertex $v_a$ is completed (FIG. 17A). Table 6 shows pseudo-code for sub-routines to implement method 302 in an illustrative embodiment of the present invention.

TABLE 6

```
procedure adapt_refinement() // FIG. 17
    for v ∈ V
        if v.vt and qrefine(v) // Tables 4 & 5
            force_vsplit(v)
        else if v.parent and ecol_legal(v.parent) and not qrefine(v.parent) // Tables 4 & 5
            ecol(v.parent) // FIGS. 5 & 8, 84
end procedure adapt_refinement()
procedure force_split(v')
    stack ← v'
    while v ← stack.top()
        if v.vt and v.fl ∈ F
            stack.pop // v was split earlier in the loop
        else if v ∉ V //not active
            stack.push(v.parent)
        else if vsplit_legal(v)
            stack.pop()
            vsplit(v) // FIGS. 5 & 7, 82
        else for i ∈ {0 . . . 3}
            if v.fn[i] ∉ F
                // force vsplit that creates face v.fn[i]
                stack.push(v.fn[i].vertices[0].parent
end procedure force_split(v')
```

The procedure force_split( ) uses a stack to store vertices for a vertex that is split with vertex split transformation 82. However, other data structures could also be used.

Method 302 (FIG. 17) adaptively refines an area of a mesh (e.g., with vertex split transformation 82) based on changed view-dependent parameters, and coarsens an area of a mesh (e.g., with edge collapse transformation 84) when possible. After a vertex split transformation 82 or edge collapse transformation 84 is performed, some vertices in the resulting area may be considered for further transformations. Since these vertices may have been previously visited in the transversal of V, the vertices are relocated in the list of vertices to reside immediately after the list iterator. For example, after a vertex split transformation 82, v.vt is added to the list of vertices after the iterator. After an edge collapse transformation 89, v.parent is added and v.vl and v.vr are relocated after the iterator.

The time complexity for method 302 for transforming $M^A$ into $M^B$ is $O(|V^A|+|V^B|)$ in the worse case since $M^A \to M^0 \to M^B$ could require $O(|V^A|)$ edge collapse transformations 84 and $O(|V^B|)$ vertex split transformations 82 each taking constant time. The set of vertices $V^B$ is similar to the set of vertices $V^A$. As is known in the art, $O(f(n))$ notation is used to express the asymptotic complexity of the growth rate of a function $f(n)$. For continuous view-dependent changes, a simple transversal of the active vertices $|V|$ is $O(|V|)$, which is the time consuming portion of method 302. Note the number of active vertices $|V|$ is typically much larger than the number of original vertices $|V^\wedge|$. However, the rendering process, which typically has time complexity $O(|F|\approx 2|V|)$, has a larger time constant than $O(|V|)$, where $|F|$ is the number of active faces. Thus, method 302 requires only about 14% of the total time used to render a frame on the average in an illustrative embodiment of the present invention for a given computer system configuration (e.g., with a Silicon Graphics Indigo2 Extreme, 150 MHz R4400 with 128 MB of memory).

For a given mesh and a constant screen-space tolerance τ, the number of active faces |F| can vary dramatically depending on the view. Since both refinement times and rendering times are closely correlated to |F|, this leads to high variability in frame rates. In an illustrative embodiment of the present invention, screen-space tolerance τ is regulated so as to maintain |F| at a nearly constant level.

If m is the desired number of faces, and method 302 is called at time-t, then the formula in equation 8 is used to regulate screen-space error τ.

$$\tau t_i = \tau_{t-1}(|F_{t-1}|/m) \quad (8)$$

The quantity $|F_{t-1}|$ is the number of active faces in the previously drawn frame. This simple feedback control system using equation 8 exhibits good stability since |F| is a smooth monotonic function of τ. In an alternative embodiment of the present invention, direct regulation of the frame rate could be used, but since frame rate is more sensitive to operating system inconsistencies, frame regulation may be achieved indirectly using a secondary, slower controller by adjusting m in equation 8.

Since step 304 in method 302 (FIG. 17) is a simple traversal of the entire list V, the work accomplished by method 302 can be distributed over consecutive frames with amortization by traversing only a subset of the list V in a frame. For slowly changing view-dependent parameters amortizing method 302 reduces the already low overhead of adaptive refinement at step 80 while introducing few visual artifacts.

However, with amortization, regulation of |F| through the adjustment of screen-space tolerance τ becomes more difficult since the response in ÅF| may lag several frames. In an illustrative embodiment of the present invention with amortization, only a subset of the entire list V is traversed each frame instead of the entire list V. Thus, the adjustment work for screen-space tolerance τ is distributed over one or more consecutive frames. Changes are not made to the screen-space tolerance τ until the entire list V has been traversed. To reduce overshooting, vertex split transformation 82 is not allowed if the number of active faces reaches an upper limit (e.g., |F|>=1.2m), but the number of faces that would be introduced towards the next adjustment of τ are counted.

Geomorphs

Figure 18:
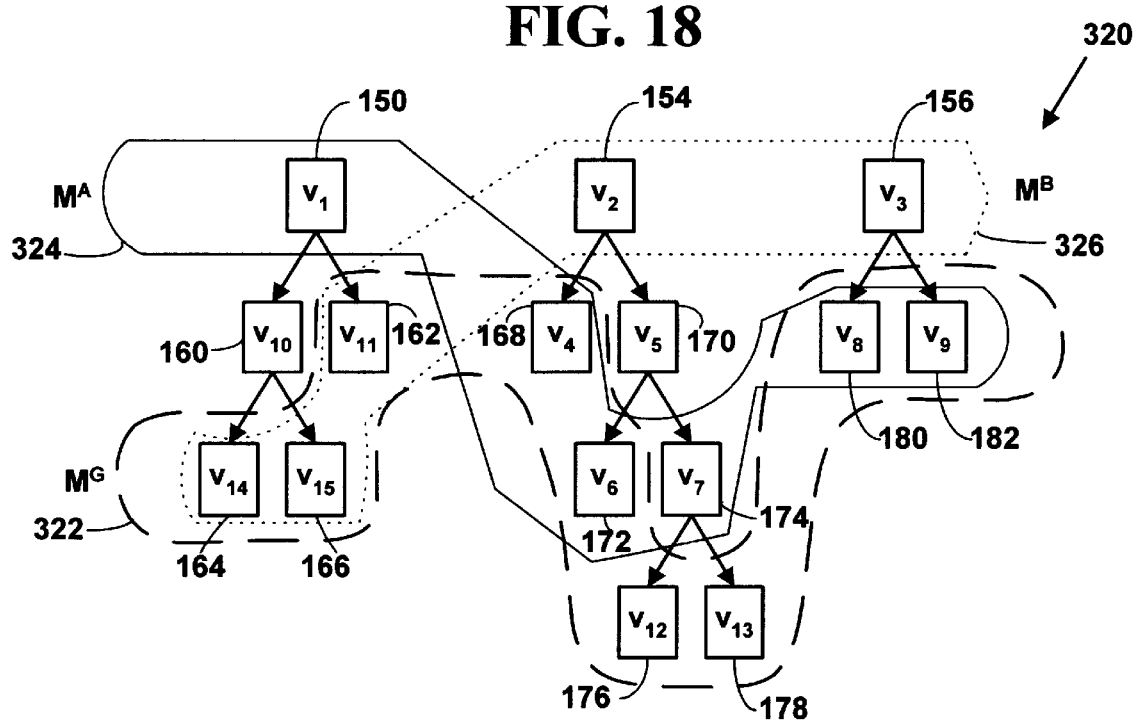
FIG. 18 is a block diagram illustrating a vertex hierarchy for a geomorph mesh.

Method 302 also supports geomorphs between any two selectively refined meshes $M^A$ and $M^B$. A geomorph mesh $M^G(\alpha)$ is a mesh whose vertices vary as a function of a parameter 0<=α<=1, such that $M^G(0)$ looks identical to $M^A$ and $M_G(1)$ look identical to $M^B$. A geomorph mesh $M^G(\alpha)$ is found whose active vertex front is lower than or equal to that of $M^A$ and $M^B$ for every vertex in the vertex front. FIG. 18 is a block diagram illustrating a vertex hierarchy 320 for a geomorph mesh $M^G(\alpha)$ 322 that is lower than or equal to meshes $M^A$ 324 and $M^B$ 326. The individual vertices (150–182) for the meshes were described for FIG. 9 above.

Mesh M^ trivially satisfies this property (see M^=$M^A$ 184, FIG. 9). However, a simpler geomorph mesh $M^G$ has a property that its faces $F^G$ are a superset of both $F^A$ and $F^B$, and that any vertex $v_j \epsilon V^G$ has a unique ancestor $v_{\rho G \to A(j)}$ $\epsilon V^A$ and a unique ancestor $v_{\rho G \to B(j)} \epsilon V^B$. Geomorph mesh $M^G(\alpha)$ 308 is the mesh ($F^G$, $V^G(\alpha)$) with the relationship shown in equation 9.

$$v_j^G(\alpha) = (1-\alpha)v_{\rho G \to A(j)} + (\alpha)v_{\rho G \to B(j)} \quad (9)$$

When $M^B$ is the result of method 302 on $M^A$, geomorph mesh $M^G$ can be obtained more directly. Instead of a single pass through V at step 304, two distinct passes are completed through V.

Figure 19:
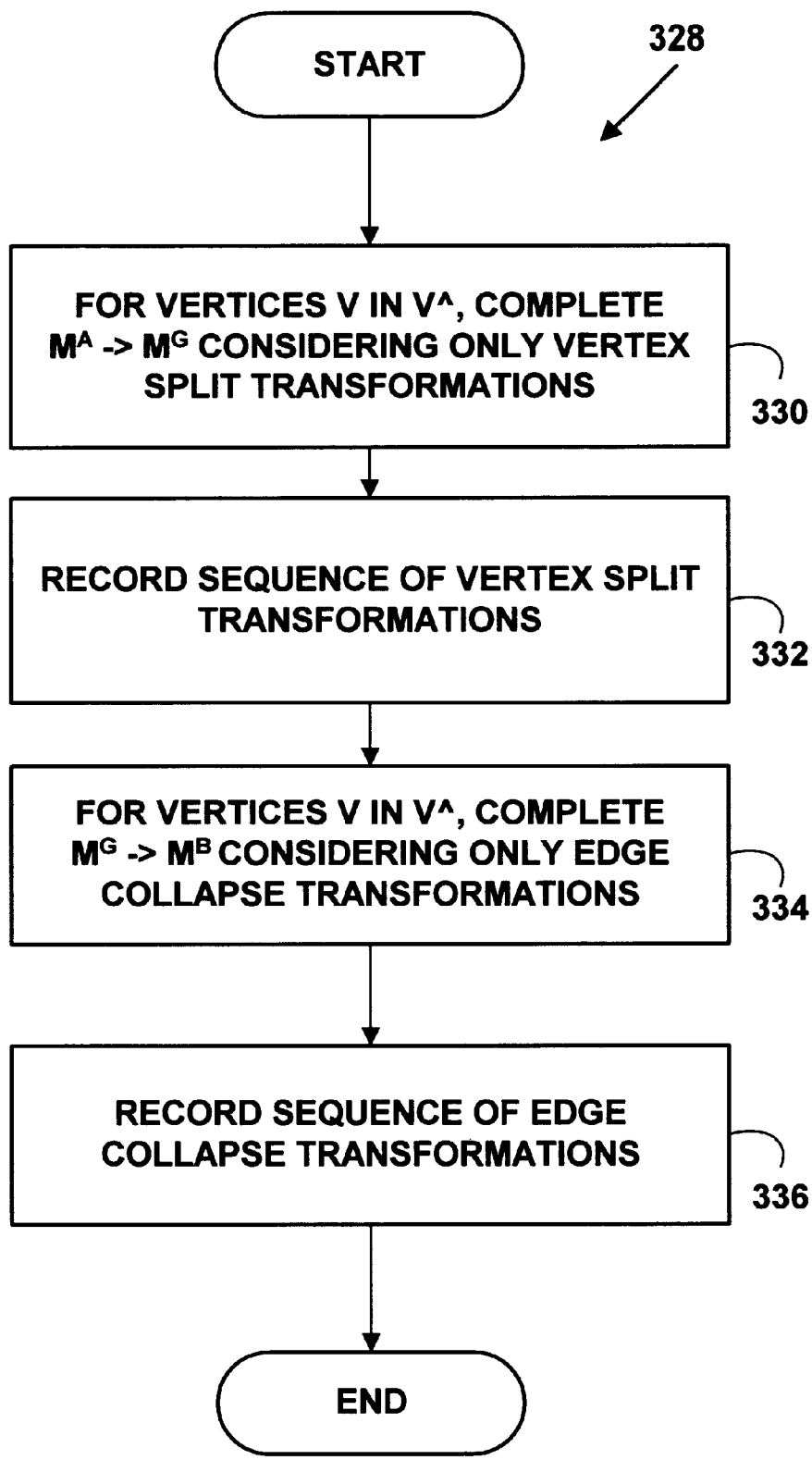
FIG. 19 is a flow diagram illustrating a method for creating a geomorph mesh.

FIG. 19 is a flow diagram illustrating a method 328 for directly creating a geomorph mesh $M^G(\alpha)$ A first pass $M^A \to M^G(\alpha)$ is completed using method 302 (FIG. 17) where only vertex split transforms 82 are considered at step 330. The sequence of vertex split transformations 82 is recorded at step 332. A second pass $M^G(\alpha) \to M^B$ is completed where only edge collapse transforms 84 are considered at step 334. The sequence of vertex split transformations 82 is recorded at step 336. For both passes, the sequence of transformations (82,84) are recorded (332,334) allowing a backtracking through the transformations to recover the intermediate mesh $M^G(\alpha)$, and to construct desired ancestry functions $\rho^{G \to A}$ and $\rho^{G \to}$. The resulting geomorph $M^G(\alpha)$ is used to provide a smooth transition between meshes $M^A$ and $M^B$. The smooth transition helps eliminate jerky or abrupt transitions called "popping" when the meshes are viewed.

Triangle Strips

Figure 20:
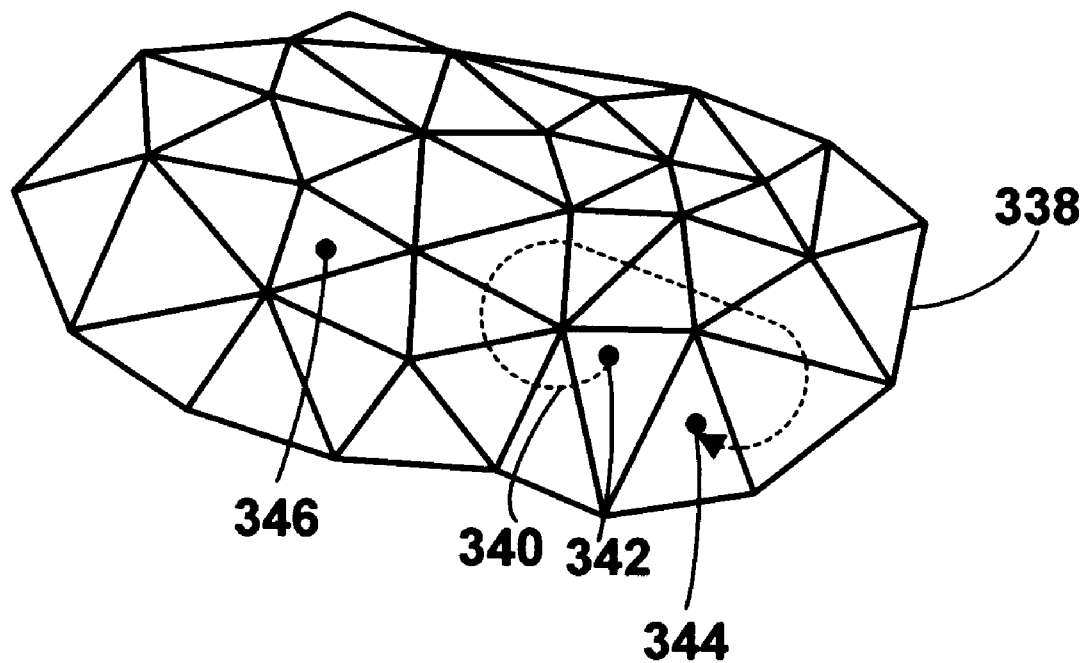
FIG. 20 is a block diagram of a graphical terrain illustrating a triangle strip.

Many graphics systems create triangle strip representations of graphical images for optimal rendering performance. A triangle strip is a sequence of connected triangles with adjacent faces. FIG. 20 is a block diagram of a graphical terrain 338 illustrating a triangle strip 340. Triangle strip 340 has a starting point at face 342 and an ending point at face 344. The triangle strip is created with a clockwise spiral. When a graphical image is rendered, triangles strips are used to render and display connected areas within the graphical image efficiently.

In an illustrative embodiment of the present invention, the refinement method 302 (FIG. 17) is incremental. As a result, it is not easy to precompute triangle strip (340) shown in FIG. 20. FIG. 21 is a flow diagram illustrating a method 350 for generating triangle strips in an illustrative embodiment of the present invention for changed view-dependent parameters and is used with method 302. Method 350 produces triangle strips with a length of 10–15 faces per strip for efficient rendering.

At step 352, a list of active faces fεF is traversed. A test is conducted at step 354 to determine if a face f (e.g., 344) has not yet been rendered. If face f has been rendered, then a new triangle strip is not started. If face f has not yet been rendered, then a new triangle strip (e.g., 340) is started at step 356 for face f Face f is rendered at step 358. A test is conducted at step 360 to determine if any of the faces adjacent to the face f have not been rendered. If an adjacent face has not been rendered, it is rendered at step 362 and added to the triangle strip. Adjacent faces with similar characteristics are considered so a triangle strip which does not cause changes to the graphics state of the graphics hardware is created.

To reduce fragmentation, the triangle strip 340 is built in a clockwise spiral (e.g., 342 to 344) in an illustrative embodiment of the present invention. In an alternative embodiment of the present invention, a counter-clockwise spiral (e.g., 344 to 342) is used for the triangle strip 340. When the test at step 360 fails (i.e., all adjacent faces have been rendered), the triangle strip has reached a dead end (e.g., 344), and the traversal of the list of faces F at step 354 resumes at a new face (e.g., 346). One bit of the Face.matid field (Table 2) is used as a boolean flag to record rendered faces. The rendered face bits are quickly cleared with a second pass through F when all faces have been rendered.

Parametric Surfaces

In an illustrative embodiment of the present invention real-time adaptive tessellation of parametric surfaces is used. As is known in the art, tessellation is the process of triangulating a smooth surface with the texture, color and shadowing. FIG. 22 is a flow diagram illustrating a method 364 for adaptive tessellation of parametric surfaces. Method 364 is completed as a pre-computation in an illustrative embodiment of the present invention. In an alternative embodiment of the present invention, method 364 is completed in real-time. At step 366 a dense tessellation mesh (i.e., detailed) of a surface of a graphical object is computed. The dense tessellation mesh includes approximations of the texture, shading, and color of vertices, edge, and faces of the graphical model. At step 368, the dense tessellation mesh is used to construct a progressive mesh sequence. At step 370, the progressive mesh sequence is truncated to a desired level of detail. At run-time, the truncated progressive mesh sequence is refined at steps 78–80 of FIG. 4 according to a viewpoint e 262 based on a set of changing view-dependent parameters.

Although the tessellation is fixed prior to run-time, the run-time implementation requires no tessellation trimming or stitching, is efficient since an incremental refinement is used (e.g., method 302) and is highly adaptable for tessellations whose connectivities adapt to both surface curvature and to the viewpoint.

Adaptive refinement system

Figure 23A:
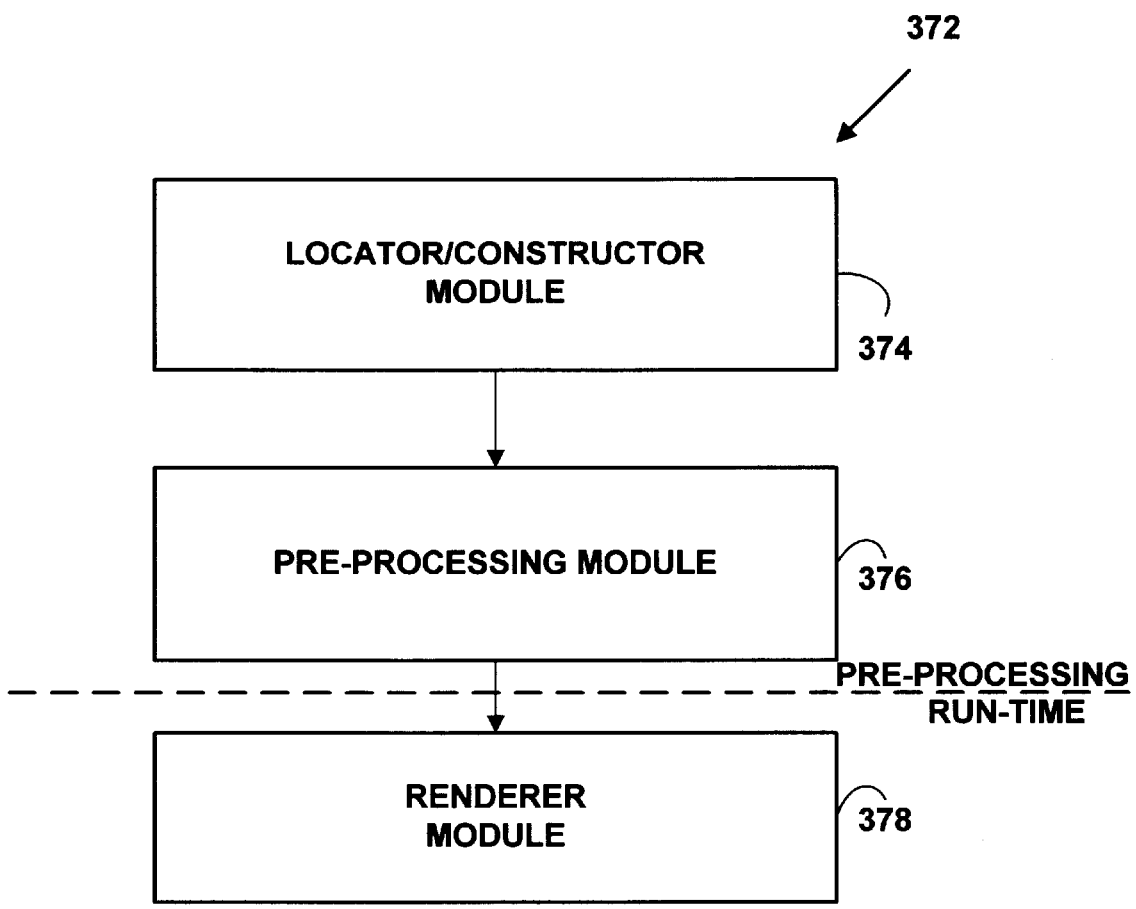
FIGS. 23A and 23B are block diagrams illustrating a system for an illustrative embodiment of the present invention.
Figure 23B:
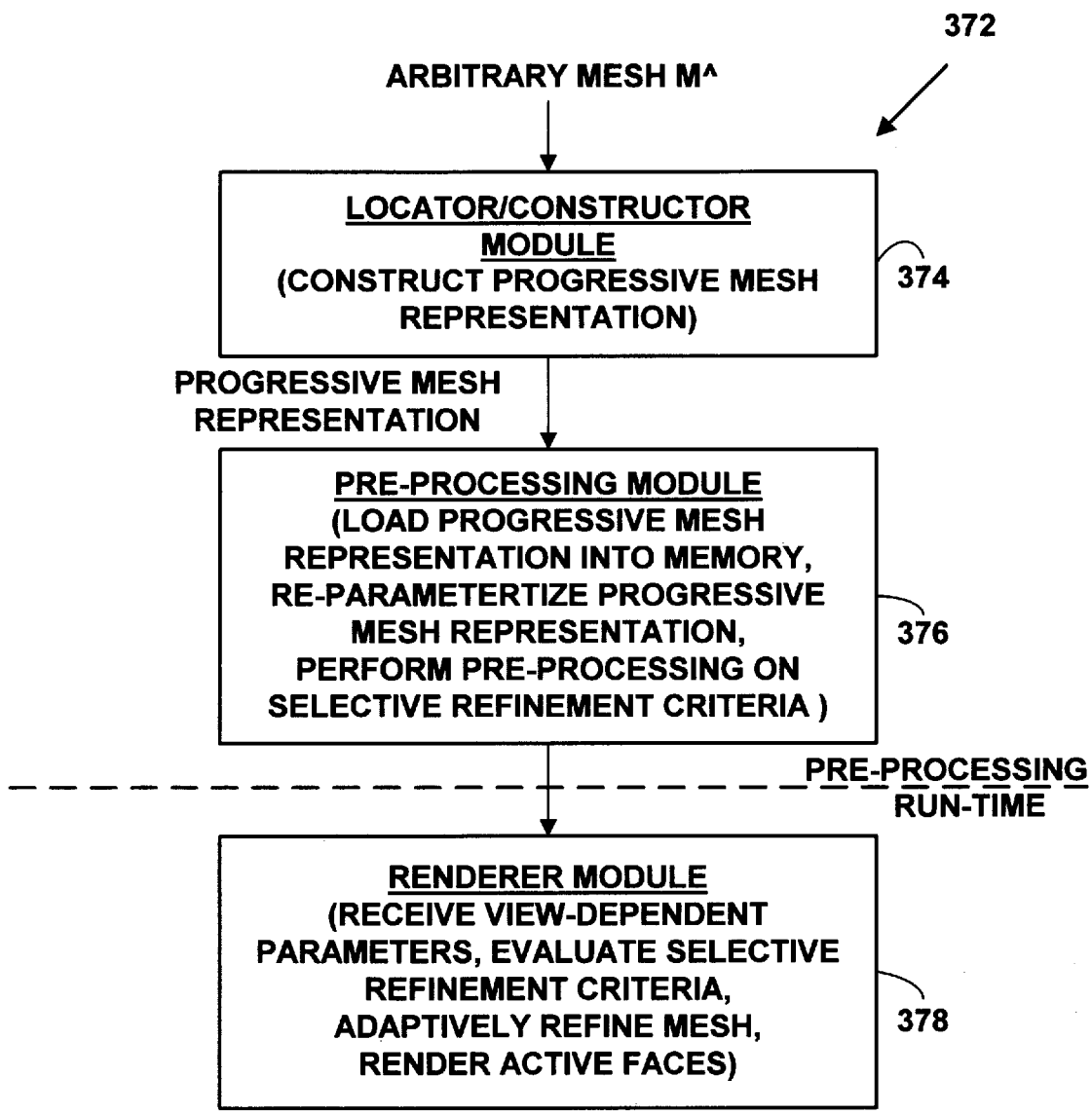

FIGS. 23A and 23B are block diagrams illustrating a system 372 for an illustrative embodiment of the present invention. The system 372 includes a locator/constructor module 374 which locates N-data structure records for an arbitrary progressive mesh representation M^. In an alternative embodiment of the present invention, loader/constructor module 374 constructs the N-data structure records for arbitrary progressive mesh representation M^ in memory system 16 of computer system 10. A pre-processing module 376 is used to load the progressive mesh representation in memory system 16 of computer system 10, re-parameterizes the progressive mesh representation and pre-processes the progressive mesh representation using a set of selective refinement criteria (72–76, FIG. 4). To adaptively refine the arbitrary progressive mesh M^ at run-time, a renderer module 376 receives view-dependent parameters, evaluates selective refinement criteria, adaptively refines mesh, and renders active faces on a display device for a user (78–80, FIG. 4). The renderer module can be any combination of hardware and software known in the art which is used to render a graphical image. In an illustrative embodiment of the present invention, an Indigo2 Extreme (e.g., a 150 MHz, R4400 with 128 MB of memory) graphics system by Silicon Graphics of Mountain View, California is used as renderer module 378. However, other renderers could also be used. The locator/constructor module 374 and the pre-processing module 376 are implemented as software application programs in the Silicon Graphics system. However, other configurations could also be used. More or fewer modules could also be used for system 372, and the functionality of modules 374–378 can be split into additional modules, combined into fewer modules, and used at pre-progressing or at run-time. FIG. 23B is a block diagram illustrating the details for system 372 described above.

Additional illustrations of the present invention

Additional illustrations of methods and system an illustrative embodiment of the present invention are shown in FIGS. 24–27. FIGS. 24–27 are color illustrations of various aspects of the current invention. FIG. 3 was explained above.

Figure 24A:
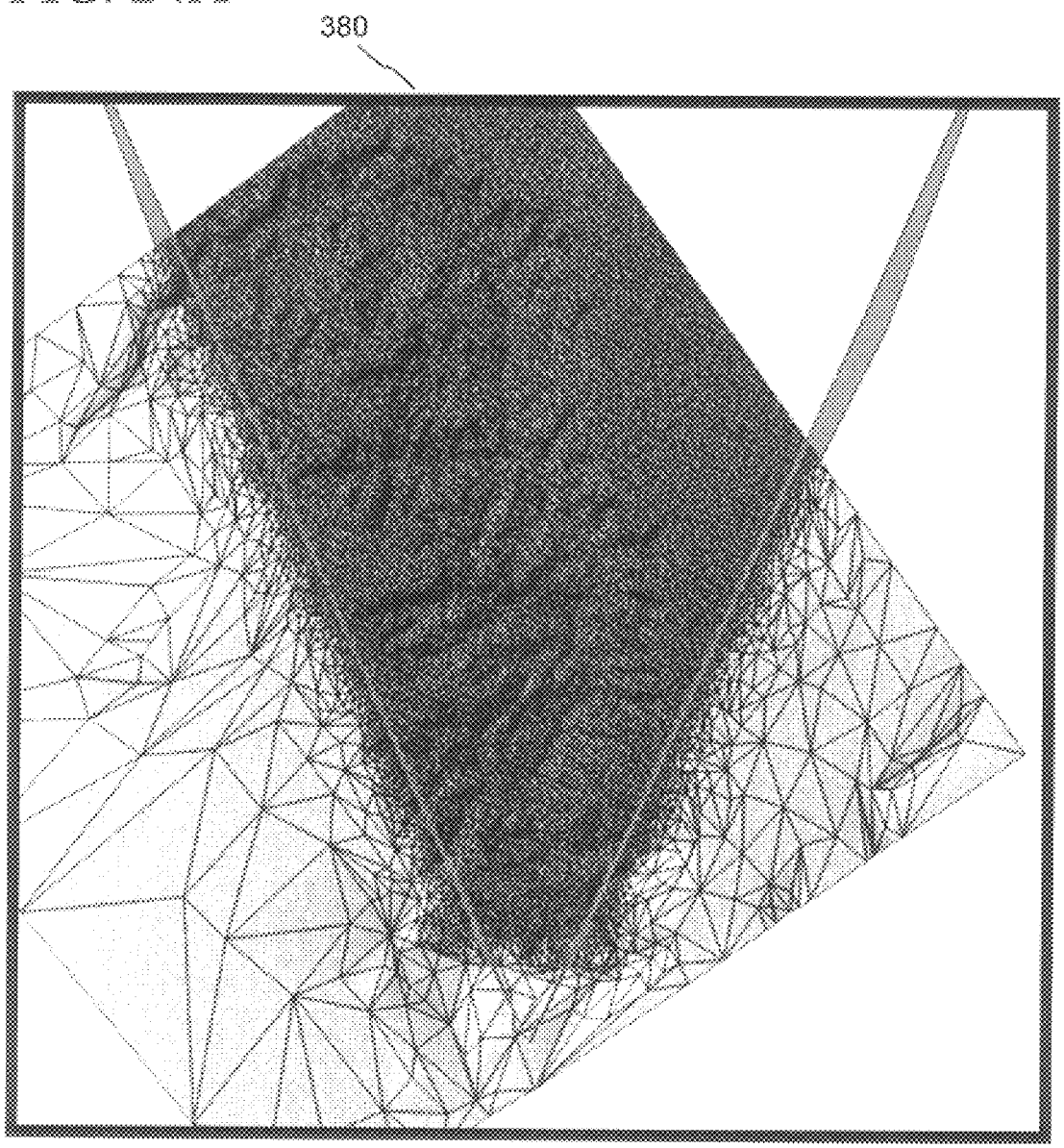
FIGS. 24A–24F are color screen displays illustrating a view-dependent refinement of a progressive mesh for a graphical terrain.
Figure 24B:
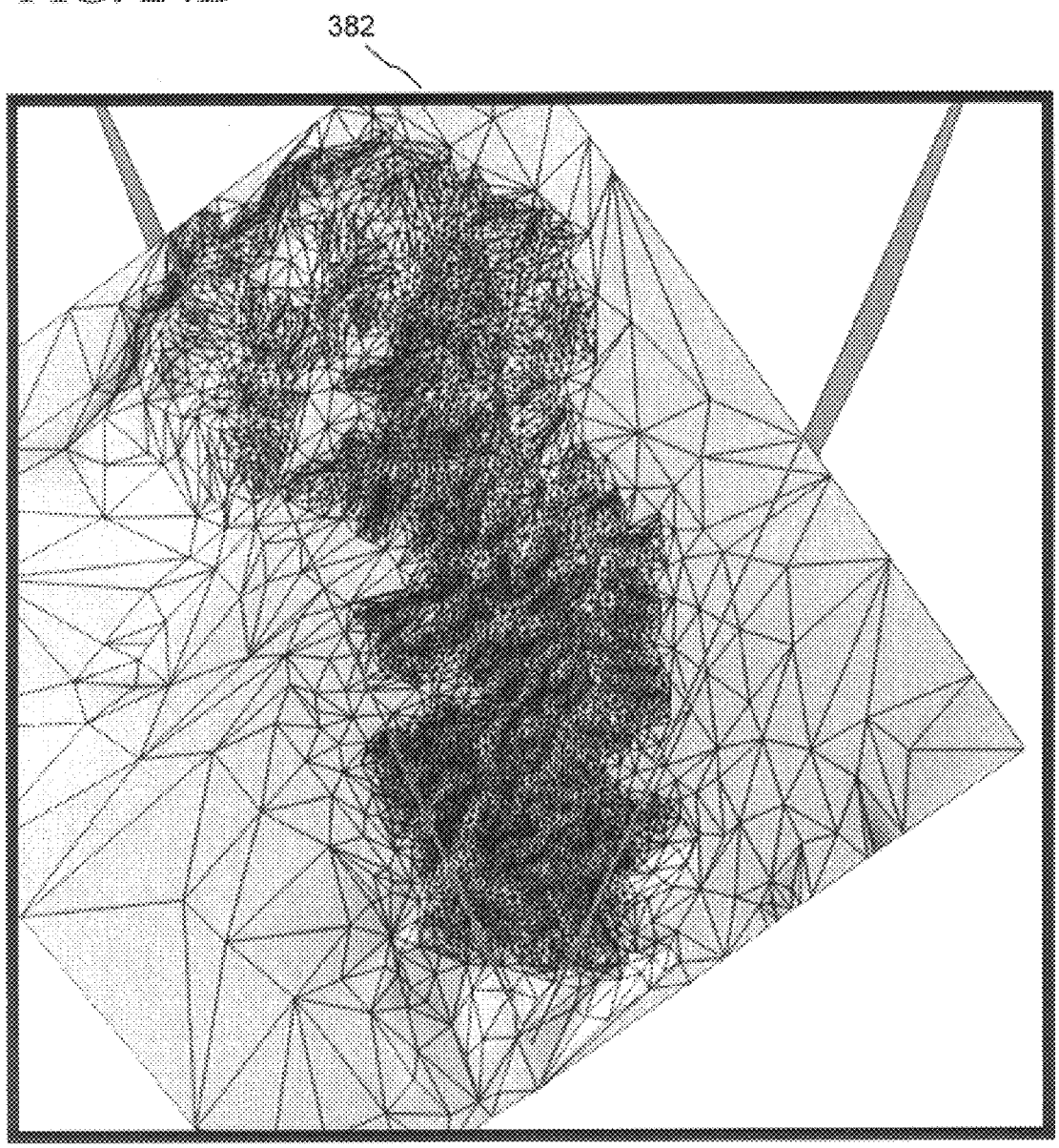
Figure 24C:
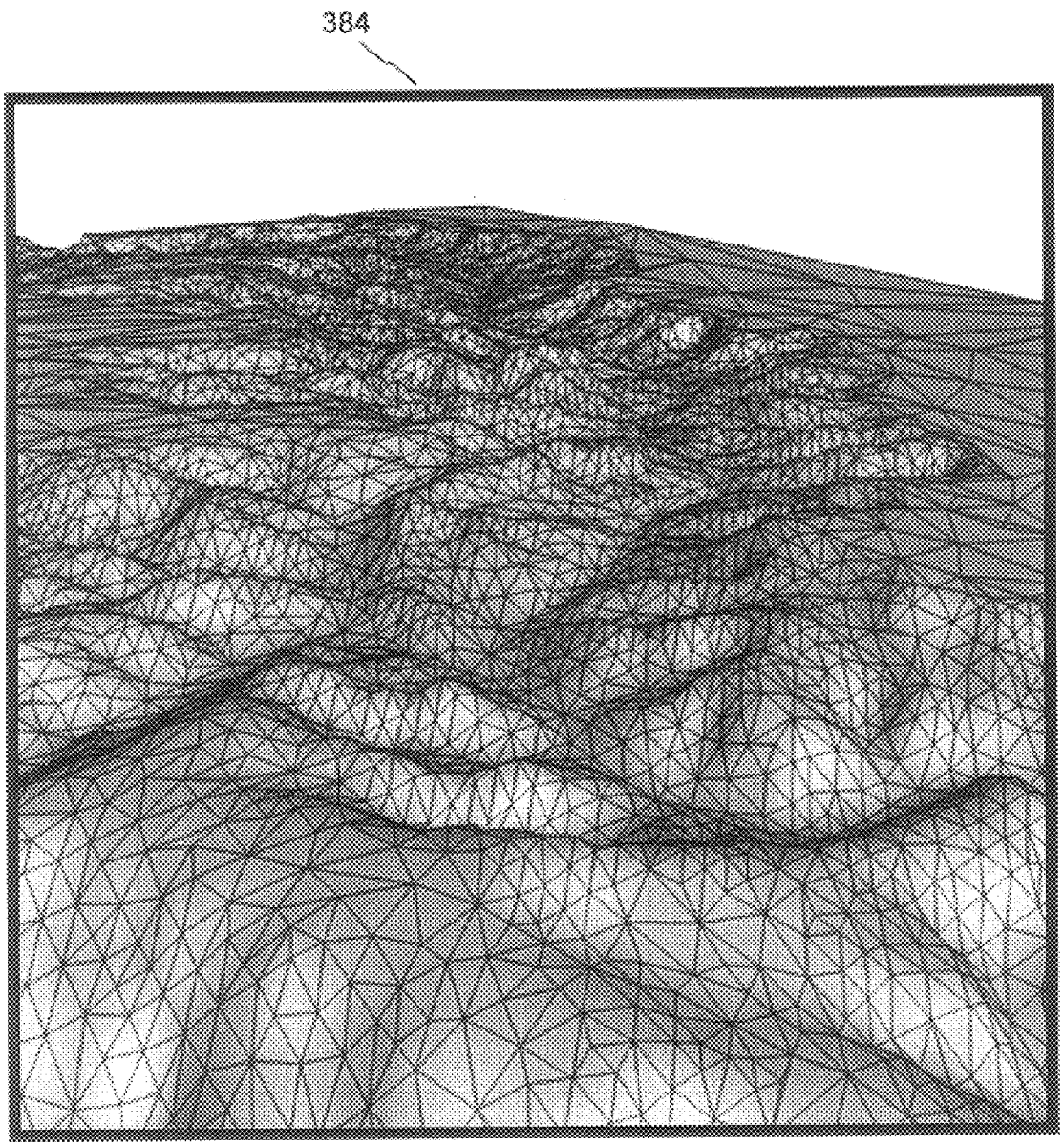

FIGS. 24A–F are color screen displays 380–390 of a view-dependent refinement of a progressive mesh representation. In FIGS. 24A–24B a two dimensional view frustum is highlighted in orange and a pre-determined screen-space geometric error τ is used to display a graphical terrain. FIG. 24A is a color screen display 380 of a top view of progressive mesh representation of a graphical terrain where the screen-space geometric error tolerance τ is 0.0% and there are 33,119 faces. This screen display shows a very high level of detail within the view frustum. The view frustum is shown as the orange "V" pointing towards the top of the figure. FIG. 24B is a color screen display 382 of a top view of the progressive mesh representation of FIG. 24A where the screen-space geometric error tolerance τ is now 0.33% and there are 10,013 faces. FIG. 24B has been adaptively refined with method 70 (FIG. 4). FIG. 24C is a color screen display of a regular view 384 of the progressive mesh representation of FIG. 24A adaptively refined with method 70 of FIG. 4. The progressive mesh representation within the view frustum in FIG. 24 has been coarsened and contain a lesser level of detail in FIGS. 24B and 24C. Method 70 (FIG. 4) can be used with the progressive mesh representation in FIGS. 24B and 24C to create the progressive mesh in FIG. 24A by adaptively refining the meshes in FIGS. 24B and 24C.

Figure 24D:
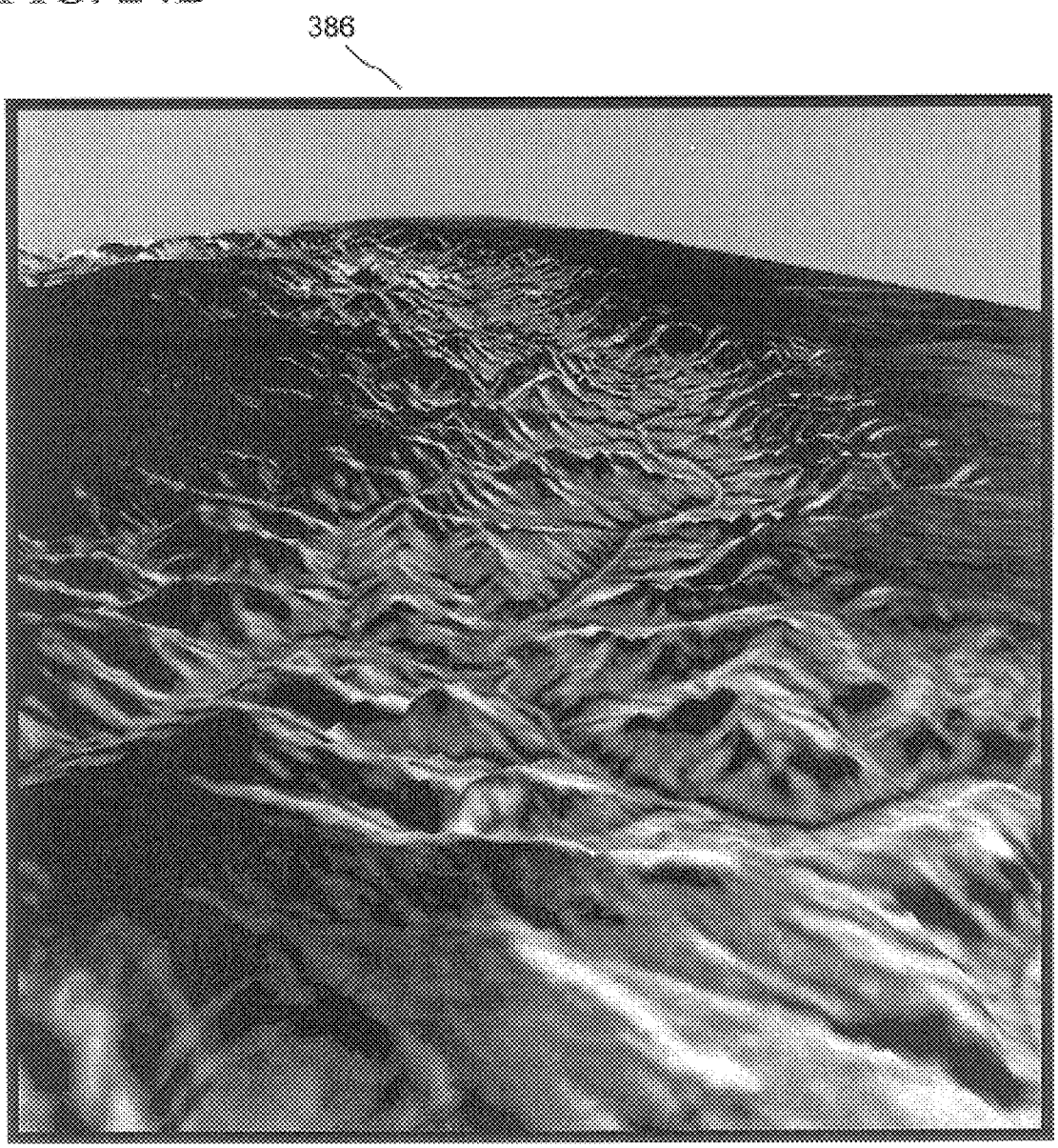
Figure 24E:
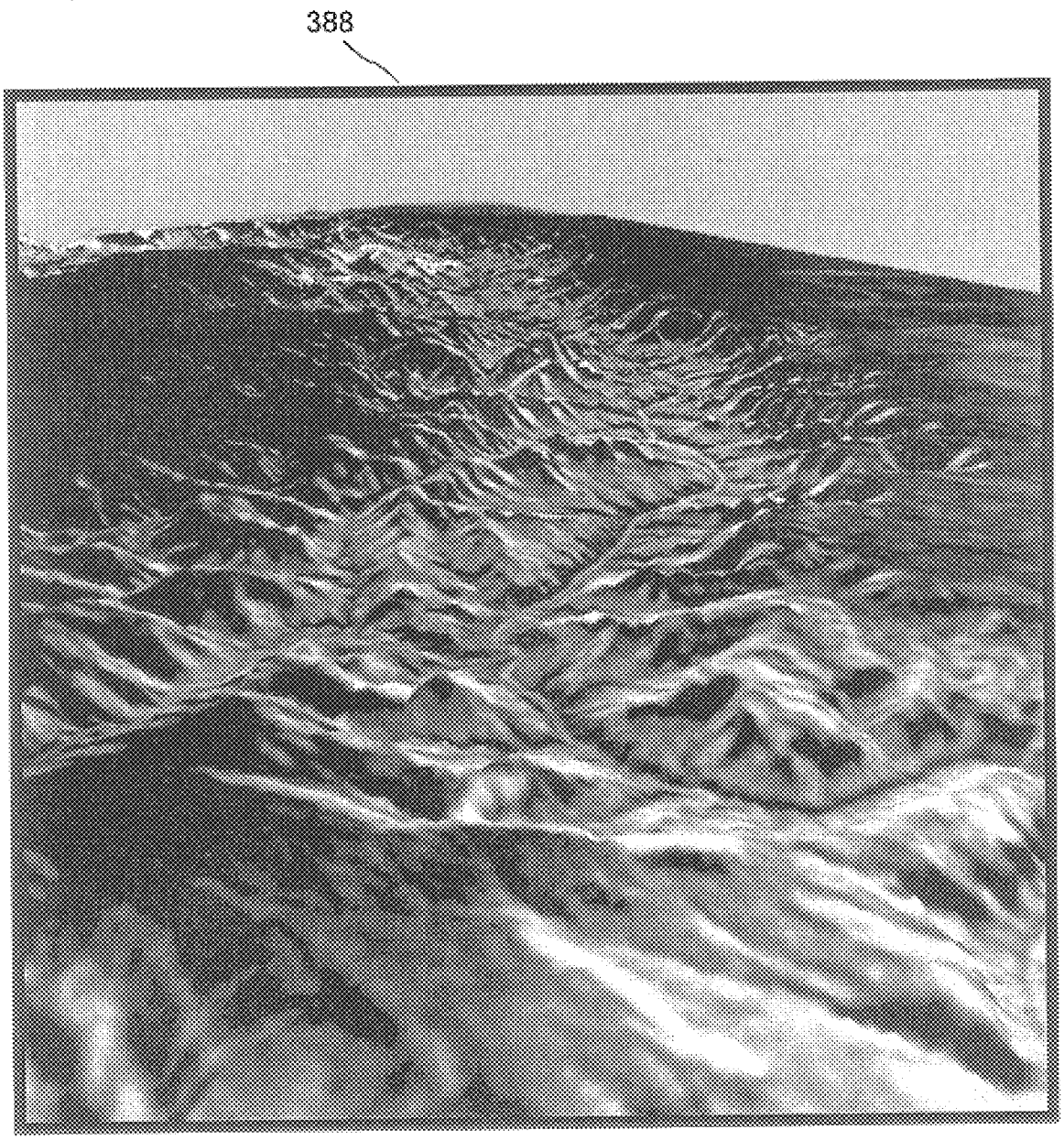
Figure 24F:
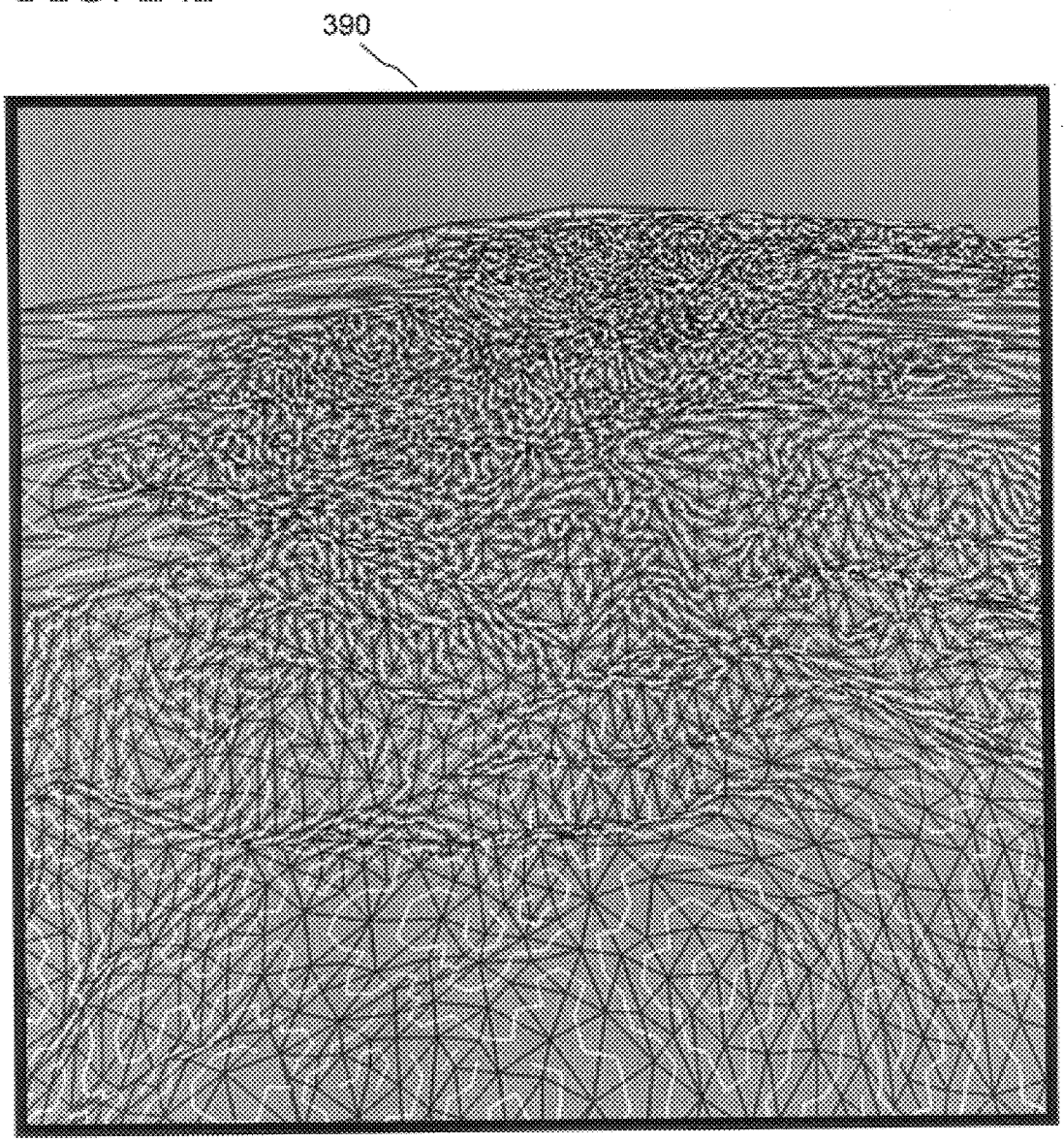

FIG. 24D is a color screen display 386 of a texture mapped progressive mesh representation M^ with 79,202 faces. FIG. 24E is a color screen display 388 of a texture mapped progressive mesh M^ with 10,103 faces. As can be seen in FIGS. 24D and 24E, there is almost no perceptual difference between the figures even though FIG. 24E has significantly fewer faces (e.g., FIG. 24E was approximated with method 70). FIG. 24F is a color screen display 390 of the triangle strips (yellow lines) which generated from the meshes in FIGS. 24D and 24E. FIGS. 24B, 24C, 24D and 24E have a screen-space geometric error τ of 0.33% which represents 2 pixels for a 600×600 pixel graphical image FIG. 24F shows the creation of triangle strips which have similar characteristics. For example, the dark brown portion of the surface in FIGS. 24D and 24E (upper right corner) correspond to triangle strips in the upper right corner of FIG. 24F.

Figure 25A:
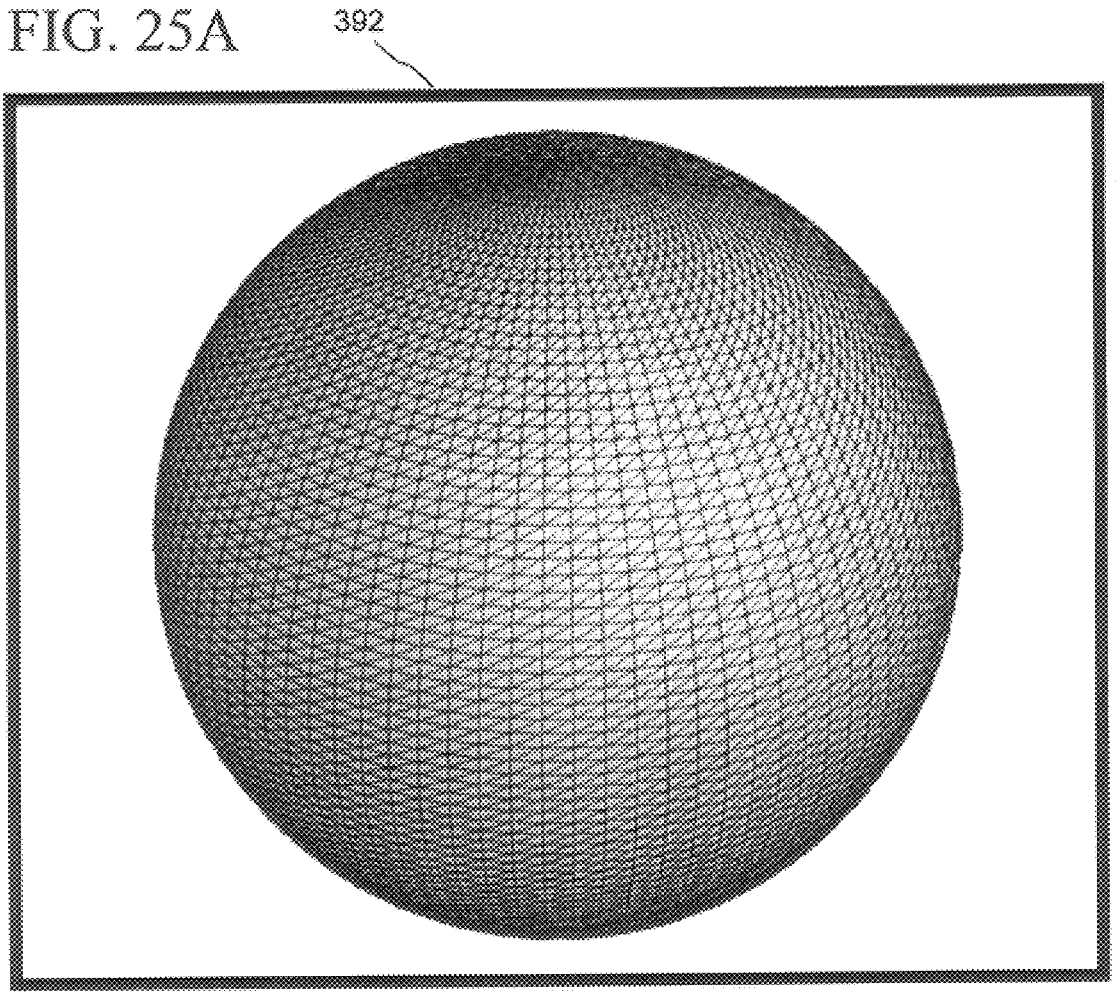
FIGS. 25A–25C are color screen displays illustrating view-dependent refinement for a tessellated sphere.
Figure 25B:
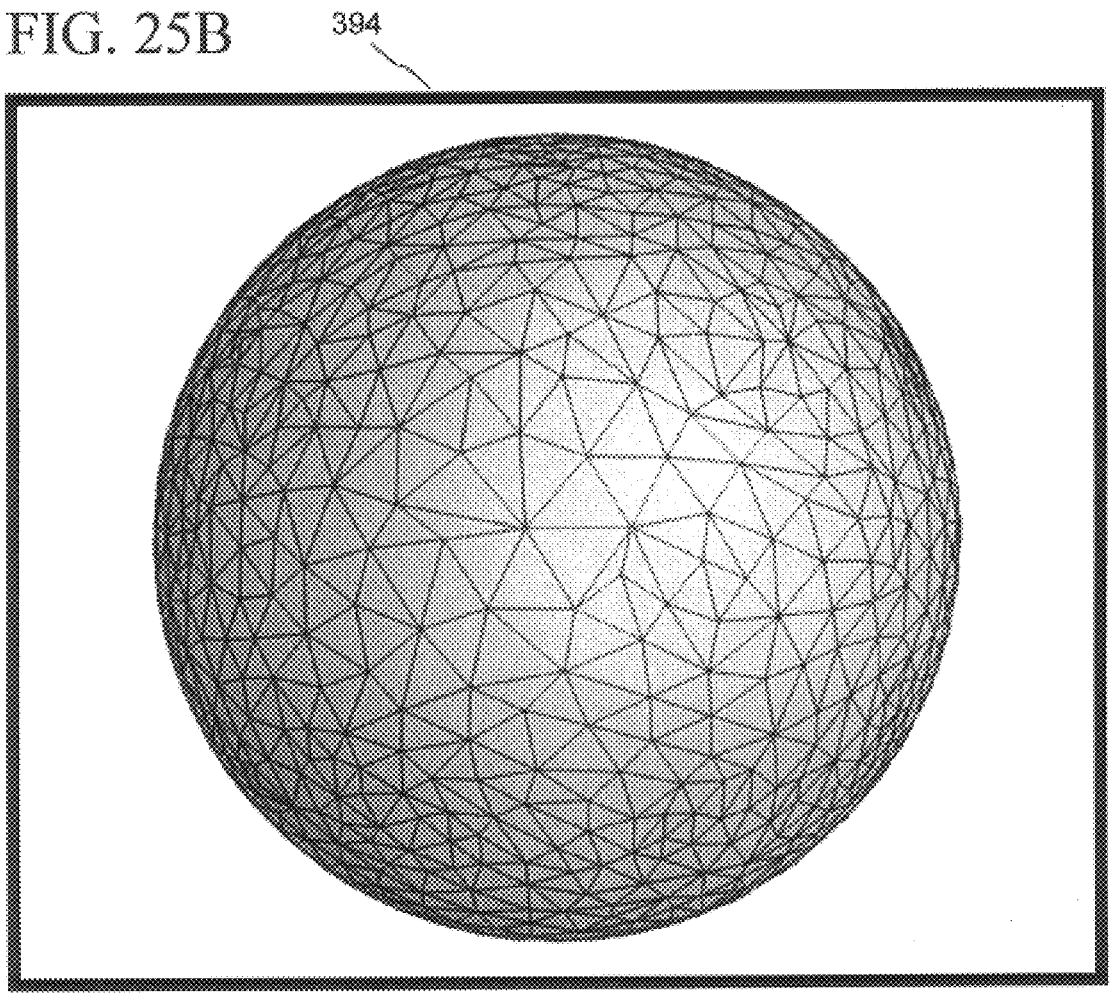
Figure 25C:
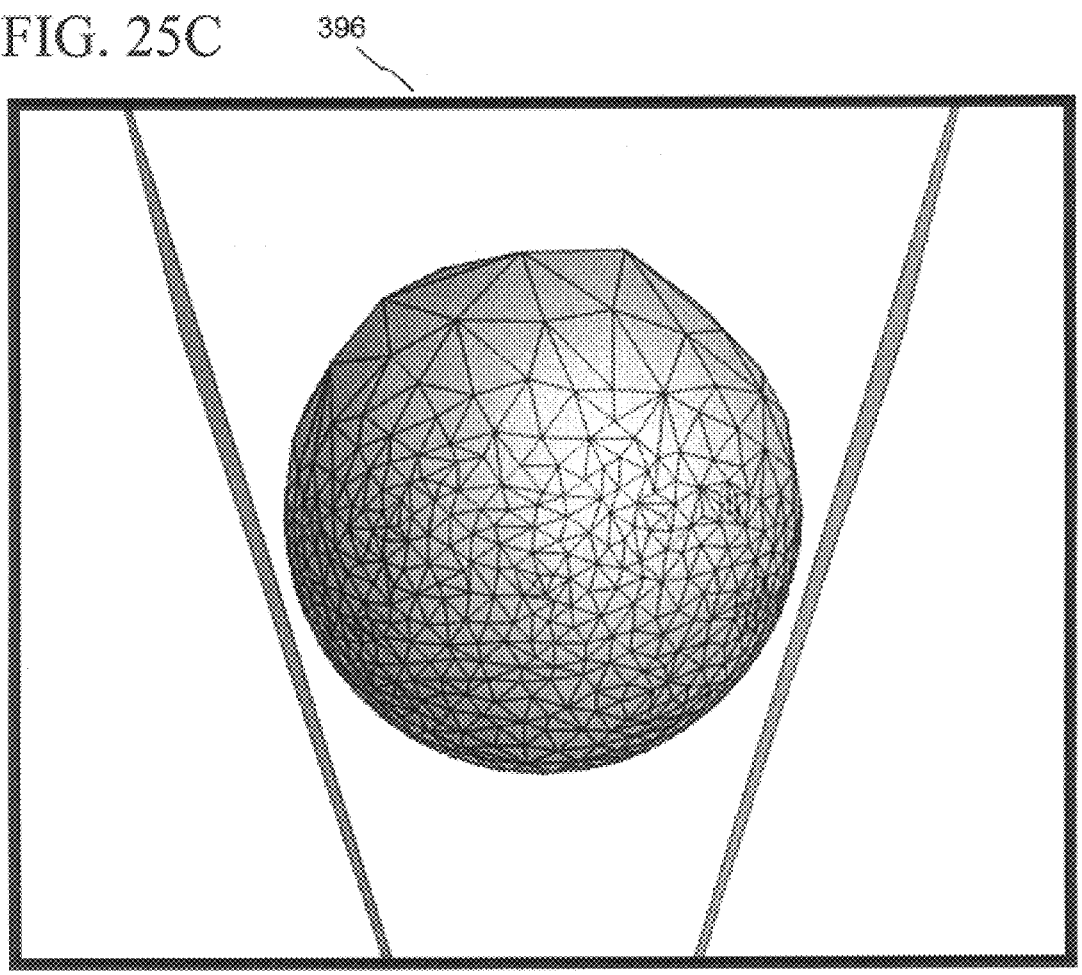

FIGS. 25A–25C are color screen displays 392–396 which illustrate view-dependent refinement using method 70 (FIG. 4) for a sphere. FIG. 25A is a color screen display 392 of an original tessellated sphere with 19,800 faces. FIG. 25B is a color screen display 394 of a front view of the tessellated sphere shown in FIG. 25A created with method 70. FIG. 25C is a color screen display 396 of a top view of the coarsened tessellated sphere from FIG. 25B. As can be seen in FIG. 25B, the sphere looks very similar to the original sphere shown in FIG. 25A. A two-dimensional view frustum is shown with an orange "V." The backfacing portion of the sphere is coarse compared to the forward facing portion of the sphere nearest the "V" in the view frustum which is more refined.

Figure 26A:
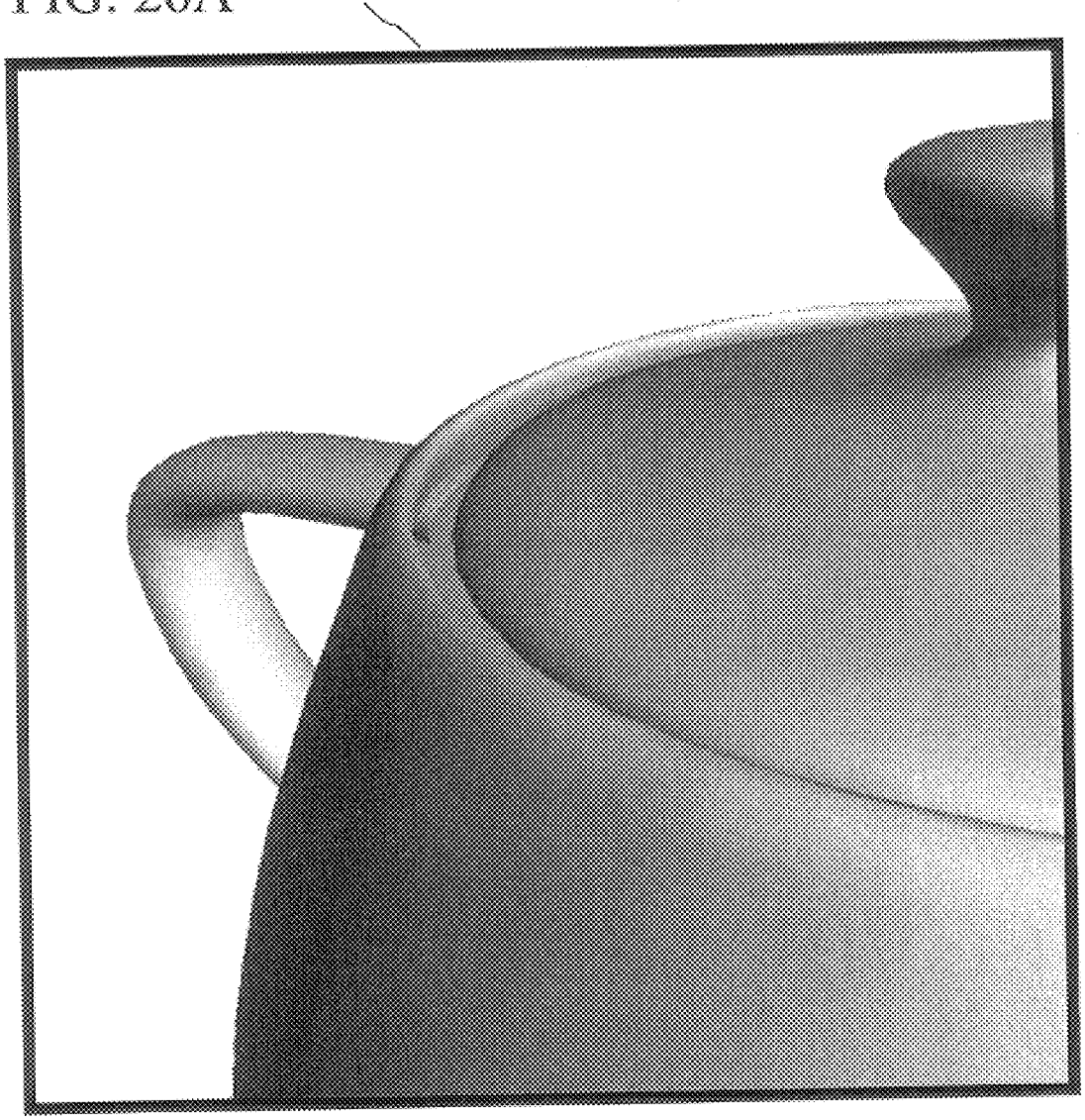
FIGS. 26A–26C are color screen displays illustrating view-dependent refinement of a truncated progressive mesh representation created with a tessellated parametric surface.
Figure 26B:
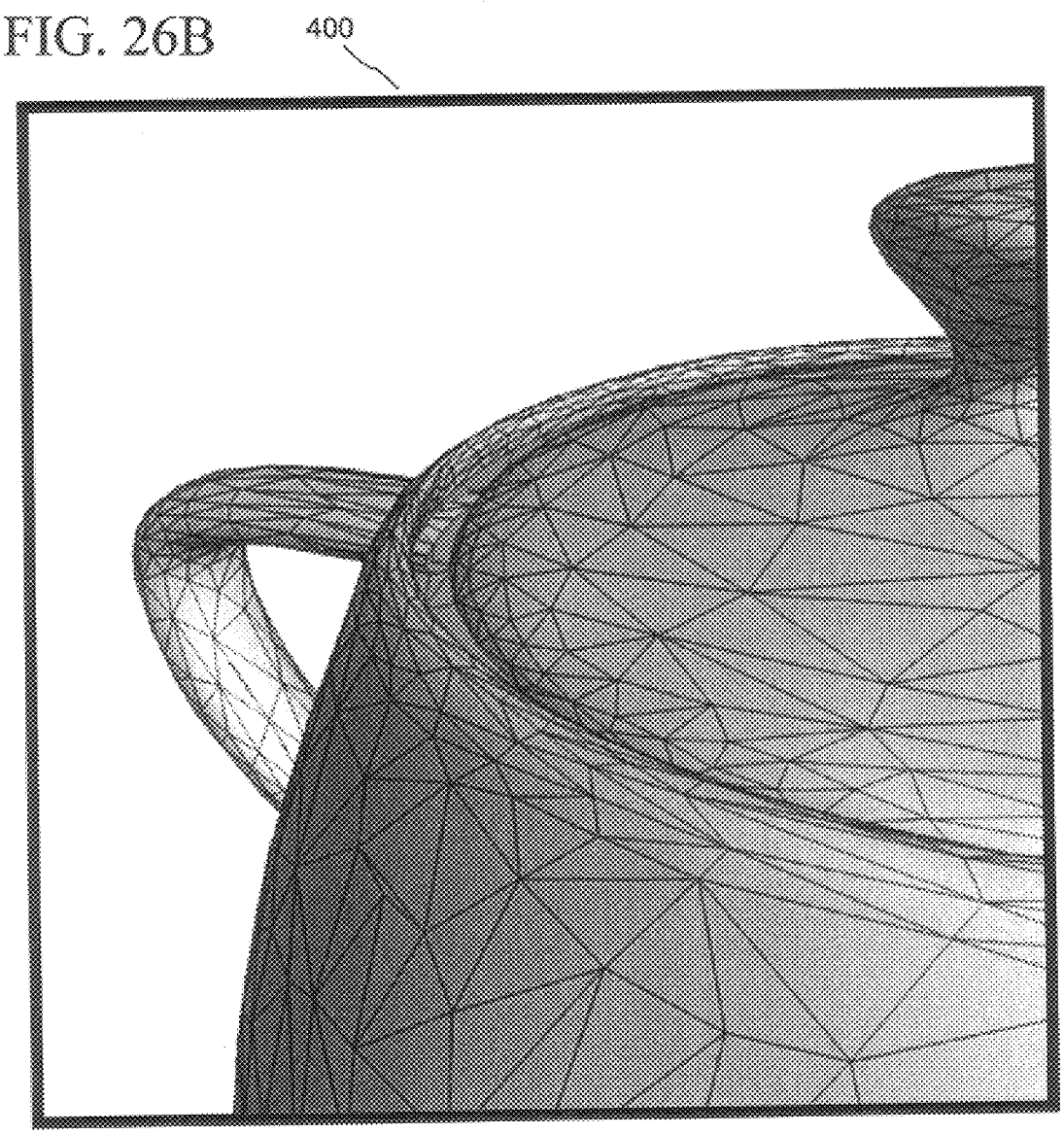
Figure 26C:
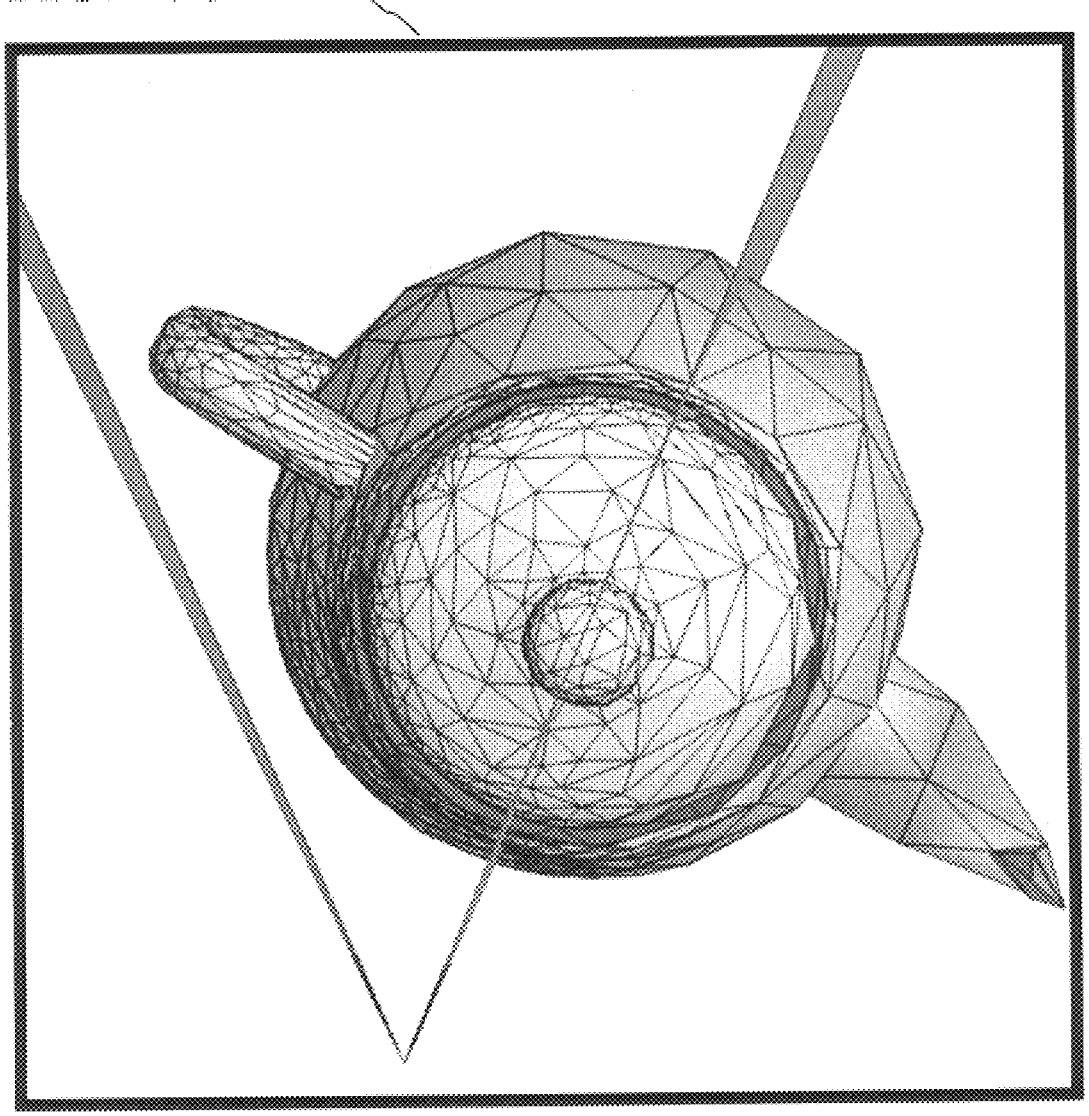

FIGS. 26A–26C are color screen displays 398–402 illustrating view-dependent refinement of a truncated progressive mesh representation (10,000 faces) created with a tessellated parametric surface using method 364 (FIG. 22). FIG. 26A is a color screen display 398 of an original tessellated graphical image (i.e., a portion of a tea pot) with 25,440 faces. FIG. 26B is a color screen display 400 of a truncated progressive mesh representation of a progressive mesh sequence with τ=0.15% and 1,782 faces. FIG. 26C is a color screen display 402 showing a top view of the truncated progressive mesh in FIG. 26B. A two-dimensional view frustum is illustrated by the yellow "V." The coarsening of regions outside the view frustum can be observed to the right of the view frustum.

Figure 27A:
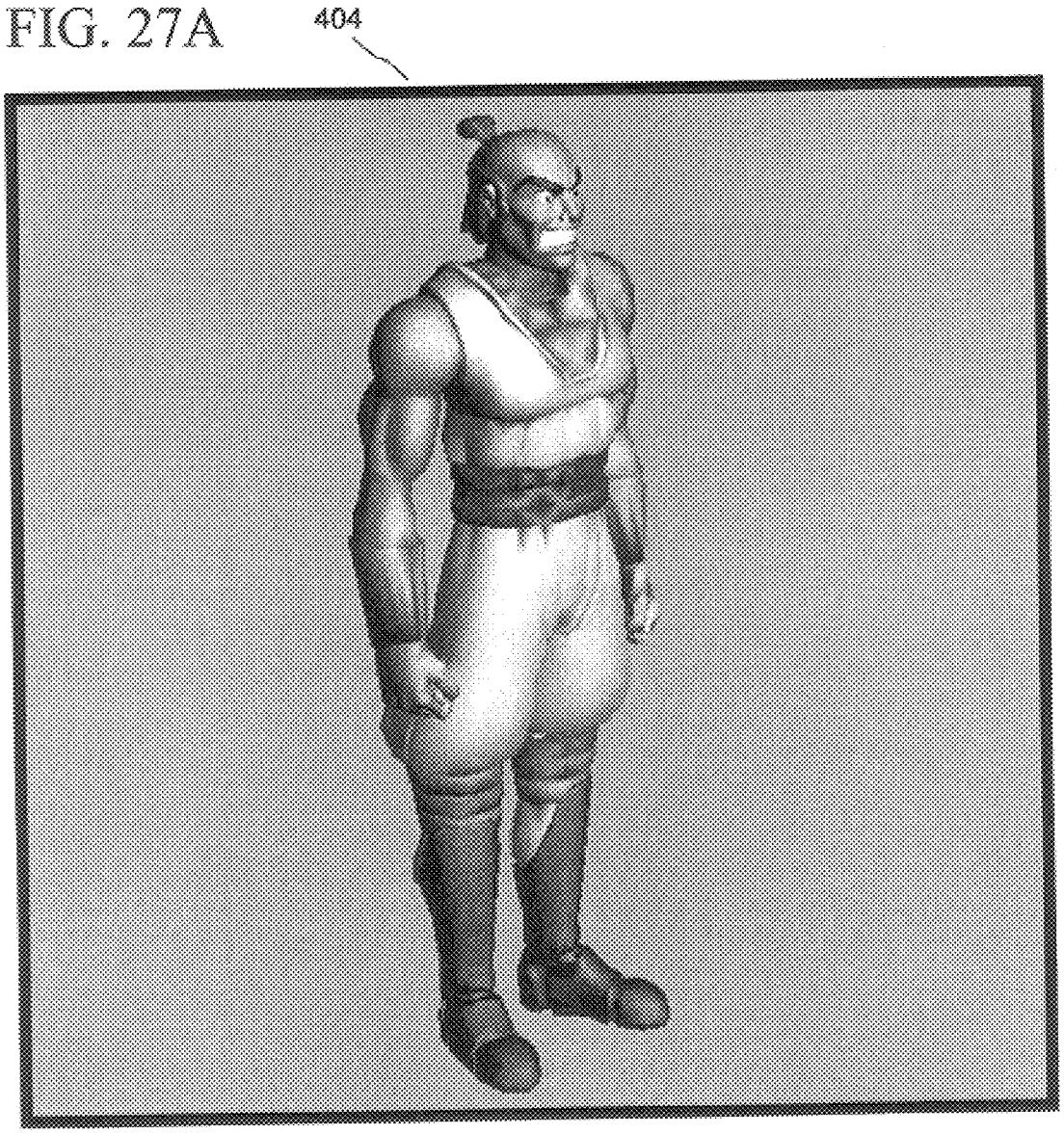
FIGS. 27A–27C are color screen displays illustrating view-dependent refinements of an arbitrary mesh for a graphical character.
Figure 27B:
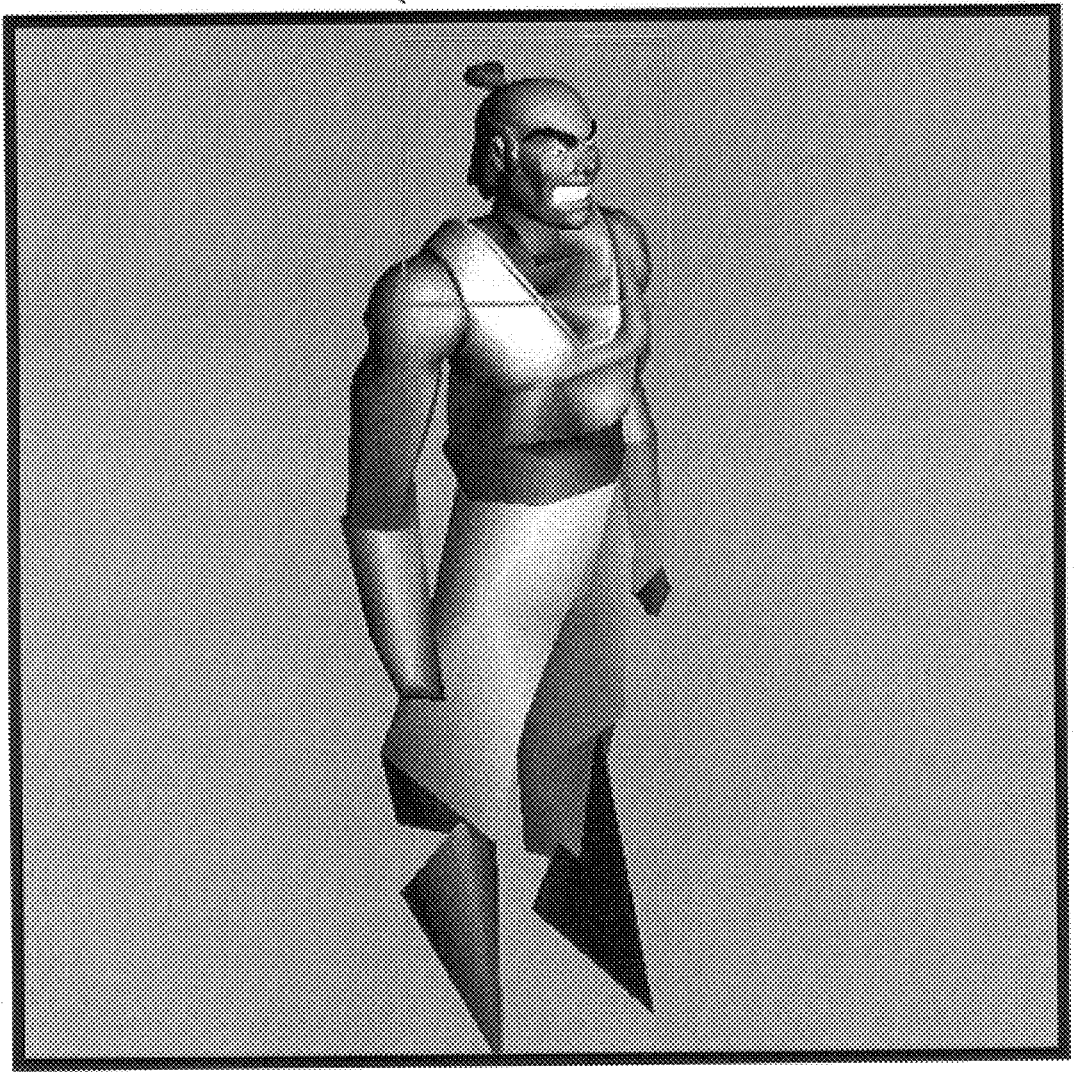
Figure 27C:
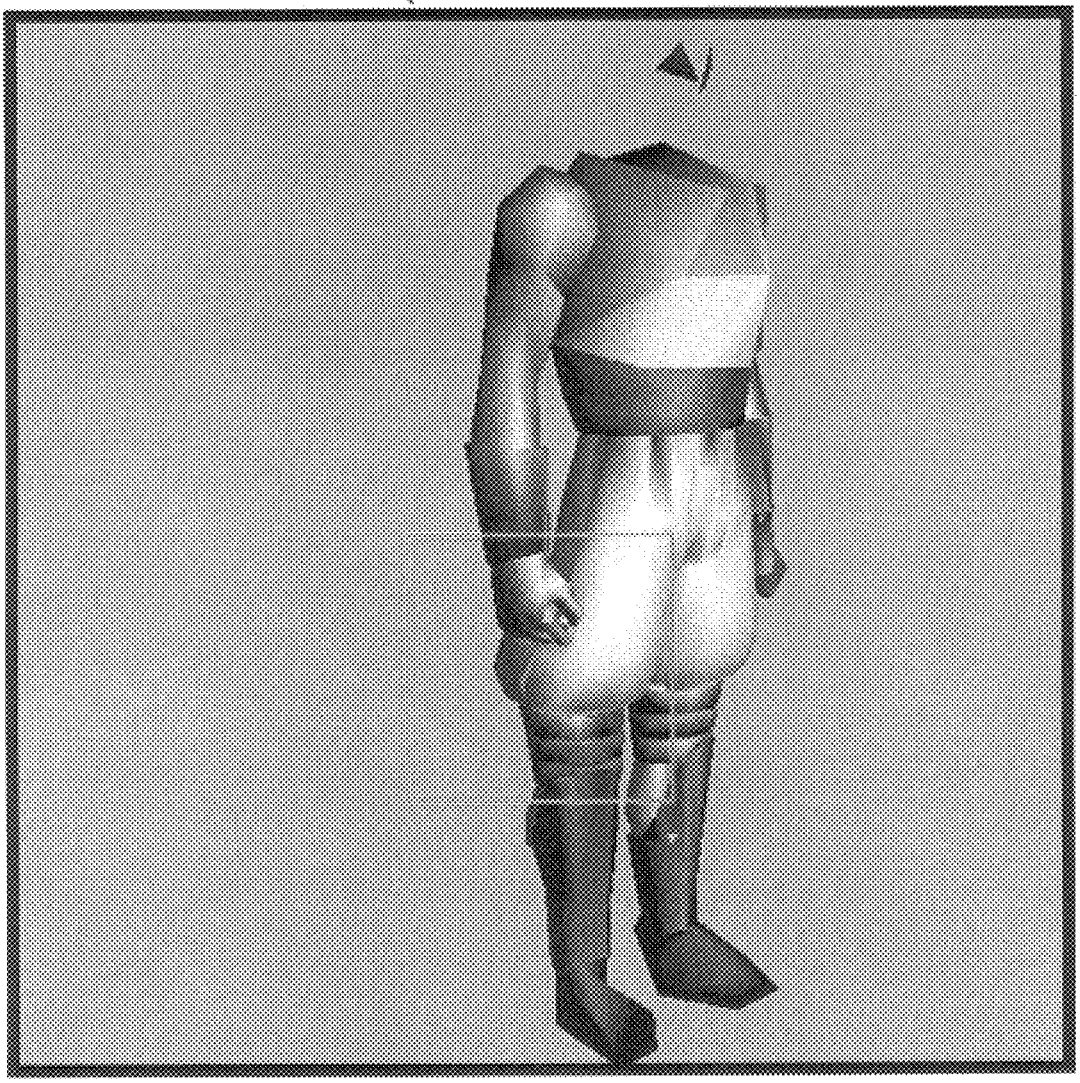

FIGS. 27A–27C are color screen displays 404–408 illustrating two view-dependent refinements of an arbitrary mesh $M^A$ for a graphical character with method 70. FIG. 27A is a color screen display 404 of the original arbitrary mesh $M^A$ representing a graphical character with 42.712 faces. FIG. 27B is a color screen display 406 of a first coarsened progressive mesh with 3,157 faces. The view frustum used is illustrated by the yellow box around the graphical characters head in FIG. 27B. Parts of the graphical figure outside the view frustum have been coarsened and appear as general shapes with less defined detail and are represented by coarsened meshes. The view frustum in FIG. 27C is illustrated by the yellow box around a hand of the graphical character. View-dependent parameters (e.g., the view frustum) have been changed between FIGS. 27B and 27C. The mesh representing the head of the graphical character has been coarsened as shown near the top of FIG. 27C. The hand, knee and top portion of the boot within the view frustum have been refined with method 70 between FIGS. 27B and 27C to show increased level of detail since these areas now appear within the view frustum.

Generalized adaptive refinement for an arbitrary mesh

If M is the set of all possible meshes, a progressive mesh representation $M^{PM}$ of a mesh M, where M∈M, and $M^{PM} \subset M$ defines a continuous sequence of mesh approximations $M^i$ for i={0, . . . ,n-1}, $M^0$, $M^1$, . . . , $M^{n-1}$ of increasing accuracy from which view-independent level-of-detail approximations of any desired complexity can be efficiently retrieved. A view-independent progressive mesh representation $M^{PM}$ is created for a mesh M with a first set of mesh transformations, a first set of constraints on the set of mesh transformations and a set of fixed refinement criteria. The first set of mesh transformations used to create a progressive mesh representation include edge collapse operation 36 and vertex split operation 38 (FIG. 2). The edge collapse operation 36 and vertex split operation 38 are vertex-based operations. The first set of mesh transformations is constrained by a set of constraints is shown in Table 7.

TABLE 7

An edge collapse operation 36 ecol($v_S$, $v_L$, $v_R$, $v_T$) is legal if:
    1. Vertices $v_s$ and $v_t$ are both active vertices, and
    2. faces {$v_s$, $v_t$, $v_l$} and {$v_t$, $v_s$, $v_r$} are active faces. (FIG. 2)
A vertex split operation 38 vsplit($v_S$, $v_L$, $v_R$) is legal if:
    1. Vertex $v_s$ is an active vertex, and
    2. vertices $v_l$ and $v_r$ are active vertices. (FIG. 2)

An initial mesh $M^n$ can be simplified into a coarser mesh $M^0$ by applying a sequence of n−1 successive edge collapse operations 36 using the constraints in Table 7 and the set of fixed refinement criteria. The set of fixed refinement criteria includes placing all candidates for edge collapse 36 into a priority queue, where the priority of each transformation is its energy cost ΔE. The energy cost ΔE accurately fits a set X of points $x_i \epsilon R^3$ with a small number of vertices from the initial mesh $M^n$ into a mesh $M^i$ in the progressive mesh representation.

When edge collapse operation 36 is to be performed, the edge collapse operation at the front of the priority queue (i.e., with the smallest ΔE) is completed and the priorities of edges in the neighborhood of the edge collapse operation a recomputed and placed in the priority queue. For more information see the *Progressive Meshes* paper cited above. The set of fixed refinement criteria allows intermediate mesh approximations $M^i$ to be created for a progressive mesh representation $M^{PM}$ of mesh M. Since edge collapse operations 36 are invertible, a coarser mesh $M^0$ together with a sequence of n-successive vertex split operations 38, can be used to re-create initial mesh $M^n$.

Method 70 (FIG. 4) and the other methods described above for an illustrative embodiment of the present invention are used to adaptively refine an arbitrary triangle mesh $M^{\wedge}$, where $M^{\wedge} \subset M$, and $M^{\wedge}$ is stored as a progressive mesh representation. An adaptively refined mesh $M^A$ is created from arbitrary triangle mesh $M^{\wedge}$ using a second set of constraints on a second set of mesh transformations, and a set of selective refinement criteria. The second set of refinement criteria is used manipulate different portions of the arbitrary mesh $M^{\wedge}$ with different mesh transformations. In an illustrative embodiment of the present invention, the second set of refinement criteria are used to construct view-dependent approximations of an arbitrary mesh $M^{\wedge}$. The second set of mesh transformations include vertex split transformations 82 and edge collapse transformations 84. The constraints in Table 8 below allow vertex split transformations 82 and edge collapse transformations 84 to be applied out of sequence (i.e., not in the rigid total order imposed by the edge collapse operations 36 and vertex split operations 38 for a progressive mesh representation) and consider faces. The second set of mesh transformations (82,84) are used to build a vertex hierarchy (e.g., 150, FIG. 9) used to adaptively refine an arbitrary mesh. The second set of constraints on the second set of mesh transformations used in an illustrative embodiment of the present invention are shown in Table 8 below.

TABLE 8

An edge collapse transformation 84 ecol($v_S$, $v_T$, $v_U$, $f_L$, $f_R$, $f_{n0}$, $f_{n1}$, $f_{n2}$, $f_{n3}$) is legal if:
    1. Vertices $v_t$ and $v_u$ are both active vertices, and
    2. faces adjacent to $f_L$ and $f_R$ are faces {$f_{n0}$, $f_{n1}$, $f_{n2}$, $f_{n3}$} (FIG. 5).
A vertex split transformation 82 vsplit($v_s$, $f_{n0}$, $f_{n1}$, $f_{n2}$, $f_{n3}$) is legal if:
    1. Vertex $v_s$ is an active vertex, and
    2. faces ($f_{n0}$, $f_{n1}$, $f_{n2}$, $f_{n3}$, } are all active faces (FIG. 5).

The set of selective refinement criteria are based on the view-dependent parameters (Table 4, FIG. 10) which include the view frustum, the surface orientation, and a screen space projected error. The set of selective refinement criteria are different than the set fixed refinement criteria discussed above. The set of selective refinement criteria allows asymmetric transformations with varying levels of refinement on a mesh (i.e., areas of a mesh $M^S$ can be refined with vertex split transformations 82 while other areas of the same mesh $M^S$ can be coarsened with edge collapse transformations 84). In contrast, the set of fixed refinement criteria allows only uniform transformations with a fixed level of refinement on a mesh (i.e., a series of edge collapse transformations 36 to move from $M^{i+1}$ to $M^i$, or a series of vertex split transformations 38 to move from $M^i$ to $M^{i+1}$). The set of selective refinement criteria also allow an arbitrary subsequence of vertex split transformations 82 and edge collapse transformations 84 to be applied to a base mesh to create an adaptively refined mesh. However, the present invention is not limited to the second set of constraints on the second set of mesh transformations and the set of selective refinement criteria in the illustrative embodiment described above.

In a generalized embodiment of the present invention, a general framework is used for incrementally adapting any arbitrary mesh which includes an arbitrary set of constraints on an arbitrary set of mesh transformations and an arbitrary set of selective refinement criteria. For example, the arbitrary set of mesh transformations may constrain mesh transformations other than vertex split transformation 82 and edge collapse transformation 84. The arbitrary set of constraints on the arbitrary set of mesh transformations may include more or fewer constraints than those shown in Table 8 above. The arbitrary set of selective refinement criteria may include criteria other than changes in view-dependent criteria such as time-variant parameters and surface-focused parameters. Time-variant parameters provide the ability to focus on different parts of the same graphical image at different time periods (e.g., shining a moving light source on a portion of a graphical image to illuminate the portion). Surface-focused parameters provide the ability to display different information on portions of a surface in a graphical image (e.g., temperature variation over a surface displayed graphically).

Figure 28:
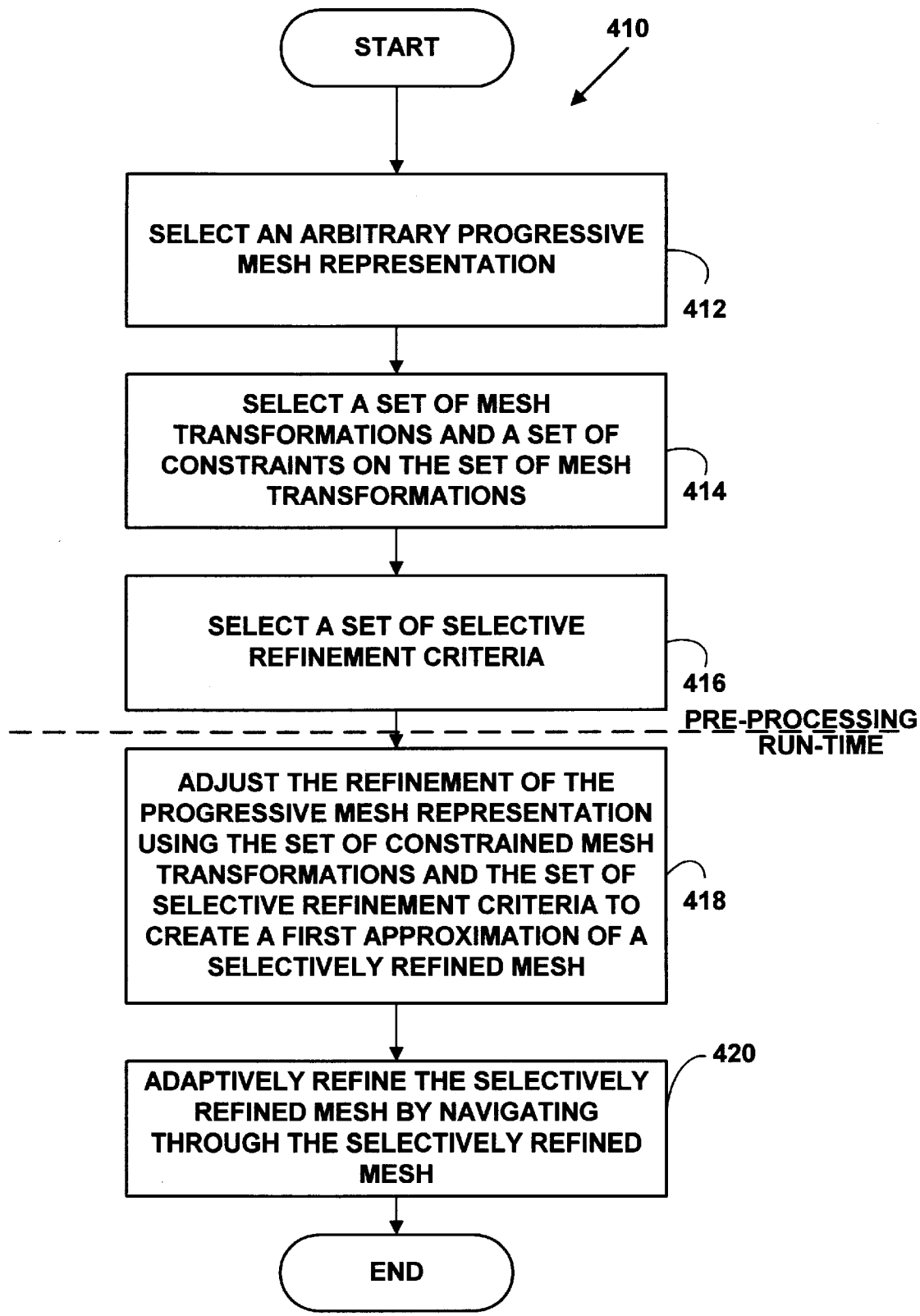
FIG. 28 is a flow diagram illustrating a general method for adaptively refining a mesh.

FIG. 28 is flow diagram illustrating a generalized method 410 for adaptively refining an arbitrary mesh with an arbitrary set of constraints on an arbitrary set of mesh transformations and an arbitrary set of selective refinement criteria. At step 412 an arbitrary mesh is selected. The arbitrary mesh can be any mesh from the set of meshes M. The arbitrary mesh is stored as a progressive mesh representation. However, other mesh representations could also be used. A set of constraints for a set of mesh transformations for the arbitrary mesh is selected at step 414. A set of selective refinement criteria for the arbitrary mesh is selected at step 416. The selective refinement criteria allow varying levels of refinement within the mesh (i.e., refining and coarsening different areas of the mesh same instance of a representation). The refinement of the arbitrary mesh is adjusted at step 418 using the set of constraints for the mesh transformations and the set of refinement criteria and adds geometric primitives to the arbitrary mesh thereby creating a first approximation of a selectively refined mesh. The selective refined mesh is adaptively refined by navigating through the selective refined mesh at step 420 based on changes affecting the refinement criteria to create an adaptively refined mesh. For example navigation is completed with a vertex front through a vertex hierarchy created for the mesh and provides varying levels of refinement within the mesh.

The view-dependent refinement of meshes (method 70, (FIG. 4) etc.) described above is one specific example of an arbitrary mesh adaptively refined with generalized method 410. For example, an arbitrary triangle mesh $M^\wedge \epsilon M$ is selected at step 412. The arbitrary triangle mesh $M^\wedge$ is stored as a progressive mesh representation, $M^0, \ldots, M^{n-1}$, $M^n = M^\wedge$. A set of constraints (e.g., Table 8) for a set of mesh transformations (e.g., vertex split transformation 82 and edge collapse transformation 84) are selected at step 414. A set of selective refinement criteria (e.g., changing view-dependent parameters (FIG. 10)) is selected at step 406. The refinement of the mesh is adjusted at step 418 using the set of constraints and the set of refinement criteria to create a first approximation of a selectively refined mesh (e.g., steps 72–76, FIG. 4, Table 5). The selective refined mesh is adaptively refined by navigating through the selectively refined mesh at step 410 based on changes affecting the refinement criteria (e.g., steps 78–80, FIG. 4, Table 6) to create an adaptively refined mesh.

Generalized method 410 can be used on an arbitrary mesh by replacing selected components described for an illustrative embodiment of the present invention. A new set of mesh transformations can be selected by replacing the vertex split 82 and edge collapse 84 transformations with new mesh transformations. A new set constraints can replace the constraints shown in Table 8 (which may also result in a new vertex hierarchy construction). A new set of selective refinement criteria can be selected (e.g., by replacing the view-dependent parameter function calls the qrefine($v_S$) sub-routine shown in Table 5). A new method of navigating through the selectively refine mesh can also be selected (e.g., by replacing the adapt_refinment( ) sub-routine shown in Table 6).

Generalized method 410 creates an adaptively refined mesh with varying levels of refinement from an arbitrary mesh stored as a progressive mesh sequence that can be used with almost any underlying geometric model used to display a graphical image. The resulting adaptively refined mesh that requires fewer polygons for a desired level of approximation than other refinement schemes known in the art. As a result of adaptive refinement a reduction in the number of polygons is achieved by coarsening regions of the mesh that are not visible by a viewer under selected view conditions which allows the graphical image to be rendered using fewer computer resources. Adaptively refined meshes can be also used to for progressive transmission of a mesh over a computer network like the Internet or an intranet for an image used in a computer game or other application.

It should be understood that the programs, processes, and methods described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of my invention can be applied, it should be understood that the illustrated embodiments are exemplary only, and should not be taken as limiting the scope of my invention. For example, the steps of the flow diagrams may be taken in sequences other than those described, and the claims should not be read as limited to the described order unless stated to that effect. Therefore, I claim as my invention all such embodiments as come within the scope and spirit of the following claims and equivalents thereto.

I claim:

1. A method of adaptively selectively refining a variable resolution representation of an object for producing computer graphics images of the object, the method comprising:

constructing a current mesh model of the object, the current mesh model defining a surface of interconnected polygons;

in a plurality of iterative traverses over a plurality of localities on the current mesh model, determining whether to apply a localized mesh refinement transformation or mesh coarsening transformation at individual such localities according to a set of selective refinement criteria and a set of transformation constraints, so as to thereby adaptively selectively refine the current mesh model; and producing computer graphics images according to viewing parameters using the adaptively selectively refined current mesh model;

wherein the selective refinement criteria comprise a time-variant parameter that defines movement of a light source about the object.

2. A method of adaptively selectively refining a variable resolution representation of an object for producing computer graphics images of the object, the method comprising:

constructing a current mesh model of the object, the current mesh model defining a surface of interconnected polygons;

in a plurality of iterative traverses over a plurality of localities on the current mesh model, determining whether to apply a localized mesh refinement transformation or mesh coarsening transformation at individual such localities according to a set of selective refinement criteria and a set of transformation constraints, so as to thereby adaptively selectively refine the current mesh model; and producing computer graphics images according to viewing parameters using the adaptively selectively refined current mesh model;

wherein the selective refinement criteria comprise a surface-focused parameter that defines a temperature variation over the surface.

3. The method of claim 1 wherein the localized mesh refinement transformation is a vertex split that replaces a vertex having a set of four neighboring polygonal faces with two resulting vertices and adds two polygonal faces between and adjacent to the four neighboring polygonal faces, and the transformation constraints on the localized mesh refinement transformation comprise that the vertex and the set of four neighboring polygonal faces are currently in the current mesh model.

4. The method of claim 1 wherein the localized mesh coarsening transformation is an edge collapse that replaces two vertices adjacent along an edge between two polygonal faces having a set of four neighboring polygonal faces, and the transformation constraints on the localized mesh coarsening transformation comprise that the two vertices, the two polygonal faces and the set of four neighboring polygonal faces are currently in the current mesh model.

5. The method of claim 1 wherein the viewing parameters comprise a viewing frustum, and wherein the selective refinement criteria further comprise that a region of the current mesh model affected by a mesh refinement transformation applied at a respective locality is within the viewing frustum.

6. The method of claim 1 wherein the viewing parameters comprise a view point relative to the current mesh model, and wherein the selective refinement criteria further comprise that the surface of the current mesh model at a respective locality is oriented away from the view point.

7. The method of claim 1 wherein the viewing parameters comprise a view screen projection, and wherein the selective refinement criteria further comprise that a screen space geometric error introduced by a mesh refinement transformation at a neighborhood of a respective locality is less than a tolerance.

8. The method of claim 1 wherein the viewing parameters comprise a view screen projection, and wherein the selective refinement criteria further comprise that a space on the view screen projection of a deviation of a neighborhood at a respective locality which is introduced by a mesh refinement transformation is less than a tolerance.

9. The method of claim 1 wherein the viewing parameters comprise a viewing frustum, a view point relative to the current mesh model, and a view screen projection; and wherein the selective refinement criteria further comprise that a region of the current mesh model affected by a mesh refinement transformation applied at a respective locality is within the viewing frustum, that the surface of the current mesh model at the respective locality is oriented away from the view point, and that a screen space geometric error introduced by a mesh refinement transformation at a respective locality is less than a tolerance.

10. A computer-readable data storage medium having computer-executable program code stored thereon operative to perform the method of claim 1 when executed on a computer.

11. A computer system programmed to perform the method of claim 1.

12. A method of adaptively selectively refining a variable resolution representation of an object for producing computer graphics images of the object, the method comprising:

generating a progressive mesh representation of a mesh data model of the object by selecting coarsening mesh transformations according to a geometry optimizing metric, the mesh data model defining a surface of interconnected polygons having arbitrary connectivity, the progressive mesh representation comprising a base mesh and a sequence of mesh refinement transformations, where the base mesh results from the coarsening mesh transformations and where the sequence of mesh refinement transformations exactly reconstruct the mesh data model when applied to the base mesh;

constructing a vertex hierarchy having a plurality of nodes in parent-child relationships from the progressive mesh representation in a top-down fashion from base mesh to the mesh data model, wherein a root node subset of the nodes represent the vertices of the base mesh of the progressive mesh representation, wherein the parent-child relationships between nodes are defined by the sequence of mesh refinement transformations, and wherein a leaf node subset of the nodes represent the vertices of the mesh data model;

constructing a current mesh from the base mesh and mesh refinement transformations selected from the sequence, such that the current mesh has a plurality of vertices defined by a vertex front across the vertex hierarchy;

in a plurality of iterative traverses of the vertices in the vertex front, determining whether to coarsen or refine the current mesh at individual such vertices by respectively applying the mesh refinement transformation that defines the relationship of such vertex to its children in the vertex hierarchy or a reverse of the mesh refinement transformation that defines the relationship of such vertex to its parent in the vertex hierarchy, and adjusting the vertex front in accordance with the applied transformations, so as to thereby adaptively selectively refine the current mesh; and producing computer graphics images using the adaptively selectively refined current mesh.

13. The method of claim 12 wherein the step of determining whether to coarsen or refine the current mesh comprises determining not to refine the current mesh at a vertex if a region of the current mesh affected by further refinement of such vertex overlaps a viewing frustum.

14. The method of claim 12 wherein the step of determining whether to coarsen or refine the current mesh comprises determining not to refine the current mesh at a vertex if such vertex lies on a surface of the current mesh that is oriented away from a point of view of an image to be rendered of the object.

15. The method of claim 12 wherein the step of determining whether to coarsen or refine the current mesh comprises determining not to refine the current mesh at a vertex if a screen space geometric error introduced by such refinement is less than a tolerance.

16. The method of claim 12 wherein the step of determining whether to coarsen or refine the current mesh comprises determining not to refine the current mesh at a vertex if a screen space projection of a deviation of a neighborhood about such vertex that is introduced by such refinement is less than a tolerance.

17. The method of claim 12 wherein the step of determining whether to coarsen or refine the current mesh comprises determining to refine the current mesh at a vertex if a region of the current mesh affected by further refinement of such vertex overlaps a viewing frustum, such vertex lies on a surface of the mesh that is not oriented away from a point of view, and a screen-space geometric error introduced by such refinement is greater than a tolerance.

18. The method of claim 12 wherein the step of determining whether to coarsen or refine the current mesh at a vertex comprises checking a constraint on a vertex split transformation that replaces the vertex having a set of four neighboring polygonal faces with two resulting vertices and adds two polygonal faces between and adjacent to the four neighboring polygonal faces, where the constraint is that the vertex and the set of four neighboring polygonal faces are currently in the current mesh.

19. The method of claim 12 wherein the step of determining whether to coarsen or refine the current mesh at a vertex comprises checking a constraint on an edge collapse transformation that replaces two vertices adjacent along an edge between two polygonal faces having a set of four neighboring polygonal faces, where the constraint is that the two vertices, the two polygonal faces and the set of four neighboring polygonal faces are currently in the current mesh.

20. A computer-readable data storage medium having computer-executable program code stored thereon operative to perform the method of claim 12 when executed on a computer.

21. A computer system programmed to perform the method of claim 12.

22. A method of adaptively selectively refining a variable resolution representation of an object for producing computer graphics images of the object, the method comprising:

constructing a vertex hierarchy having a plurality of nodes in parent-child relationships, wherein a root node subset of the nodes represent the vertices of a base mesh, wherein the parent-child relationships between nodes are defined by a plurality of mesh refinement transformations, and wherein a leaf node subset of the nodes represent the vertices of a mesh data model of the object;

constructing a current mesh from the base mesh and selected of the mesh refinement transformations, such that the current mesh has a plurality of vertices defined by a vertex front across the vertex hierarchy;

in a plurality of iterative traverses of the vertices in the vertex front, determining whether to coarsen or refine the current mesh at individual such vertices by respectively applying the mesh refinement transformation that defines the relationship of such vertex to its children in the vertex hierarchy or a reverse of the mesh refinement transformation that defines the relationship of such vertex to its parent in the vertex hierarchy, and adjusting the vertex front in accordance with the applied transformations, so as to thereby adaptively selectively refine the current mesh;

wherein the step of determining whether to coarsen or refine the current mesh comprises determining not to refine the current mesh at a vertex if a region of the current mesh affected by further refinement of such vertex overlaps a viewing frustum; and producing computer graphics images using the adaptively selectively refined current mesh.

23. The method of claim 22 wherein the step of determining whether to coarsen or refine the current mesh at a vertex comprises checking a constraint on a vertex split transformation that replaces the vertex having a set of four neighboring polygonal faces with two resulting vertices and adds two polygonal faces between and adjacent to the four neighboring polygonal faces, where the constraint is that the vertex and the set of four neighboring polygonal faces are currently in the current mesh.

24. The method of claim 22 wherein the step of determining whether to coarsen or refine the current mesh at a vertex comprises checking a constraint on an edge collapse transformation that replaces two vertices adjacent along an edge between two polygonal faces having a set of four neighboring polygonal faces, where the constraint is that the two vertices, the two polygonal faces and the set of four neighboring polygonal faces are currently in the current mesh.

25. A computer-readable data storage medium having computer-executable program code stored thereon operative to perform the method of claim 22 when executed on a computer.

26. A computer system programmed to perform the method of claim 22.

27. The method of claim 22 further comprising determining whether the vertex is within the view frustum according to the steps of:

determining a first bounding element that bounds a second set of vertices adjacent to a first set of vertices in the vertex hierarchy;

performing a traversal of the vertex hierarchy and determining a second bounding element that bounds the first bounding element;

determining a third bounding element centered at the vertex that bounds the second bounding element, the third bounding element having one or more bounding element components; and determining whether selected ones of the bounding components of the third bounding element centered at the vertex lie outside the view frustum.

28. The method of claim 27 wherein the bounding element s are a set of one or more spheres $S_v$ with radii $R_v$.

29. The method of claim 27 wherein the traversal of the vertex hierarchy is a postorder traversal.

30. The method of claim 27 wherein the view frustum is a four-sided pyramid, the method further comprising:

determining whether a sphere of a radius $r_{vi}$ for the third bounding element centered at the vertex lies outside the view frustum, where the vertex is defined as $V=\{v_x, v_y, v_z\}$, if:

$$a_i v_x + b_i v_y + c_i v_z + d_i < (-r_{vi}) \text{ for } i=\{1 \ldots 4\}$$

where the linear functions $a_i v_x + b_i v_y + c_i v_z + d_i$ measure a signed Euclidean distance to a side of the view frustum from the vertex.

31. A method of adaptively selectively refining a variable resolution representation of an object for producing computer graphics images of the object, the method comprising:

constructing a vertex hierarchy having a plurality of nodes in parent-child relationships, wherein a root node subset of the nodes represent the vertices of a base mesh, wherein the parent-child relationships between nodes are defined by a plurality of mesh refinement transformations, and wherein a leaf node subset of the nodes represent the vertices of a mesh data model of the object;

constructing a current mesh from the base mesh and selected of the mesh refinement transformations, such that the current mesh has a plurality of vertices defined by a vertex front across the vertex hierarchy;

in a plurality of iterative traverses of the vertices in the vertex front, determining whether to coarsen or refine the current mesh at individual such vertices by respectively applying the mesh refinement transformation that defines the relationship of such vertex to its children in the vertex hierarchy or a reverse of the mesh refinement transformation that defines the relationship of such vertex to its parent in the vertex hierarchy, and adjusting the vertex front in accordance with the applied transformations, so as to thereby adaptively selectively refine the current mesh;

wherein the step of determining whether to coarsen or refine the current mesh comprising determining not to refine the current mesh at a vertex if such vertex lies on a surface of the current mesh that is oriented away from a point of view of an image to be rendered of the object; and producing computer graphics images using the adaptively selectively refined current mesh.

32. The method of claim 31 wherein the step of determining whether to coarsen or refine the current mesh at a vertex comprises checking a constraint on a vertex split transformation that replaces the vertex having a set of four neighboring polygonal faces with two resulting vertices and adds two polygonal faces between and adjacent to the four neighboring polygonal faces, where the constraint is that the vertex and the set of four neighboring polygonal faces are currently in the current mesh.

33. The method of claim 31 wherein the step of determining whether to coarsen or refine the current mesh at a vertex comprises checking a constraint on an edge collapse transformation that replaces two vertices adjacent along an edge between two polygonal faces having a set of four neighboring polygonal faces, where the constraint is that the two vertices, the two polygonal faces and the set of four neighboring polygonal faces are currently in the current mesh.

34. A computer-readable data storage medium having computer-executable program code stored thereon operative to perform the method of claim 31 when executed on a computer.

35. A computer system programmed to perform the method of claim 31.

36. The method of claim 31 further comprising determining whether said vertex lies on the surface of the current mesh that is oriented away from the point of view of the image to be rendered of the object according to the steps of:

determining a first bounding element that bounds an associated space of normals for a set of normals for faces associated with the vertex;

computing a semiangle of a cone about a normal vector for the vertex that bounds the intersection of the first bounding element and a unit sphere; and determining with a backfacing test whether the point of view lies in a backfacing region of the vertex.

37. The method of claim 36 wherein the backfacing test includes:

(a) determining if $(v-e) \cdot n_{v_i} > 0$, and if so:

(b) determining if $((v-e) \cdot n_v)^2 > \|v-e\|^2 \sin^2 \alpha_v$, and if not, concluding that vertex does not lie in a backfacing region of the viewpoint, where v is the vertex, e is the point of view, and $n_v$ is a normal vector to the vertex.

38. A method of adaptively selectively refining a variable resolution representation of an object for producing computer graphics images of the object, the method comprising:

constructing a vertex hierarchy having a plurality of nodes in parent-child relationships, wherein a root node subset of the nodes represent the vertices of a base mesh, wherein the parent-child relationships between nodes are defined by a plurality of mesh refinement transformations, and wherein a leaf node subset of the nodes represent the vertices of a mesh data model of the object;

constructing a current mesh from the base mesh and selected of the mesh refinement transformations, such that the current mesh has a plurality of vertices defined by a vertex front across the vertex hierarchy;

in a plurality of iterative traverses of the vertices in the vertex front, determining whether to coarsen or refine the current mesh at individual such vertices by respectively applying the mesh refinement transformation that defines the relationship of such vertex to its children in the vertx hierarchy or a reverse of the mesh refinement transformation that defines the relationship of such vertex to its parent in the vertex hierarchy, and adjusting the vertex front in accordance with the applied transformations, so as to thereby adaptively selectively refine the current mesh;

wherein the step of determining whether to coarsen or refine the current mesh comprises determining not to define the current mesh at a vertex if a screen space geometric error introduced by such refinement is less than a tolerance; and producing computer graphics images using the adaptively selectively refined current mesh.

39. The method of claim 38 wherein the screen space geometric error is determined to be less than the tolerance if a screen space projection of a deviation of a neighborhood about such vertex that is introduced by such refinement is less than the tolerance.

40. The method of claim 38 wherein the step of determining whether to coarsen or refine-the current mesh at a vertex comprises checking a constraint on a vertex split transformation that replaces the vertex having a set of four neighboring polygonal faces with two resulting vertices and adds two polygonal faces between and adjacent to the four neighboring polygonal faces, where the constraint is that the vertex and the set of four neighboring polygonal faces are currently in the current mesh.

41. The method of claim 38 wherein the step of determining whether to coarsen or refine the current mesh at a vertex comprises checking a constraint on an edge collapse transformation that replaces two vertices adjacent along an edge between two polygonal faces having a set of four neighboring polygonal faces, where the constraint is that the two vertices, the two polygonal faces and the set of four neighboring polygonal faces are currently in the current mesh.

42. A computer-readable data storage medium having computer-executable program code stored thereon operative to perform the method of claim 38 when executed on a computer.

43. A computer system programmed to perform the method of claim 38.

44. The method of claim 38 further comprising determining whether the screen space geometric error introduced by said refinement is less than the tolerance according to the steps of:

determining a deviation between a first set of normal vectors for a neighborhood of faces adjacent to the vertex in the current mesh, and a second set of normal vectors for a corresponding neighborhood of faces in the mesh data model by examining a set of residual error vectors from a set of points sampled on the corresponding neighborhood that locally projects onto the first set of normal vectors;

determining a smallest deviation space $D_{n'}(\mu_v, \delta_v)$ with the ratio $\delta_v/\mu_v$ that bounds the set of residual error vectors; and determining if the smallest deviation space $D_{n'}(\mu_v, \delta_v)$ exceeds the pre-determined screen space tolerance.

45. The method of claim 44 wherein the step of determining if the smallest deviation space $D_{n'}(\mu_v, \delta_v)$ exceeds a pre-determined screen space tolerance includes determining if:

$$\mu^2_v >= k^2 ||v-e||^2;$$

and if not, determining if:

$$\delta^2_v (||v-e||^2 - ((v-e)\cdot \hat{N}_v)^2) >= k^2 ||v-e||^4,$$

and if not, concluding that the smallest deviation space $D_{n'}(\mu_v, \delta_v)$ does not exceed the pre-determined screen space tolerance, where v is a vertex, e is a viewpoint, $\hat{N}_v$ is a set of vectors for a neighborhood, and $k^2$ is a view angle factor.

46. A method of adaptively selectively refining a variable resolution representation of an object for producing computer graphics images of the object, the method comprising:

constructing a vertex hierarchy having a plurality of nodes in parent-child relationships, wherein a root node subset of the nodes represent the vertices of a base mesh, wherein the parent-child relationships between nodes are defined by a plurality of mesh refinement transformations, and wherein a leaf node subset of the nodes represent the vertices of a mesh data model of the object;

constructing a current mesh from the base mesh and selected of the mesh refinement transformations, such that the current mesh has a plurality of vertices defined by a vertex front across the vertex hierarchy;

in a plurality of iterative traverses of the vertices in the vertex front, determining whether to coarsen or refine the current mesh at individual such vertices by respectively applying the mesh refinement transformation that defines the relationship of such vertex to its children in the vertex hierarchy or a reverse of the mesh refinement transformation that defines the relationship of such vertex to its parent in the vertex hierarchy, and adjusting the vertex front in accordance with the applied transformations, so as to thereby adaptively selectively refine the current mesh;

wherein the step of determining whether to coarsen or refine the current mesh comprises determining to refine the current mesh at a vertex if a region of the current mesh affected by further refinement of such vertex overlaps a viewing frustum, such vertex lies on a surface of the mesh that is not oriented away from a point of view, and a screen-space geometric error introduced by such refinement is greater than a tolerance; and producing computer graphics images using the adaptively selectively refined current mesh.

47. The method of claim 46 wherein the step of determining whether to coarsen or refine the current mesh at a vertex comprises checking a constraint on a vertex split transformation that replaces the vertex having a set of four neighboring polygonal faces with two resulting vertices and adds two polygonal faces between and adjacent to the four neighboring polygonal faces, where the constraint is that the vertex and the set of four neighboring polygonal faces are currently in the current mesh.

48. The method of claim 46 wherein the step of determining whether to coarsen or refine the current mesh at a vertex comprises checking a constraint on an edge collapse transformation that replaces two vertices adjacent along an edge between two polygonal faces having a set of four neighboring polygonal faces, where the constraint is that the two vertices, the two polygonal faces and the set of four neighboring polygonal faces are currently in the current mesh.

49. A computer-readable data storage medium having computer-executable program code stored thereon operative to perform the method of claim 46 when executed on a computer.

50. A computer system programmed to perform the method of claim 46.

* * * * *

UNITED STATES PATENT AND TRADEMARK OFFICE
CERTIFICATE OF CORRECTION

PATENT NO. : 6,137,492
DATED : October 24, 2000
INVENTOR(S) : Hugues H. Hoppe

It is certified that error appears in the above-identified patent and that said Letters Patent is hereby corrected as shown below:

Title page,
Under Other Publications add: Foley, "Representing Curves and Surfaces", Computer Graphics: Principles and Practice, pps. 513-514.

Column 1,
Line 47, error reads "F. Duchamp," should read -- T. Duchamp, --
Line 48, error reads "SIGGKAPH" should read -- SIGGRAPH --
Line 56, error reads "levels Of Detail" should read -- Levels Of Detail --

Column 2,
Line 11, error reads "that is applied" should read -- that are applied --
Line 16, error reads "test However," should read -- test. However, --

Column 5,
Line 47, error reads "an AILU 24" should read -- an ALU 24 --

Column 6,
Line 14, error reads "computer system s" should read -- computer system's --
Line 57, error reads "frame-by frame" should read -- frame-by-frame --

Column 7,
Line 4, error reads "$R^1$," should read -- $R^M$, --
Line 14, error reads "{o,..., n-1)," should read -- {o,..., n-1}, --
Line 19, error reads "mode;," should read -- model, --
Line 31, error reads "$v^s 40$" should read -- $v_s 40$ --

Column 8,
Line 33, error reads "$M_{RE}$." should read -- $M^{RE}$. --

Column 9,
Line 53, error reads "$v^U$" should read -- $v_U$ --

Column 10,
Line 5, error reads "$f_R 10$" should read -- $f_R 110$ --
Line 49, error reads "$f^R 110$" should read -- $f_R 110$ --

Column 11,
Line 29, error reads "exist" should read -- exists --
Line 51, error reads ""legal" cannot" should read -- "legal" and cannot --

UNITED STATES PATENT AND TRADEMARK OFFICE
CERTIFICATE OF CORRECTION

PATENT NO. : 6,137,492
DATED : October 24, 2000
INVENTOR(S) : Hugues H. Hoppe

It is certified that error appears in the above-identified patent and that said Letters Patent is hereby corrected as shown below:

Column 12,
Lines 17 and 34, error read ""legal" edge" should read -- "legal" and edge --
Line 24, error reads "equal to as" should read -- equal to a --
Line 52, error reads "$f_3$}." should read -- $F_{n3}$}. --

Column 13,
Line 34, error reads "present of invention" should read -- present invention --
Line 65, error reads "used, A vertex" should read -- used. A vertex --

Column 14,
Line 2, error reads "nodes (are the" should read -- nodes are the --
Line 9, error reads "(i.e. 3" should read -- (i.e., 3 --
Line 9, error reads "(2*0)" should read -- (2∗0) --
Line 12, error reads "(2*1)" should read -- (2∗1) --
Line 28, error reads "representation an" should read -- representation of an --
Line 67, error reads "$v^S$" should read -- $v_S$ --
Line 67, error reads "$v^t$" should read -- $v_t$ --

Column 16,
Line 31, error reads "V^εV^" should read -- v^εV^ --
Line 40, error reads "pos-torder" should read -- post-order --
Line 44, error reads " VSi" should read -- Vsi --
Line 50, error reads "embodiment at the" should read -- embodiment of the --

Column 17,
Line 27, error reads "is show in" should read -- is shown in --
Line 33, error reads "$b_i$" should read -- $b_iv$ --
Line 39, error reads "Vertex" should read -- vertex --
Line 49, error reads "242 affects." should read -- 242 affects). --

Column 18,
Line 33, error reads "known in art," should read -- known in the art, --
Lines 61 and 64, error reads "visible to from viewpoint" should read
-- visible from viewpoint --

Column 19,
Lines 13 and 16, error reads "neighborhood N" should read -- neighborhood Nv --
Line 19, error reads "fiields" should read -- fields --
Line 23, error reads "$D_{\tilde{z}}\hat{}$" should read -- $D_{\hat{z}}$ --
Line 56, error reads "$\hat{N}$" should read -- $\hat{N}_{vs}$ --
Line 60, error reads "$D_{n^r(\mu v,\delta v)}$" should read -- $D_{n^r}(\mu_v, \delta_v)$ --
Line 63, error reads "$D_{n^r}(\mu_v,\delta_v)$" should read -- $D_{n^r}(\mu_v, \delta_v)$ --

UNITED STATES PATENT AND TRADEMARK OFFICE
CERTIFICATE OF CORRECTION

PATENT NO. : 6,137,492
DATED : October 24, 2000
INVENTOR(S) : Hugues H. Hoppe

It is certified that error appears in the above-identified patent and that said Letters Patent is hereby corrected as shown below:

Column 20,
Line 37, error reads "N^" should read -- $\hat{N}_v$ --

Column 23,
Line 15, error reads "$\tau t_t$" should read -- $\tau_t$ --
Line 35, error reads "$\mathring{A}F|$" should read -- $|F|$ --

Column 24,
Line 6, error reads "$M^G(\alpha)$ A" should read -- $M^G(\alpha)$. A --
Line 17, error reads "$\rho^{G \rightarrow}$." should read -- $\rho^{G \rightarrow B}$. --
Line 31, error read "triangles strips" should read -- triangle strips --
Line 48, error reads "face f Face f" should read -- face f. Face F --

Column 25,
Line 63, error reads "system an illustrative" should read -- systems of an illustrative --

Column 26,
Line 19, error reads "contain a" should read -- contains a --
Line 35, error read "image Fig." should read -- Image. Fig. --

Column 27,
Line 5, error reads "42.712 faces." should read -- 42, 712 faces. --
Lines 8 and 9, error reads "characters head" should read -- character's head --
Line 38, error reads "constraints is shown" should read -- constraints as shown --
Lines 62 and 63, error reads "operation a recomputed" should read
-- operation are recomputed --

Column 28,
Line 12, error reads "used manipulate" should read -- used to manipulate --
Line 43, error reads "set fixed" should read -- set of fixed --
Lines 49 and 50, error reads "refinement 5 criteria" should read -- refinement criteria --

Column 29,
Line 29, error reads "mesh same instance of a representation" should read
-- same instance of a mesh representation --
Lines 35, 36 and 56, error reads "selective refined mesh" should read
-- selectively refined mesh --
Line 38, error reads "For example navigation" should read -- For example, navigation --
Line 66, error reads "new set constraints" should read -- new set of constraints --

UNITED STATES PATENT AND TRADEMARK OFFICE
CERTIFICATE OF CORRECTION

PATENT NO. : 6,137,492
DATED : October 24, 2000
INVENTOR(S) : Hugues H. Hoppe

It is certified that error appears in the above-identified patent and that said Letters Patent is hereby corrected as shown below:

Column 30,
Line 5, error reads "selectively refine mesh" should read -- selectively refined mesh --
Line 13, error reads "refined mesh that requires" should read -- refined mesh requires --
Line 18, error reads "conditions which allows" should read -- conditions which allow --
Line 20, error reads "can also be used to for progressive" should read
-- can also be used for progressive --

Column 34,
Lines 40 and 41, error reads "element s" should read -- elements --

Column 35,
Line 63, error reads "$n_{vi}>O$" should read -- $\hat{n}_{vi}>0$ --
Line 64, error reads "$n_v$" should read -- $\hat{n}_{vi}$ --
Line 67, error reads "$n_v$" should read -- $\hat{n}_v$ --

Column 36,
Line 23, error reads "vertx" should read -- vertex --
Line 33, error reads "tolerance; and" should read -- tolerance, wherein the screen space geometric error is a measurement of the deviation introduced by the refinement of a localized surface neighborhood from that in the mesh data model; and --
Line 43, error reads "refine-the" should read -- refine the --

Column 37,
Line 28, error reads "$D_n\cdot(\mu_v,\delta_v)$" should read -- $D_n\cdot(\mu_v, \delta_v)$ --

Signed and Sealed this

Twenty-seventh Day of November, 2001

*Attest:*

*Nicholas P. Godici*

*Attesting Officer*

NICHOLAS P. GODICI
*Acting Director of the United States Patent and Trademark Office*